US005882260A

United States Patent [19]

Marks et al.

[11] Patent Number: 5,882,260

[45] Date of Patent: Mar. 16, 1999

[54] MODIFIED POKER CARD GAME AND COMPUTER SYSTEM FOR IMPLEMENTING SAME

[75] Inventors: Howard M. Marks, Westport, Conn.; Anthony M. Singer, Robbinsville, N.J.

[73] Assignee: PTT, LLC, Westport, Conn.

[21] Appl. No.: 979,365

[22] Filed: Nov. 26, 1997

Related U.S. Application Data

[60] Provisional application No. 60/031,984, Nov. 29, 1996.

[51] Int. Cl. [6] .............................. A63F 1/00; A63F 9/22; G06F 15/44

[52] U.S. Cl. ................................ 463/13; 463/11; 463/19; 463/42; 273/292

[56] References Cited

U.S. PATENT DOCUMENTS 739,455 6/1905 Mandelbaum .
1,165,984 12/1915 Lefler .
5,013,049 5/1991 Tomaszewski .
5,083,271 1/1992 Thacher et al. .
5,393,067 2/1995 Paulsen et al. .
5,531,440 7/1996 Dabroski et al. .

*Primary Examiner*—Jessica J. Harrison
*Assistant Examiner*—Mark A. Sager
*Attorney, Agent, or Firm*—Irah H. Donner Pepper Hamilton LLP

[57] ABSTRACT

A method of playing a card game is provided where a player sequentially builds at least two card hands that intersect with each other in at least one card. The at least two card hands define a pattern. The method includes the steps of dealing at least one card to the player, placing the at least one card in an empty place in the pattern until the player has placed a predetermined number of cards that comprise the at least two card hands defining the pattern. The method also includes the steps of comparing individual hands in the at least two card hands to corresponding values in a predetermined winning schedule, totaling the values into a total value, and awarding the player and/or declaring the player a winner, responsive to the total value.

22 Claims, 38 Drawing Sheets

MODIFIED POKER CARD GAME AND COMPUTER SYSTEM FOR IMPLEMENTING SAME

RELATED APPLICATIONS

This application claims priority from provisional patent application Ser. No. 60/031,984, filed Nov. 29, 1996, incorporated herein by reference.

TECHNICAL FIELD

The present invention relates generally to games, and more particularly, to a modified poker card game, and a computer system for playing the modified poker card game. Special features are provided to enhance game play.

BACKGROUND ART

The growth of the gaming industry, in particular, gambling casinos has been very significant over the last decade. The industry has come to recognize the need for new games and new gambling concepts. It also recognizes that the new technologies available need to be integrated in order to improve their gaming environment. It also recognizes the need to become a more efficient gaming provider.

The state gaming control boards of Nevada and New Jersey (which have traditionally been slow to approve any new games or gambling concepts) have changed their philosophy so dramatically that today they actively encourage the trial and acceptance of new games and gambling concepts. The problem with introducing new games has always been the basic criteria for mass-market gambling:

- Easy-to-learn game rules.
- Strategies must be easy to master and not favor "the expert" disproportionately.
- Games must have a short duration between the start (the bet) and the finish (the payoff).
- The payoff structure, that is, what can be won by a lucky player must be enticing.
- The game must be fair, that is, the casino should not have an unreasonable advantage.
- The game must be "secure", that is, protected from cheating and tampering.
- The casino's "win" must be demonstrated to be worthwhile., that is, the "win per machine per month" must at least compare favorably to that of the "slots".

Over the years, there have been many different types of games that have attempted to satisfy the demands of the gaming industry. These games have ranged the gamut from those involving great mental prowess to games involving merely chance. Nevertheless, there is still a strong interest in game concepts that create real excitement.

More specifically, with many games the players are placed in the position of passive observers. This is actually most true of the more expensive games that employ electronic components and the like which may or may not involve any skill on the part of the player. Still further, the game development or play is almost always viewed as unrealistic (e.g., only involving luck) at best.

Because of this fact, such expensive games are often difficult to market and discarded after minimal play even when purchased by the consumer. Moreover, even when use continues, such games have consistently lacked any excitement, particularly in the area of competitive or tournament gaming. While it is generally recognized that excitement in game play is of paramount importance, there has yet to be a game that places players in an exciting tournament competition.

One game of interest over the years is poker. Various attempts have been made to enhance play of poker over the years. Examples of such attempts are described in the following U.S. patent references, all of which are hereby incorporated by reference:

U.S. Pat. No. 4,743,022, Wood, second chance poker method; U.S. Pat. No. 4,948,134, Suttle et al., electronic five card poker game where cards are given to the players one at a time; U.S. Pat. No. 5,013,049, Tomaszewski, five card poker game where up to two cards are drawn; U.S. Pat. No. 5,118,109, Gumina, instant poker game card; U.S. Pat. No. 5,255,915, Miller, six card, two hand video poker game; U.S. Pat. No. 5,294,128, Marauez, six cards, three hand poker game; U.S. Pat. No. 5,382,025, Sklansky et al., three hands, two card poker game where each player chooses one hand and five communal cards are dealt face up; U.S. Pat. No. 5,407,199, Gumina, interactive video/casino poker game-drawpoker, hold'em poker; U.S. Pat. No. 5,415,404, Joshi et al., multiplay video poker game in which the player's sub-hands are compensated to increase the payoff level of the winning hands; U.S. Pat. No. 5,431,407, Hofberg et al., casino poker game.

U.S. Pat. No. 5,437,451 to Fulton involves a modified poker game where the player is dealt pairs of cards, where one card is optional and the other mandatory. The player is permitted to exchange at each round the optional card until five cards are selected. The resulting five card hand is then evaluated for payoff against a fairly standard payoff table.

U.S. Pat. No. 5,314,194 to Wolf deals the player seven cards. The player then forms two hands: a five card hand (e.g., a front hand), and a two card hand (e.g., a back hand). The rules for playing this game are quite elaborate, including requiring each player to arrange the hand so that the rank of the back hand is greater than the rank of the front hand.

Unfortunately, all these prior art attempts at making poker interesting and challenging have not been successful. That is, the prior art has been unable to successfully provide a poker game that combines the attributes of skill, luck, excitement and simplicity with rapid play. For example, none of the prior art references cited above relate to dealing a player two exposed cards each round from which the player selects one card and discards the other card, or builds two simultaneous five card hands. Further, none of the above prior art references relate to building a poker-type hand one card at a time, at the selection/control of the player.

Accordingly, it is desirable to provide a modified poker game that provides a player the opportunity to exercise their skill. It is also desirable to provide a modified poker game that includes luck to make the game exciting, unpredictable and enjoyable for people of all levels of intelligence.

It is further desirable to provide a modified poker game that has simple rules so that new players may learn the game easily, including learning the appropriate strategy for the game.

It is also desirable to provide a modified poker game that can be played rapidly so that multiple games can be played between two or more players in a short period of time.

It is also desirable to provide a modified poker game that can be played in a stand-alone manner, or multiple players in a tournament manner.

SUMMARY OF THE INVENTION

It is a feature and advantage of the present invention to provide a modified poker game that permits a player the opportunity to exercise their skill.

It is another feature and advantage of the present invention to provide a modified poker game that includes luck to make the game exciting, unpredictable and enjoyable for people of all levels of intelligence.

It is another feature and advantage of the present invention to provide a modified poker game that has simple rules so that new players may learn the game easily, including learning the appropriate strategy for the game.

It is a further feature and advantage of the present invention to provide a modified poker game that can be played rapidly so that multiple games can be played between two or more players in a short period of time.

It is another feature and advantage of the present invention to provide a modified poker game that can be played on a stand-alone machine or multiple players in a tournament manner.

It is another feature and advantage of the present invention to provide the player the option of playing the modified poker game against a computer in a slot machine fashion.

The present invention is based, in part, on the discovery or realization that previous attempts at improving the poker game have been unsuccessful due to the inability to combine the attributes of skill, luck, and simplicity with rapid play.

The modified poker card game of the present invention, the casino video version, is a game which combines some elements of Video Poker and Bingo. It can be played by one person (stand-alone) or with an additional jackpot bet by any number of players (tournament)—who are competing for the highest score to win the jackpot money. In tournament form, a number of modified poker game machines are linked together, with match-point scoring and instantaneous graphic display of the leader's board.

Tournaments consist of a series of rounds. During each round of a tournament, players receive identical "Hand Patterns" (see below) and "Call Cards" (see below), and compete for the highest score. The modified poker game tournament features include an instantaneous visual display of players' relative standings ("The Leader Board") and Match Point scoring.

The modified poker game satisfies the five (5) requirements for making it an ideal tournament game:

1. Fairness—Players see identical cards (although it is also possible that players receive different cards) and start with identical "Hand Patterns."

2. Simplicity—The game is easy to learn, yet involved enough to hold the players interest.

3. Luck—Luck rules the day.

4. Perceived Skill—Although luck abounds, players make choices that give them the perception of control.

5. Branching of Hands—Fundamental to a tournament game, and inherent to the structure of the modified poker game, players make a multiplicity of different hands from the same "Called Cards".

In addition to being an ideal tournament game, the modified poker game is also a perfect Class II game. In the Indian Gaming arena, there is currently a dearth of Class II games. Class II games offer a social flavor and atmosphere that are all but absent from most other casino gaming. Players sit next to each other, can participate in friendly competitive banter, and all follow the same action.

To achieve the features and advantages of the present invention, a game device providing a modified poker card game is provided as described below. A method of playing a card game is provided where a player sequentially builds at least two card hands that intersect with each other in at least one card. The at least two card hands define a pattern. The method includes the steps of dealing at least one card to the player, placing the at least one card in an empty place in the pattern until the player has placed a predetermined number of cards that comprise the at least two card hands defining the pattern. The method also includes the steps of comparing individual hands in the at least two card hands to corresponding values in a predetermined winning schedule, totaling the values into a total value, and awarding the player and/or declaring the player a winner, responsive to the total value.

These together with other objects and advantages which will be subsequently apparent, reside in the details of construction and operation as more fully herein described and claimed, with reference being had to the accompanying drawings forming a part hereof wherein like numerals refer to like elements throughout.

BEST MODE FOR CARRYING OUT THE INVENTION

The modified poker card game of the present invention, the casino video version, is a game which combines some elements of Video Poker and Bingo. It can be played by one person (stand-alone) or with an additional jackpot bet by any number of players (tournament)—who are competing for the highest score to win the jackpot money. In tournament form, a number of modified poker game machines are linked together, with match-point scoring and instantaneous graphic display of the leader's board.

Tournaments consist of a series of rounds. During each round of a tournament, players receive identical "Hand Patterns" (see below) and "Call Cards" (see below), and compete for the highest score. Tournament modified poker game features include an instantaneous visual display of players' relative standings ("The Leader Board") and Match Point scoring.

The modified poker game satisfies the five (5) requirements for making it an ideal tournament game:

1. Fairness—Players see identical cards (although it is also possible that players receive different cards) and start with identical "Hand Patterns."

2. Simplicity—The game is easy to learn, yet involved enough to hold the players interest.

3. Luck—Luck rules the day.

4. Perceived Skill—Although luck abounds, players make choices that give them the perception of control.

5. Branching of Hands—Fundamental to a tournament game, and inherent to the structure of the modified poker game, players make a multiplicity of different hands from the same "Called Cards".

In addition to being an ideal tournament game, the modified poker game is also a perfect Class II game. In the Indian Gaming arena, there is currently a dearth of Class II games. Class II games offer a social flavor and atmosphere that are all but absent from most other casino gaming. Players sit next to each other, can participate in friendly competitive banter, and all follow the same action.

Currently only Bingo is approved as a Class II game. Because there are no other "Bingo-Like" games, there is a lack of variety in the Class II arena. Players do not have any choices. The modified poker game is "Bingo-Like" and would give players another socially-interactive game they could enjoy.

The game device for the modified poker game is, for example, a display screen with touch screen capabilities (optional, 5 by 5 set of buttons remove the requirement for a touch screen) and a game card reader (no bill acceptors or hoppers are needed).

OBJECT OF THE GAME

The object of the modified poker game is to create the highest-valued poker hands (using, for example, a video poker payoff table or other suitable payoff table). All players are shown a hand pattern, which must be filed in by placing the cards "called" within the pattern, in any order desired. There may or may not be an additional "discard" pattern, where "called" cards can be placed, at the discretion of the player—these cards will not be considered in evaluating the poker hands.

Figure 3:
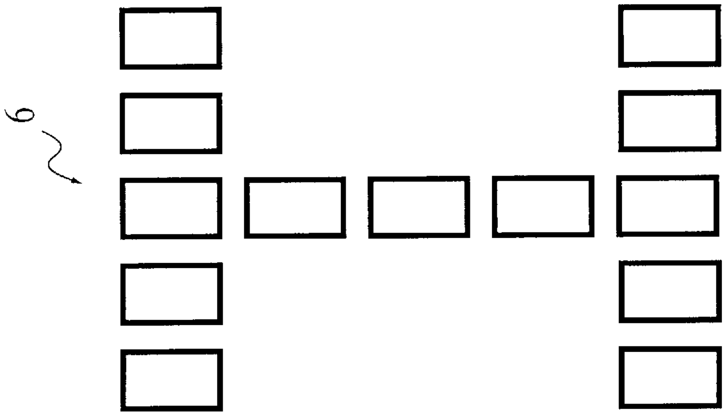
FIG. 3 is illustrations of sample I-hand pattern for the modified poker game of the present invention.
Figure 4:
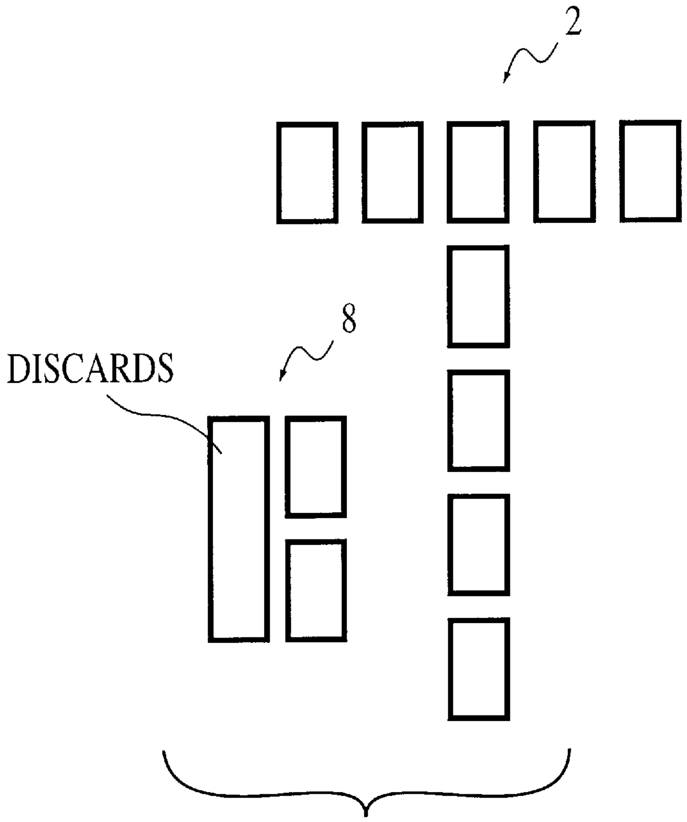
FIG. 4 is illustrations of sample T-hand pattern for the modified poker game of the present invention with a card discard area feature.

All players are shown a "Hand Pattern." There are many different possible "Hand Patterns." FIGS. 1–4 are illustrations of sample hand patterns 2, 4, and 6. FIG. 4 illustrates the feature of using a discard area 8. Any hand pattern may be used that accomplishes similar results. In FIG. 4, the discard area contains two cards, however, the discard area may optionally be one or more cards.

T-Hand Pattern

Figure 1:
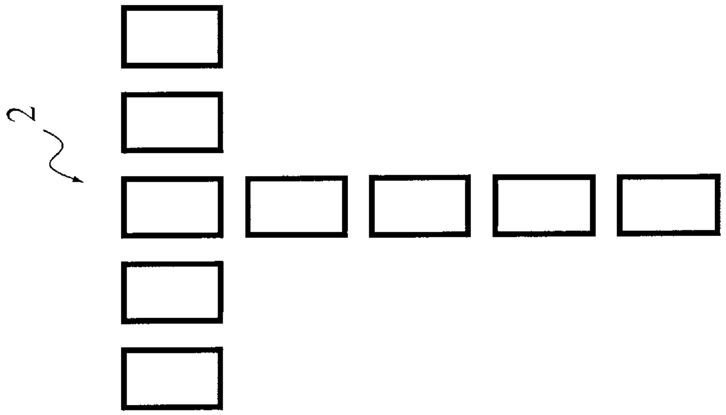
FIG. 1 is illustrations of sample T-hand pattern for the modified poker game of the present invention.

The T-hand pattern illustrated in FIG. 1 will create two five card poker hands, with one card in common. When a card is "called" the player must place it anywhere within the hand pattern, except on a place that already has a card. The hands created will be evaluated by using a video poker payoff table, for example:

1=Low Pair
2=Pair of Jacks or Better
6=Two Pair
10=Three of a Kind
20=Straight
25=Flush
35=Full House
75=Four of a Kind
100=Straight Flush
250=Royal Flush The sum of the values of all the hands made will be used to determine a player's score.

E-Hand Pattern

Figure 2:
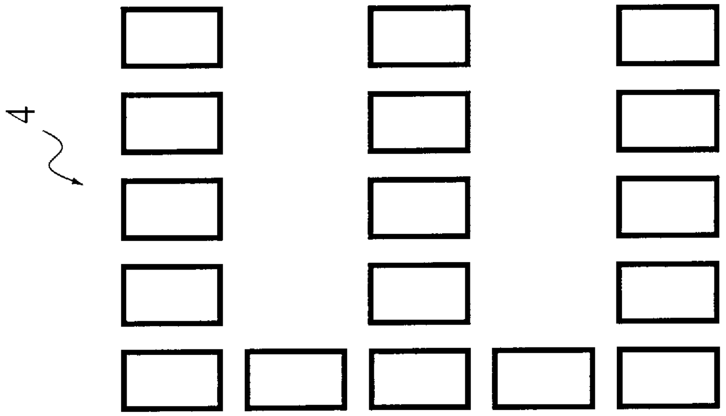
FIG. 2 is illustrations of sample E-hand pattern for the modified poker game of the present invention.

The E-hand pattern illustrated in FIG. 2 will create four five-card poker hands, with three cards in common. When a card is "called" the player must place it anywhere within the hand pattern, except on a place that already has a card. The hands created will be evaluated by using a video poker payoff table, for example:

2=Two Pair
3=Three of a Kind
4=Straight
5=Flush
8=Full House
20=Four of a Kind
40=Straight Flush
200=Royal Flush The sum of the values of all the hands made will be used to determine a player's score.

I-Hand Pattern

The I-hand pattern illustrated in FIG. 3 will create three five card poker hands, with two cards in common. When a card is "called" the player must place it anywhere within the hand pattern, except on a place that already has a card. The hands created will be evaluated by using a video poker payoff table, for example, as described above or derivative thereof.

Stand-Alone Play

All players are shown a "Hand Pattern." There are many different possible "Hand Patterns." A "Caller" calls out a card chosen randomly from a deck of cards (the same way a "Caller" in Bingo calls out a letter/number combination). The players put the "Called Card" in any unoccupied space in their "Hand Pattern".

Some "Hand Patterns" include a "Discard Area". If a pattern includes a "Discard Area", players may put a "Called Card" into any unoccupied space in the "Discard Area." Cards placed in the "Discard Area" are not considered when evaluating the poker hands. Alternatively, players may also build a separate hand pattern using the discarded cards.

All players will see the "called card" and then place that card, for example, in an empty card position within the hand pattern, or within an optional "discard" pattern. It has been shown to be a significant improvement to the game to "preview" the next card before placing the current called card. In other words, the player optionally sees two cards—the current card to be placed and the next card to be called (except optionally on the last card).

When the number of "called" cards is equal to the number of card positions in the hand pattern, plus the number of card positions in the optional discard pattern, the "calling" is done and the scores must be tabulated. Scoring is done by evaluating each five-card poker hand, for example, against a video poker payoff table and then summing all the values for each poker hand for a total score and/or award.

SAMPLE POKER HAND PAYOFF TABLE

| Hand | Value Per Coin |
|---|---|
| Pair of Jacks or Better | 1 |
| Two Pair | 2 |
| Three Of A Kind | 3 |
| Straight | 4 |
| Flush | 6 |
| Full House | 9 |
| Four Of A Kind | 25 |
| Straight Flush | 50 |
| Royal Flush | 250 |

The Poker Table Value of each player's hand is then used to determine their score or payoff. The payoff is determined when a wager is placed by the player based on the number of coins entered or wagered.

Figure 5:
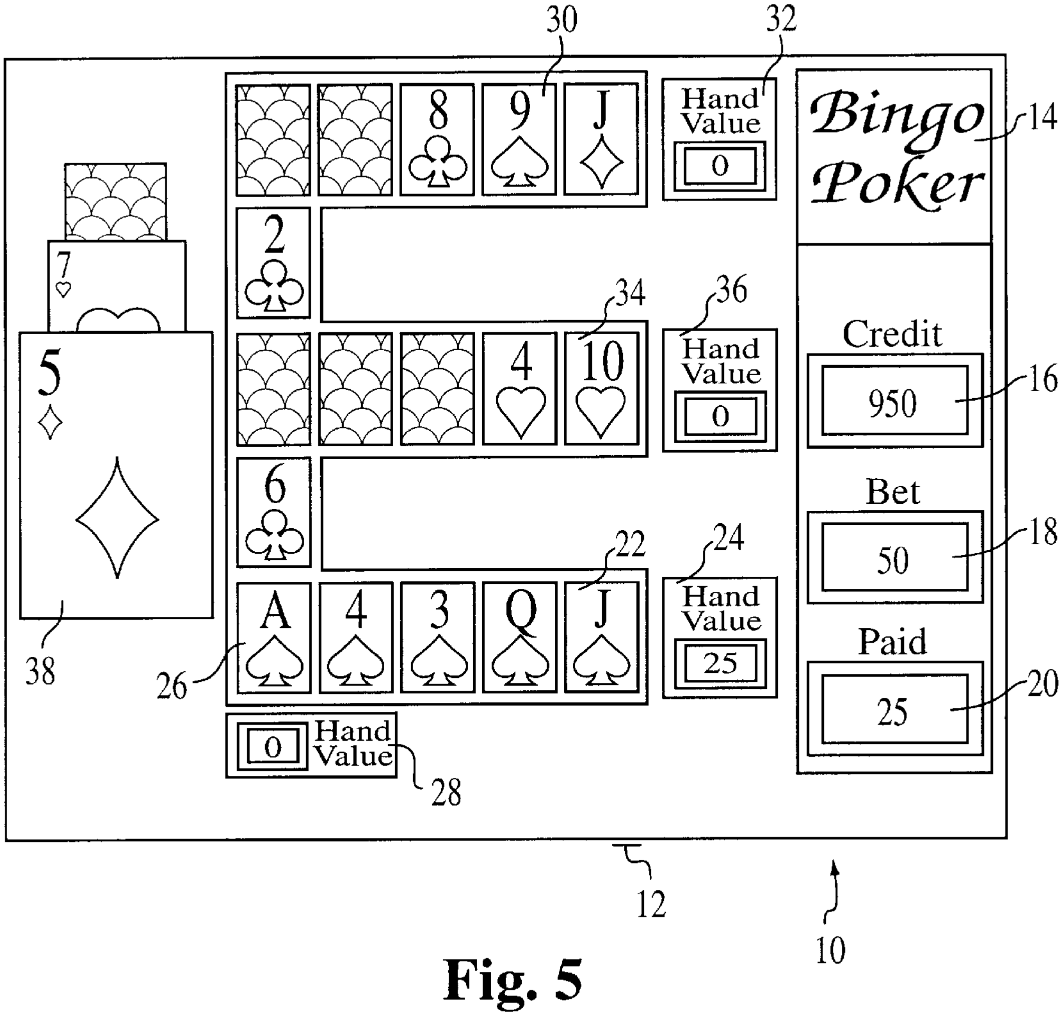
FIG. 5 is an illustration of an example of the E-hand pattern where the player builds four card hands for the modified poker game of the present invention.

FIG. 5 is an illustration of an example of the E-hand pattern for the modified poker game, where the player builds four poker hands. In FIG. 5, display 10 includes display area 12 with wagering area 14. Wagering area 14 includes credit area 16, bet area 18 and paid area 20. The E-pattern includes lower portion 22 with lower hand value area 24. The E-pattern also includes mid portion 34 with mid hand value area 36. The E-pattern also includes upper portion 30 with upper hand value area 32. The E-pattern also includes vertical portion 26 with vertical hand value area 28. Cards to be played area 38 displays the card to be placed in the hand pattern, and optionally displays one or more cards to be placed next in the hand pattern, as described above. An optional discard area may also be provided. The total value or paid area 20 is the total of the combination of hand value areas 24, 28, 32 and 36.

Figure 6:
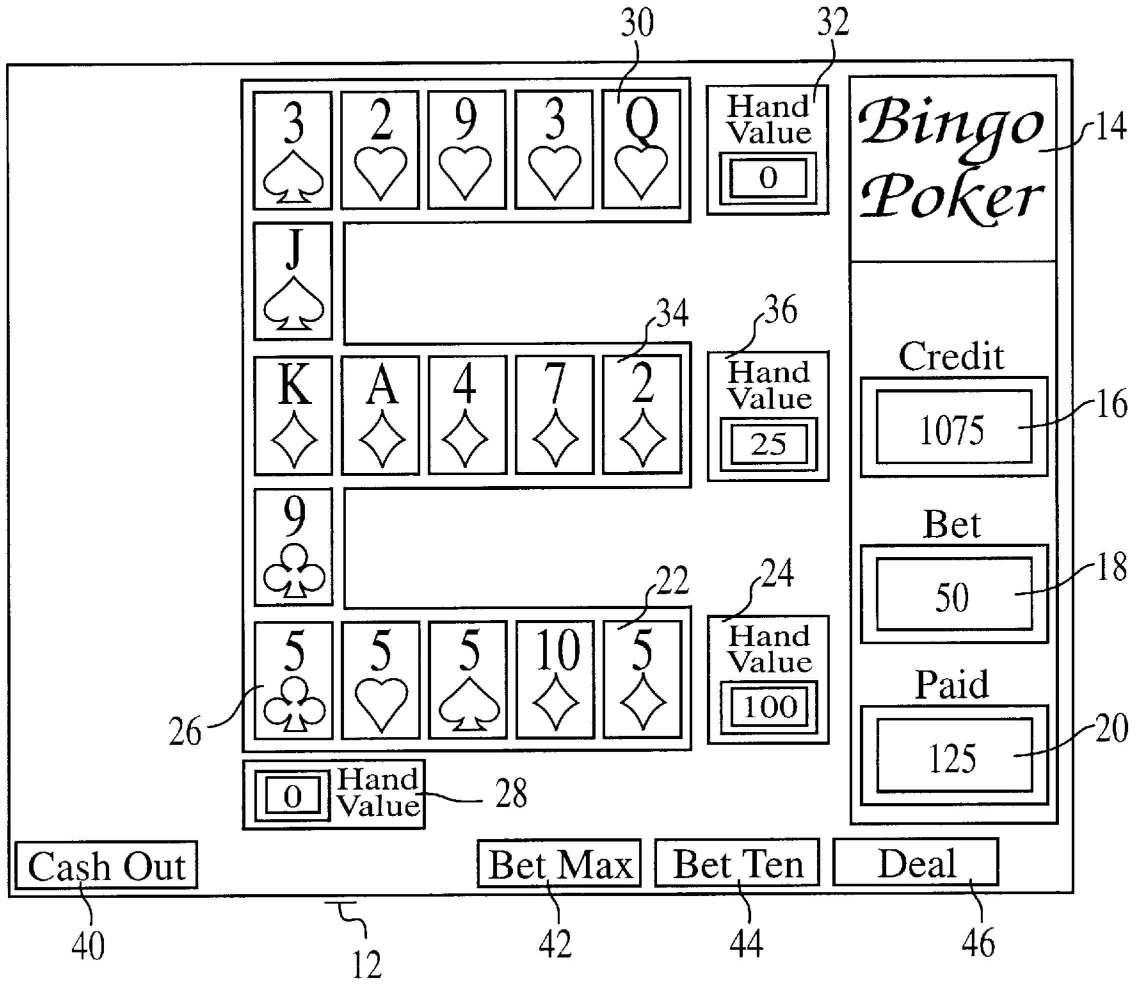
FIG. 6 is an illustration of how the player is credited with scores from all the hands built which have value for the modified poker game of the present invention illustrated in FIG. 5.

FIG. 6 is an illustration of how the player is credited with scores from all the hands he builds which have value of the E-pattern in FIG. 5. Note that at the end of the game, the cash out area 40 appears to permit the player to leave the game. In the event the player chooses to continue play, bet max area 42 and bet ten area 44 are also displayed. Once the wager has been placed, the player optionally requests the computer system to deal the or begin play via deal area 46.

Figure 7:
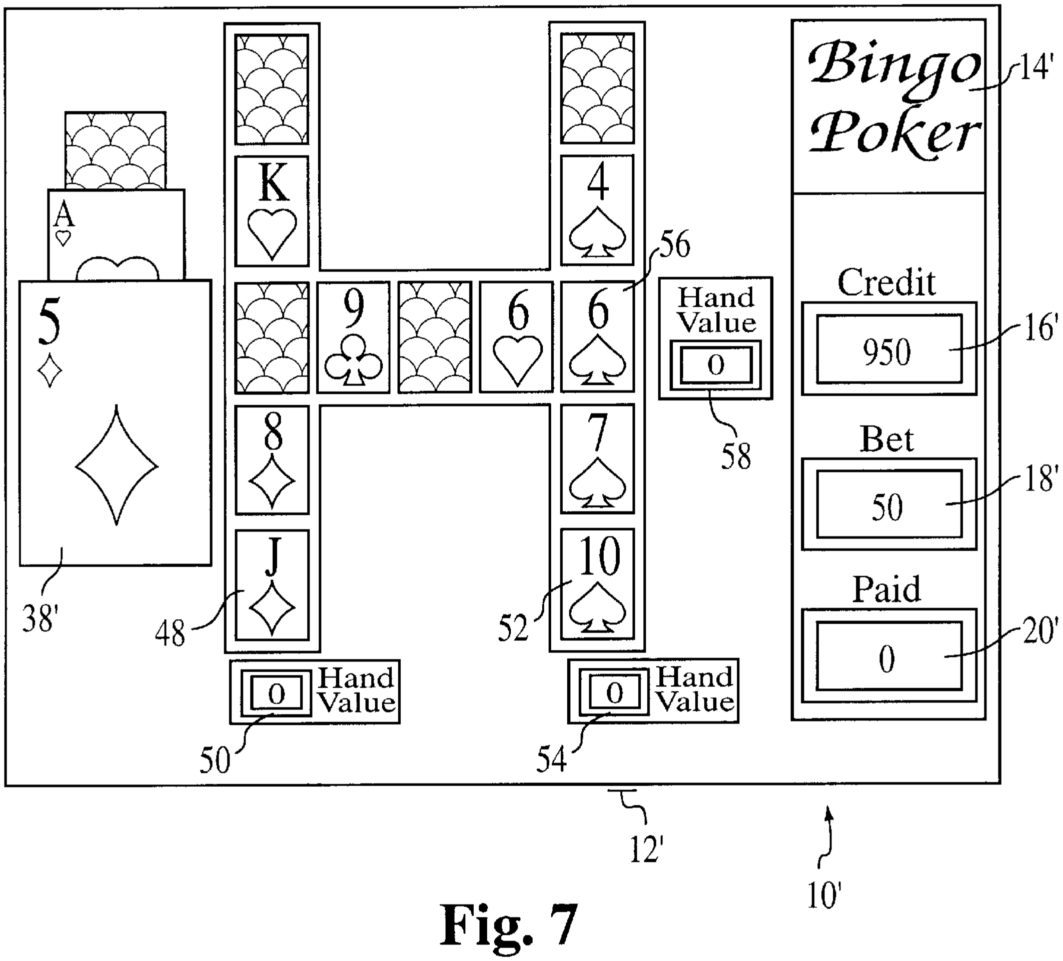
FIG. 7 is an illustration of an example of the H-hand pattern where player builds three poker hands for the modified poker game of the present invention.

FIG. 7 is an illustration of an example of the H-hand pattern where player builds three poker hands for the modified poker game. In FIG. 7, display 10' includes display area 12' with wagering area 14'. Wagering area 14' includes credit area 16', bet area 18' and paid area 20'. The H-hand pattern includes left portion 48 with left hand value area 50. The H-pattern also includes mid portion 56 with mid hand value area 58. The H-pattern also includes right portion 52 with right hand value area 54. Cards to be played area 38' displays the card to be placed in the hand pattern, and optionally displays one or more cards to be placed next in the hand pattern, as described above. An optional discard area may also be provided. The total value or paid area 20' is the total of the combination of hand value areas 50, 54 and 58.

Figure 8:
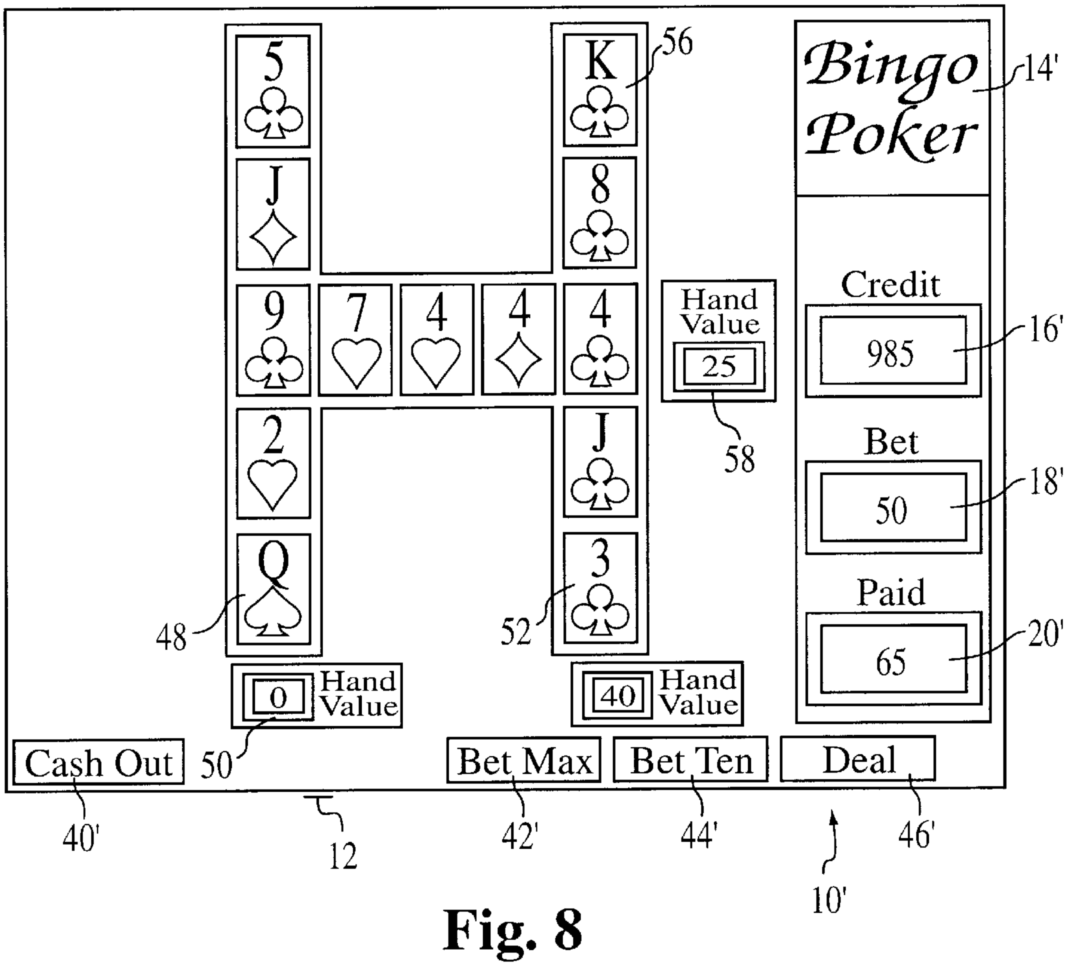
FIG. 8 is an illustration of how the player is credited with scores from all the hands he built which have value for the modified poker game of the present invention illustrated in FIG. 7.

FIG. 8 is an illustration of how the player is credited with scores from all the hands he builds which have value. Note that at the end of the game, the cash out area 40' appears to permit the player to leave the game. In the event the player chooses to continue play, bet max area 42' and bet ten area 44' are also displayed. Once the wager has been placed, the player optionally requests the computer system to deal the or begin play via deal area 46*x*.

Figure 9:
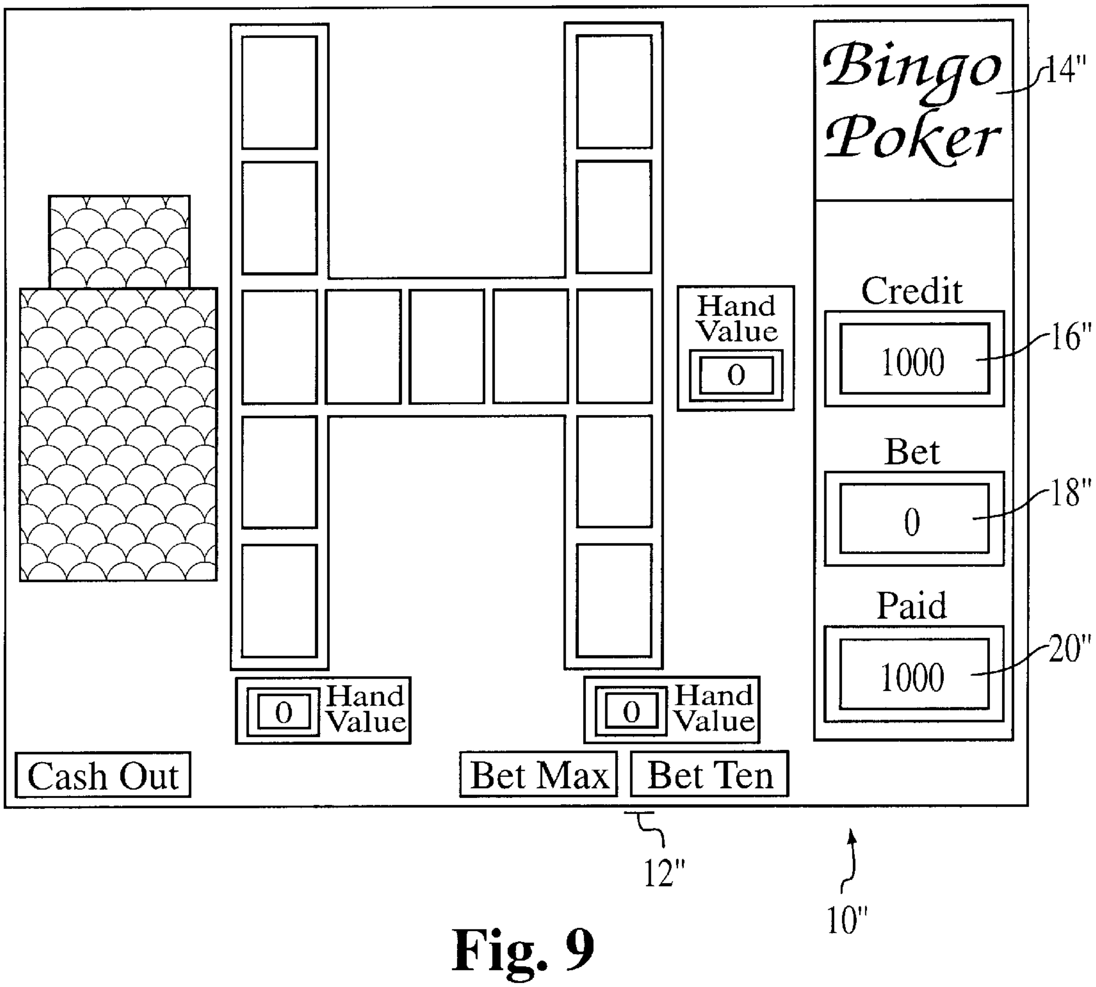
FIGS. 9–27 are illustrations of another example of the H-hand pattern where player builds three poker hands for the modified poker game.
Figure 10:
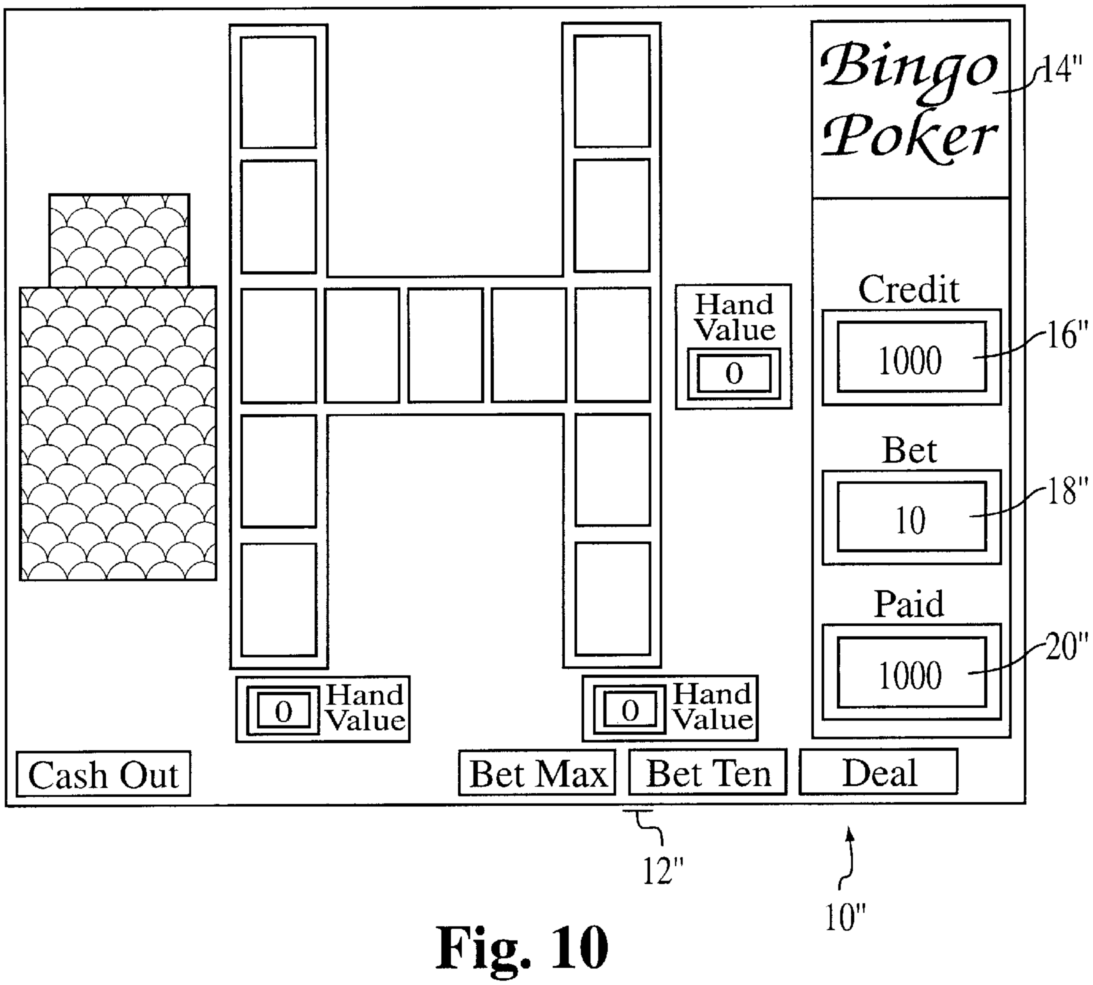

FIGS. 9–27 are illustrations of another example of the H-hand pattern where player builds three poker hands for the modified poker game. In FIG. 9, display 10" includes display area 12" with wagering area 14". Wagering area 14" includes credit area 16", bet area 18" and paid area 20". Credit area 16" value is 1000, and bet area 18" value is 0 prior to beginning of play. In FIG. 10, bet area 18" value is 10, indicating that the player has placed a bet of 10 credits. Note that the player has not yet completed the wager since the credit area 16" is still 1000.

Figure 11:
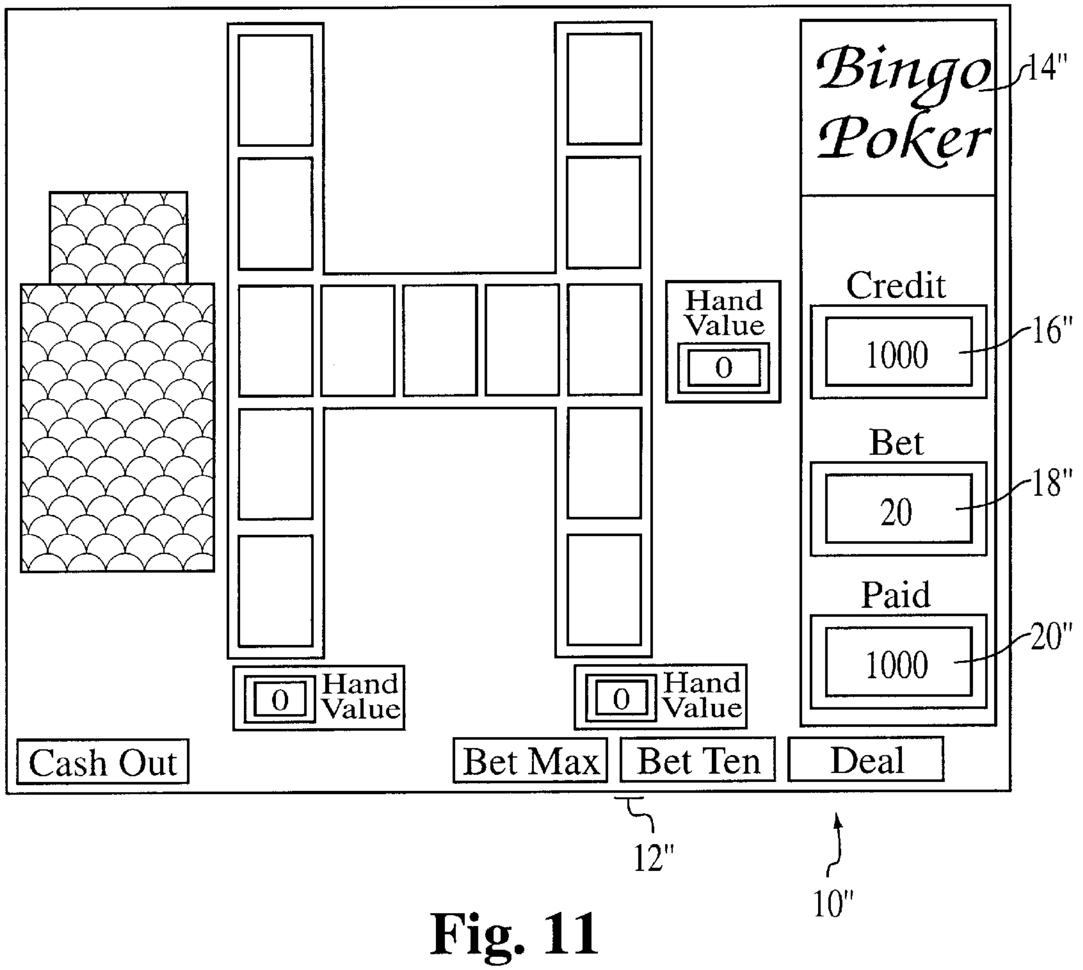
Figure 12:
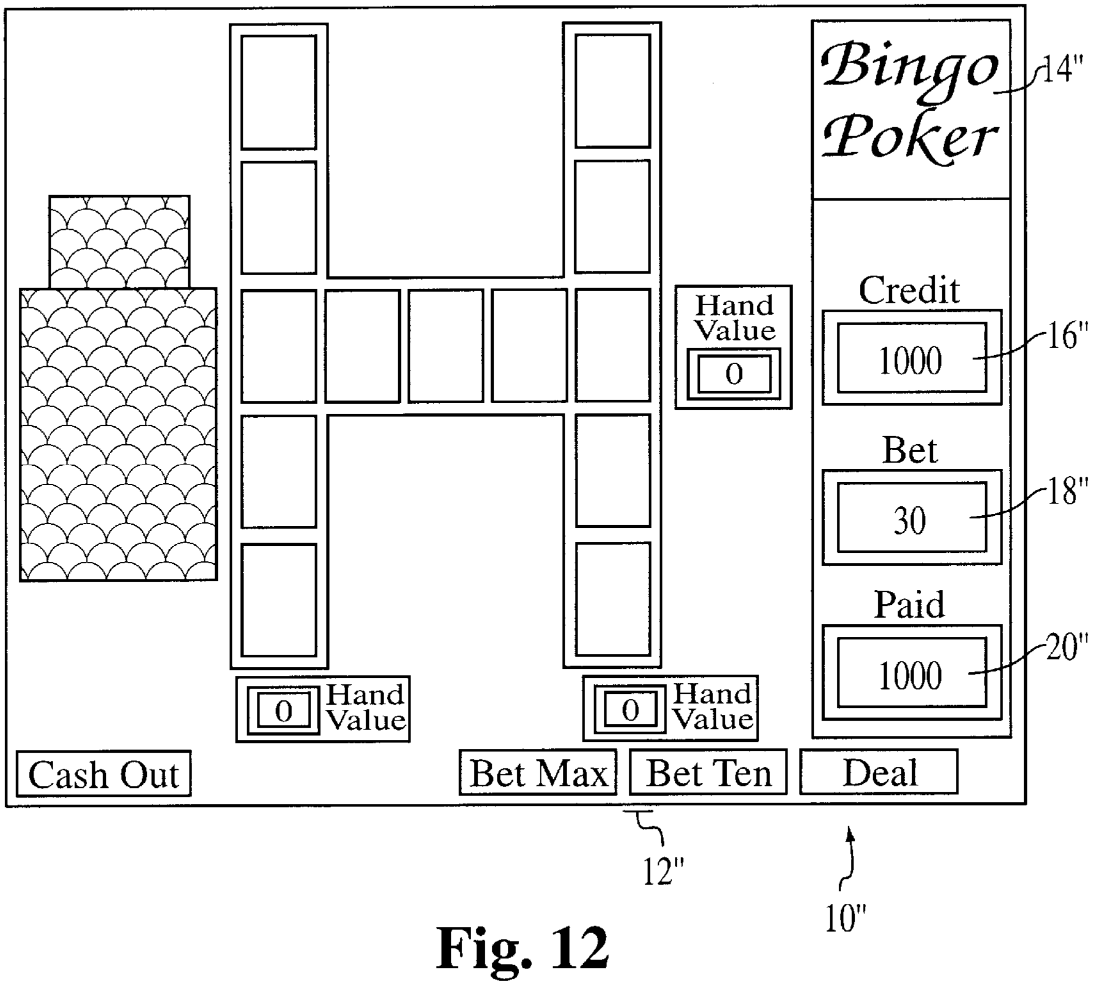
Figure 13:
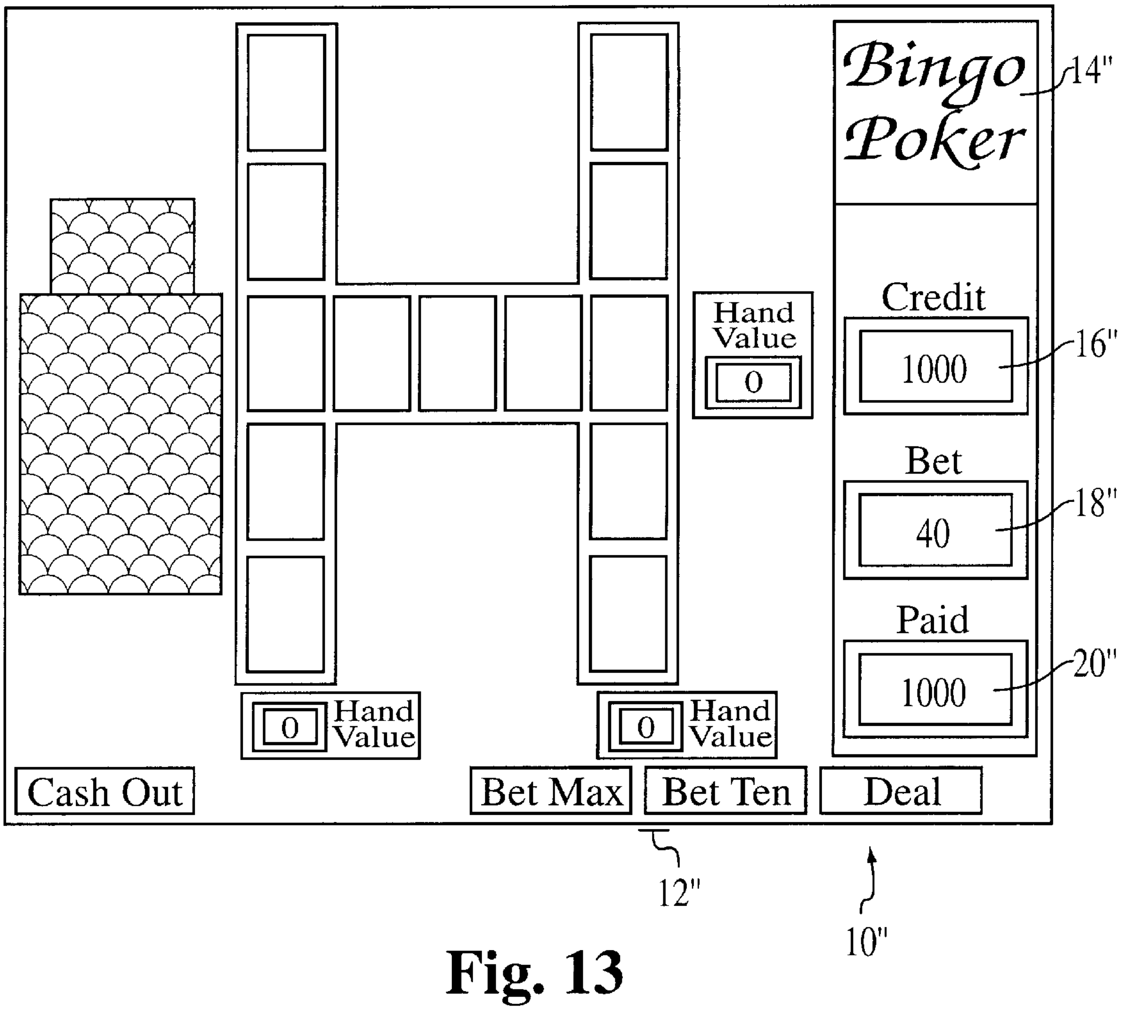

In FIG. 11, bet area 18" value is 20, indicating that the player has placed an additional bet of 10 credits. Note that the player has not yet completed the wager since the credit area 16" is still 1000. In FIG. 12, bet area 18" value is 30, indicating that the player has placed an additional bet of 10 credits. Note that the player has not yet completed the wager since the credit area 16" is still 1000. In FIG. 13, bet area 18" value is 40, indicating that the player has placed an additional bet of 10 credits. Note that the player has not yet completed the wager since the credit area 16" is still 1000.

Figure 14:
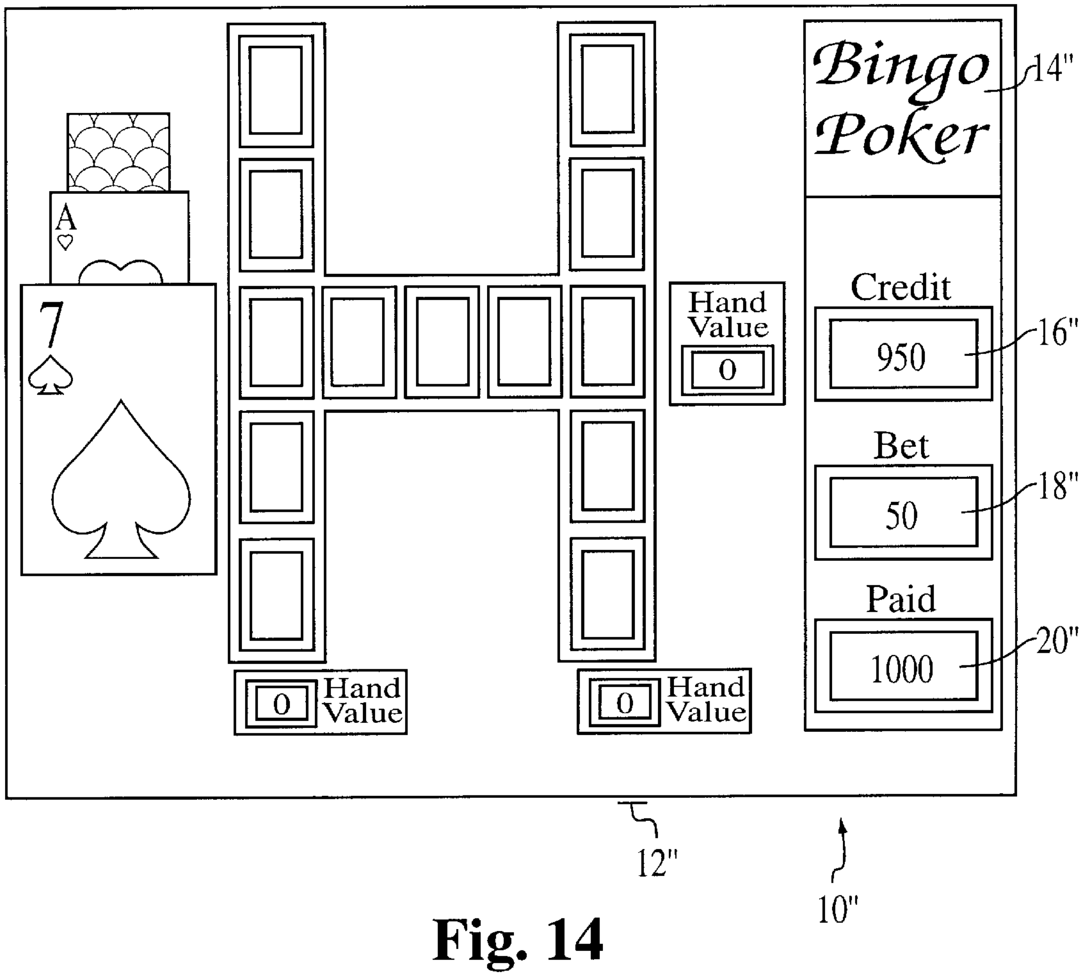
Figure 15:
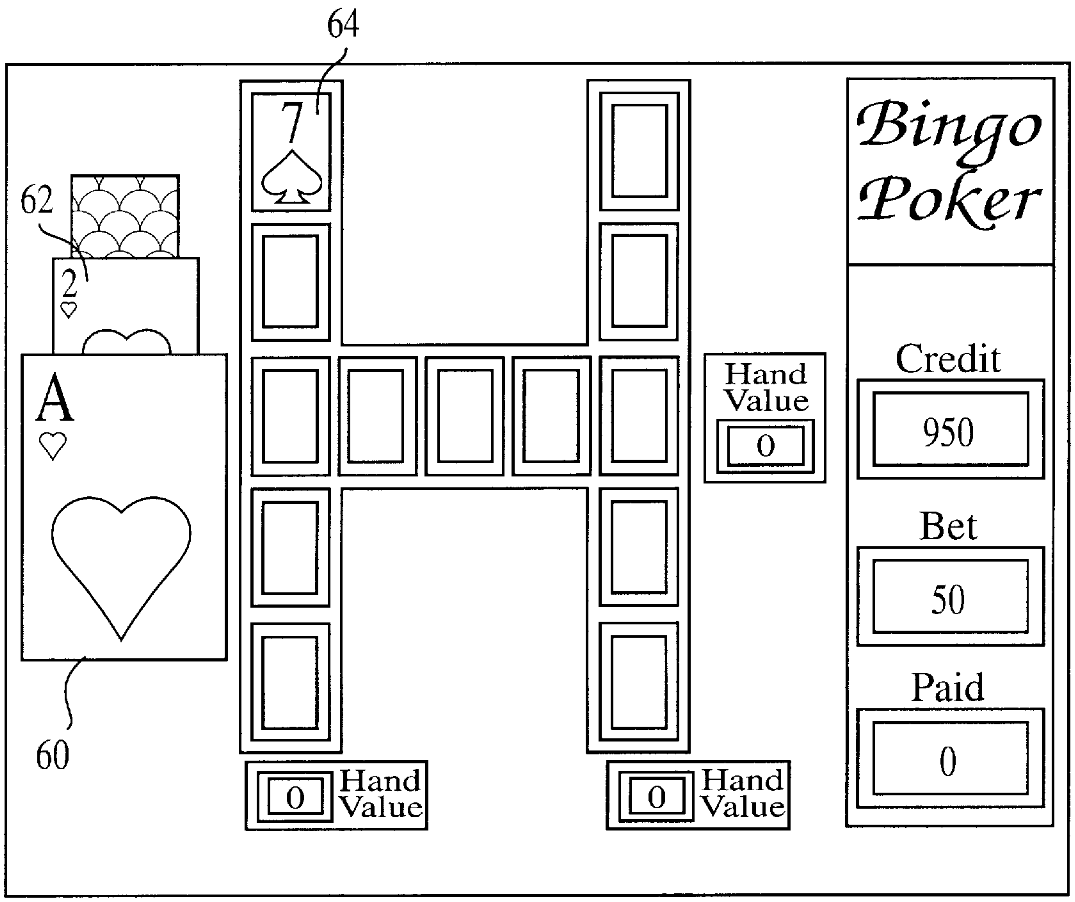

In FIG. 14, bet area 18" value is 50, indicating that the player has placed an additional bet of 10 credits. Note that the player has completed the wager since the credit area 16" is now 950, the 50 units being deducted from the original 1000. In FIG. 15, first face-up card 60 is to next be placed on the H-pattern. A second optional face-up card 62 is to placed on the H-pattern next. In FIG. 15, card 64 has already been placed on the H-pattern.

Figure 16:
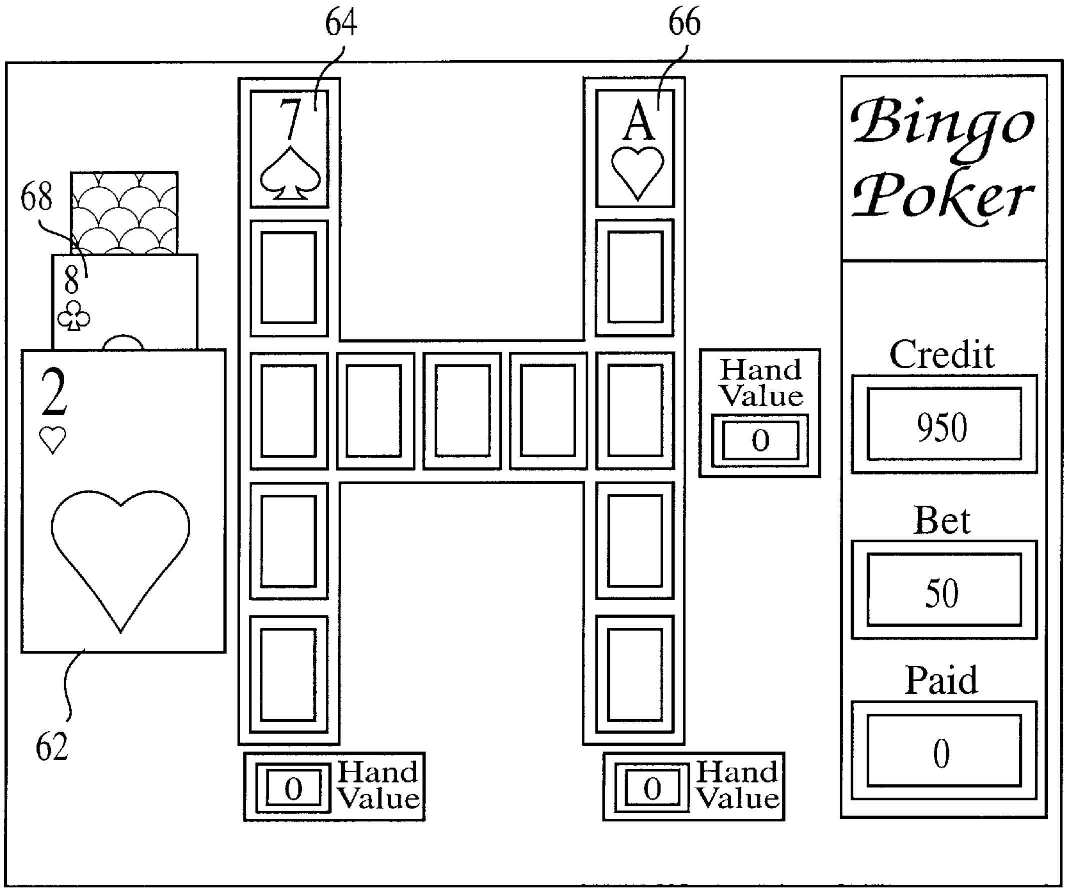
Figure 17:
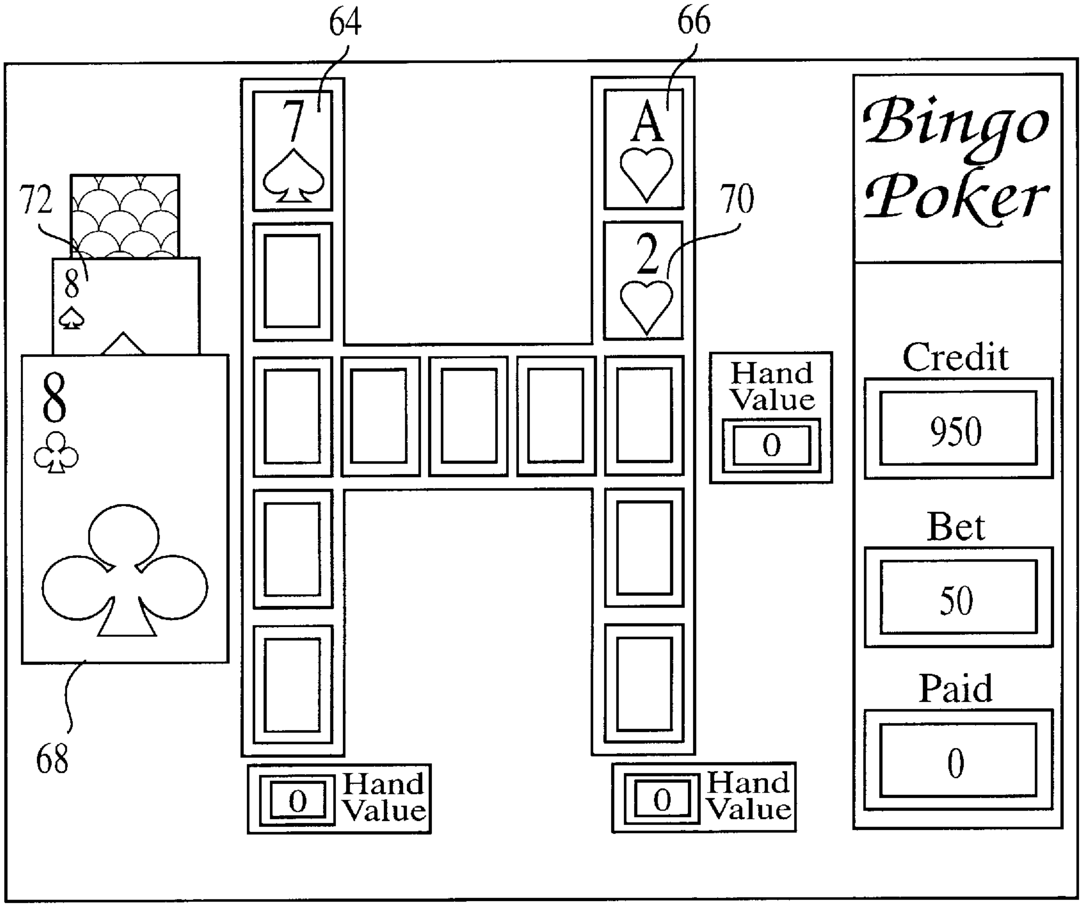
Figure 18:
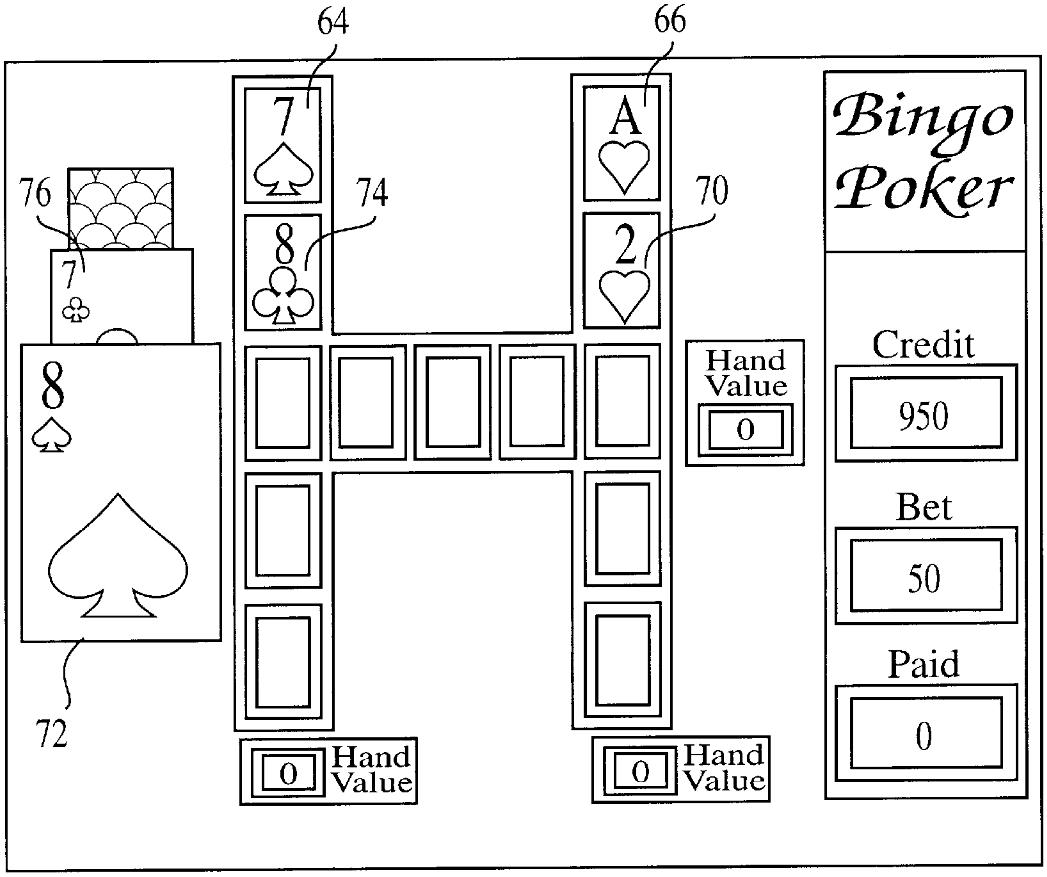

In FIG. 16, the ace of hearts has been placed in card area 66. The second face-up card 62 illustrated in FIG. 15 has now moved to the first face-up card area, and another second face-up card 68 is displayed. In FIG. 17, the two of hearts has been placed in card area 70. The second face-up card 68 illustrated in FIG. 16 has now moved to the first face-up card area, and another second face-up card 72 is displayed. In FIG. 18, the eight of clubs has been placed in card area 74. The second face-up card 72 illustrated in FIG. 17 has now moved to the first face-up card area, and another second face-up card 76 is displayed.

Figure 19:
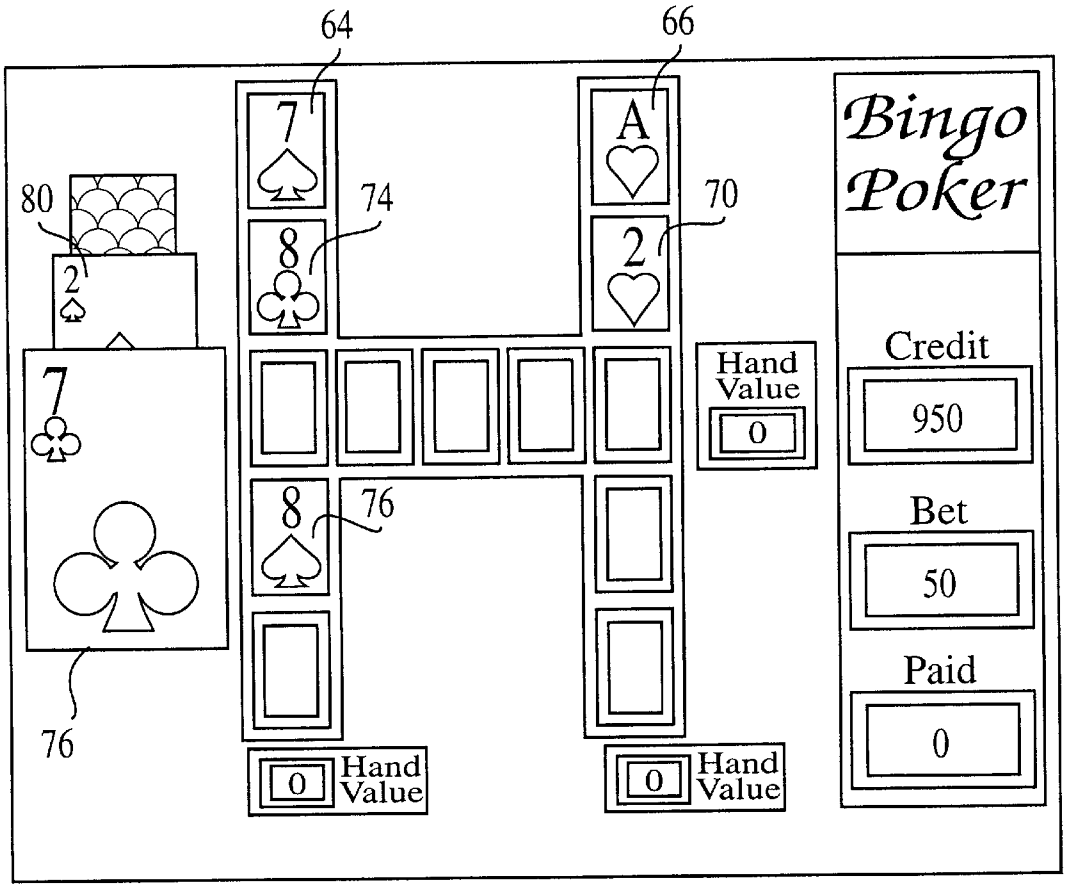
Figure 20:
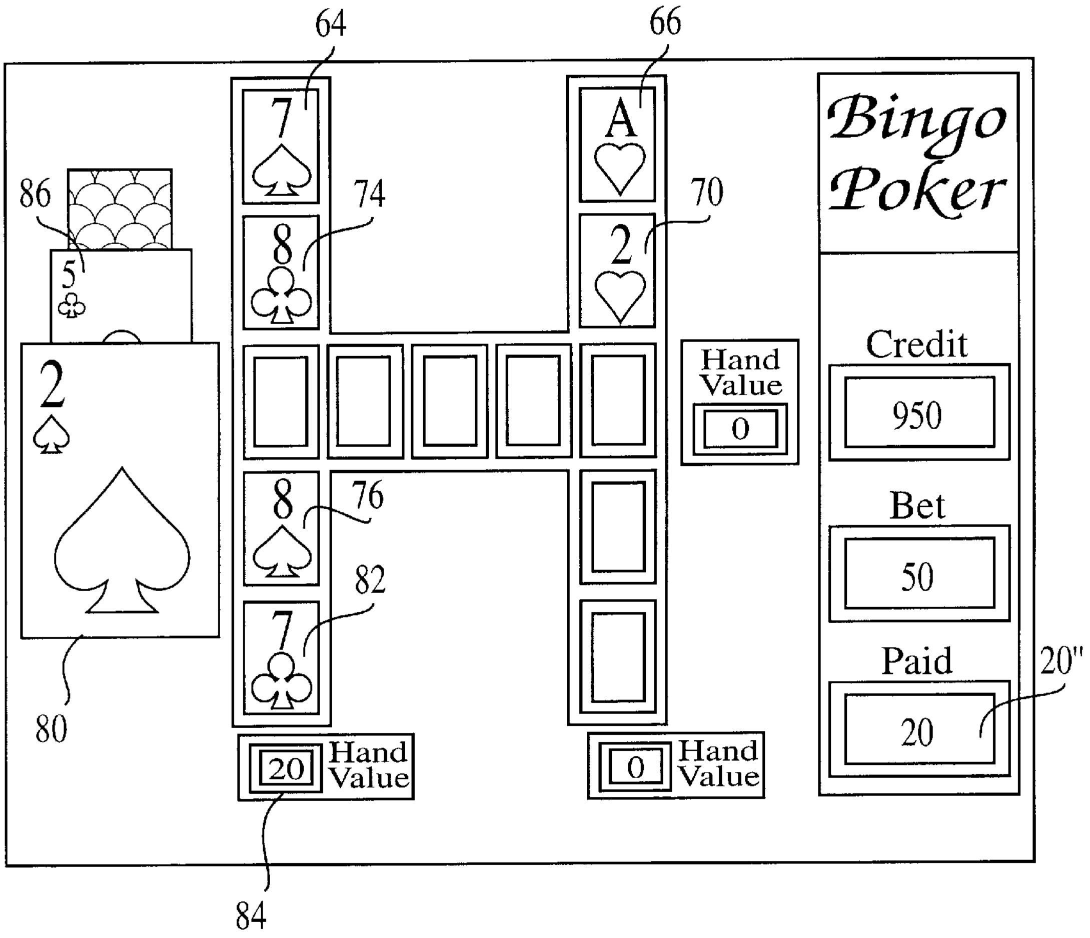

In FIG. 19, the eight of spades has been placed in card area 78. The second face-up card 76 illustrated in FIG. 18 has now moved to the first face-up card area, and another second face-up card 80 is displayed. In FIG. 20, the seven of clubs has been placed in card area 82. The second face-up card 80 illustrated in FIG. 19 has now moved to the first face-up card area, and another second face-up card 86 is displayed. Paid area 20" illustrates that the player has been paid 20 credits, corresponding to hand value area 84. That is, the player has two pairs, providing a return or award to the player.

Figure 21:
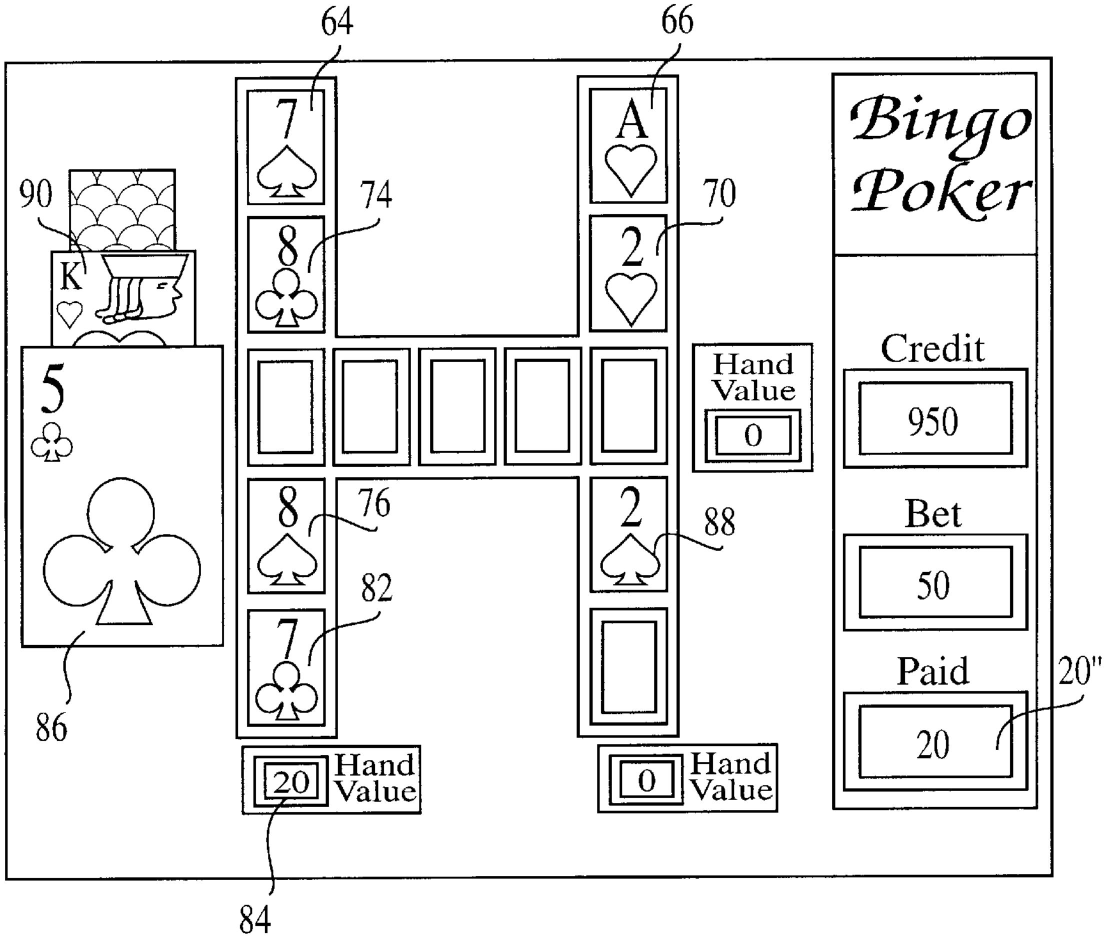
Figure 22:
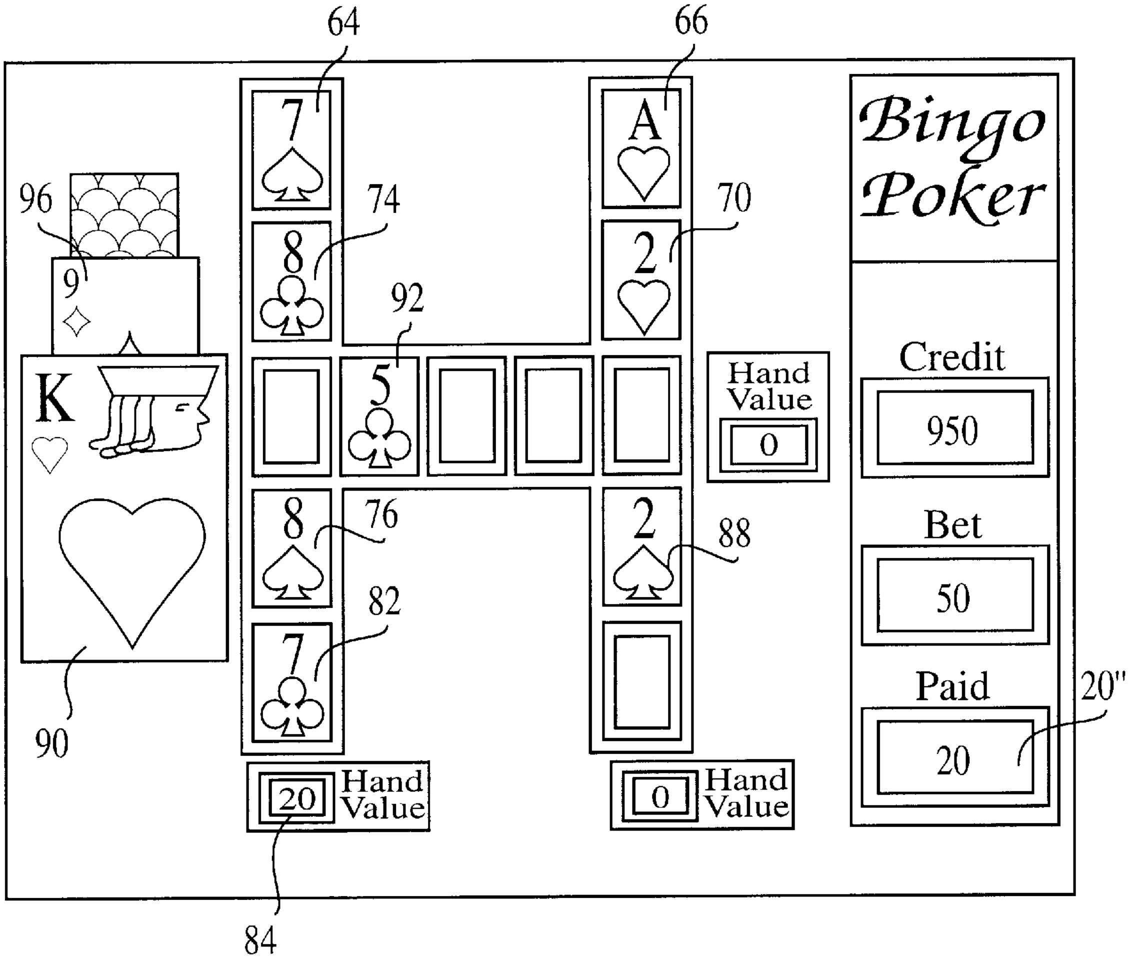
Figure 23:
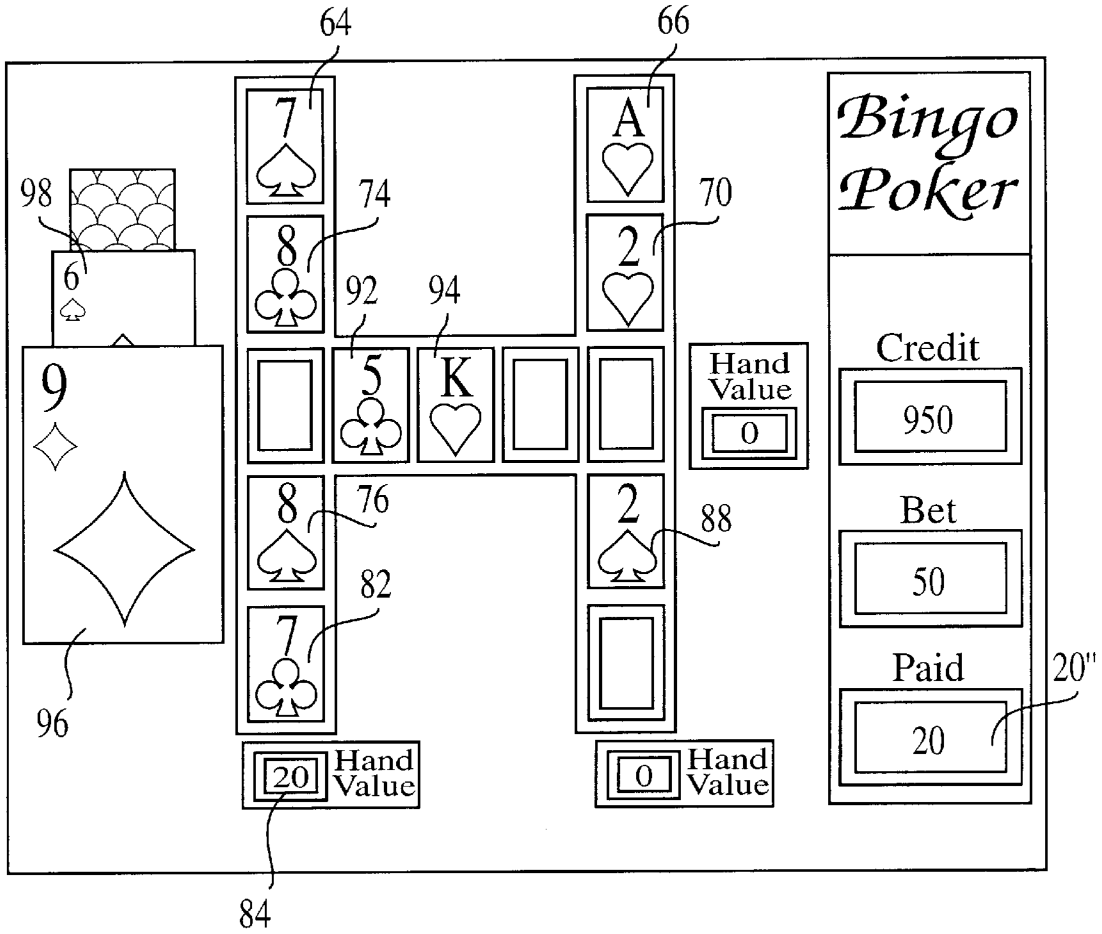

In FIG. 21, the two of spades has been placed in card area 88. The second face-up card 86 illustrated in FIG. 20 has now moved to the first face-up card area, and another second face-up card 90 is displayed. In FIG. 22, the five of clubs has been placed in card area 92. The second face-up card 90 illustrated in FIG. 21 has now moved to the first face-up card area, and another second face-up card 96 is displayed. In FIG. 23, the king of hearts has been placed in card area 94. The second face-up card 96 illustrated in FIG. 22 has now moved to the first face-up card area, and another second face-up card 98 is displayed.

Figure 24:
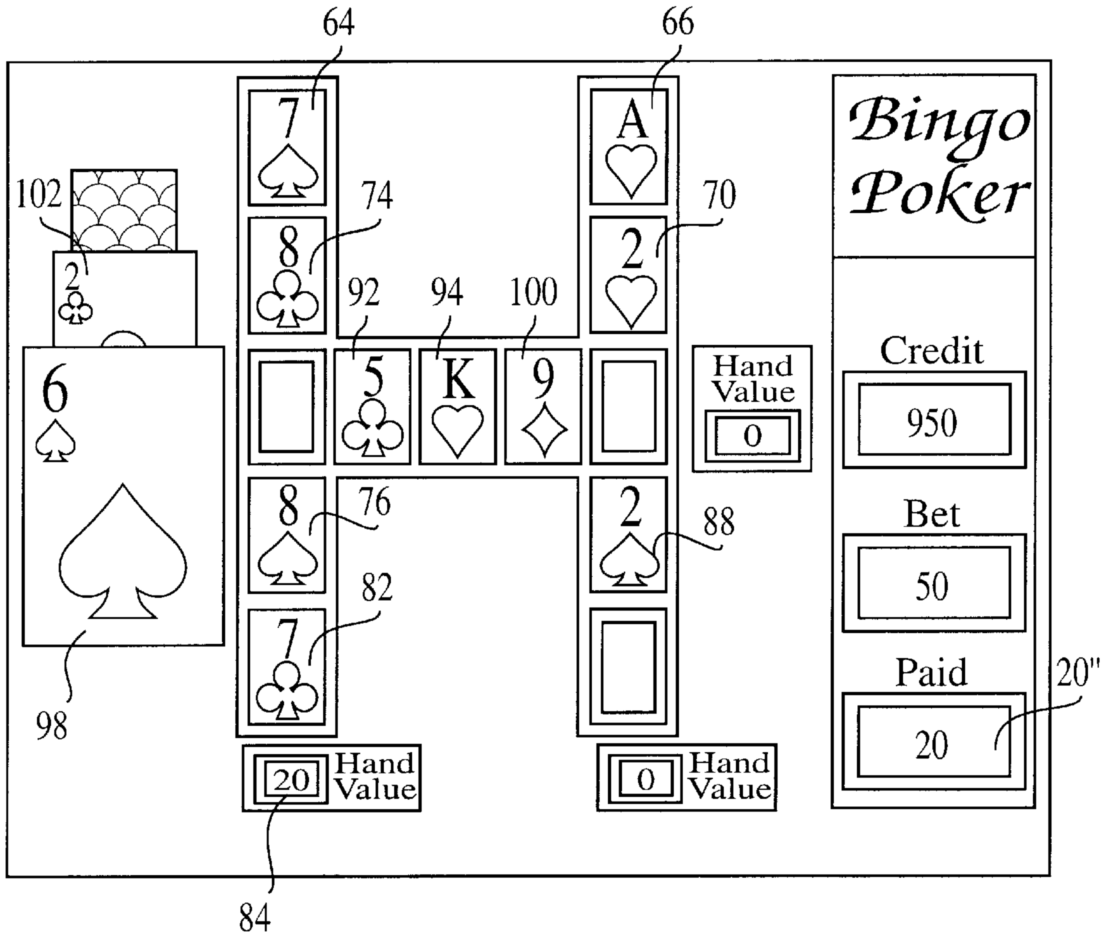
Figure 25:
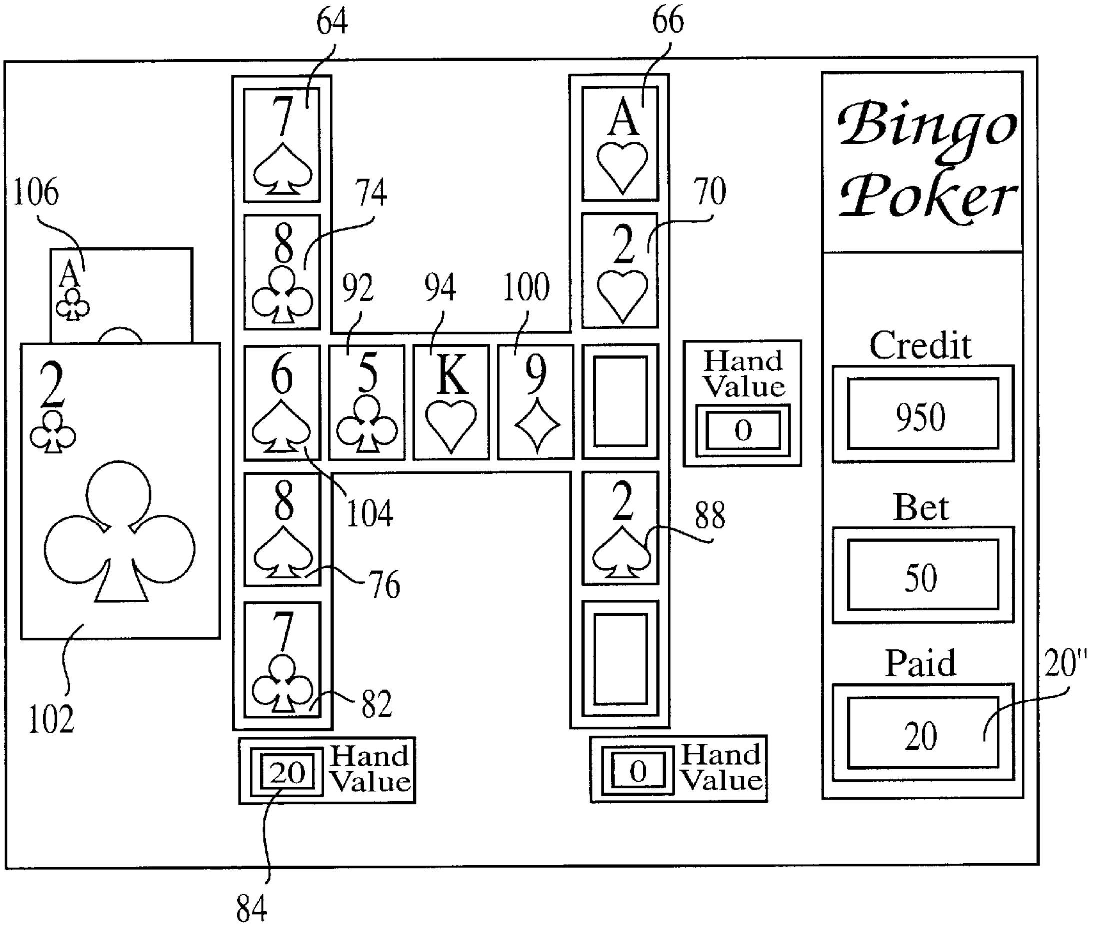
Figure 26:
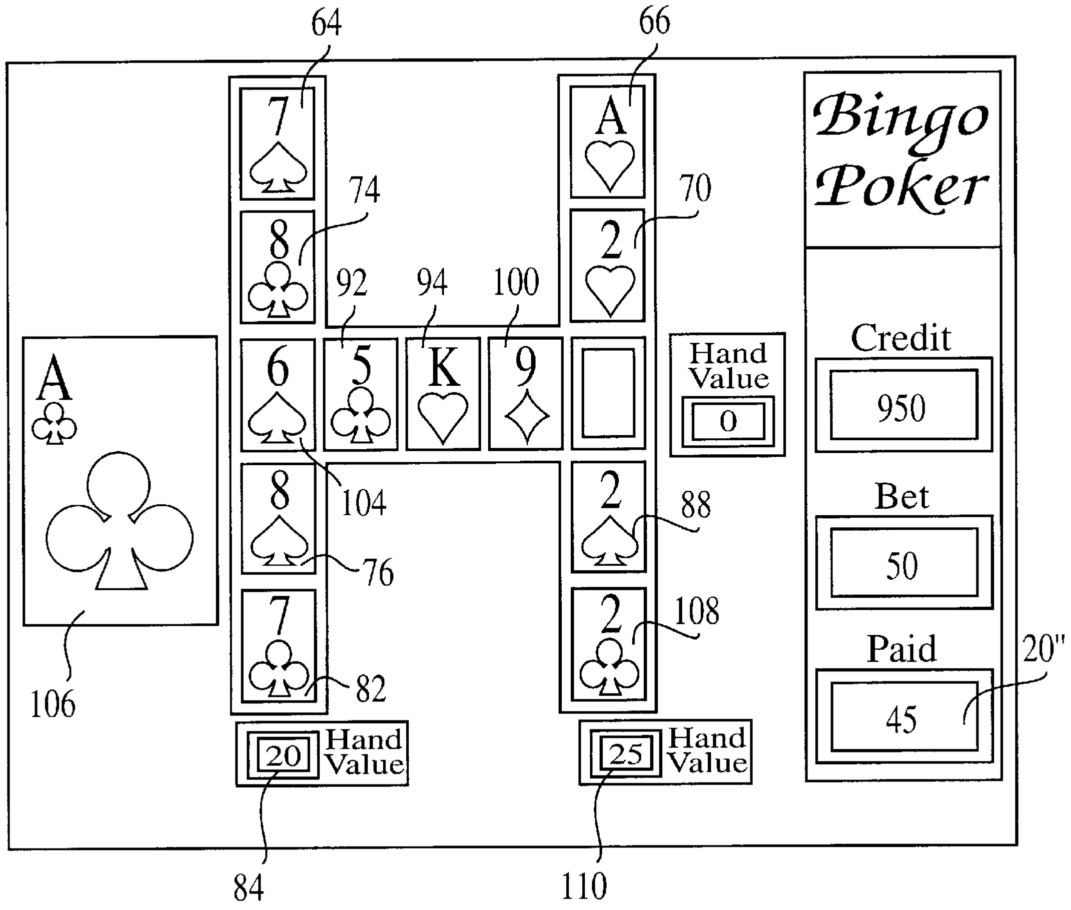

In FIG. 24, the nine of diamonds has been placed in card area 100. The second face-up card 98 illustrated in FIG. 23 has now moved to the first face-up card area, and another second face-up card 102 is displayed. In FIG. 25, the six of diamonds has been placed in card area 104. The second face-up card 102 illustrated in FIG. 24 has now moved to the first face-up card area, and another second face-up card 106 is displayed. In FIG. 26, the two of clubs has been placed in card area 108. The second face-up card 106 illustrated in FIG. 25 has now moved to the first face-up card area, and no other second face-up cards are displayed. Hand value area 110 displays a value of 25 for the combination of three twos in areas 70, 88 and 108. Paid area 20" displays 45 for the combination of values in hand values areas 84 and 110.

Figure 27:
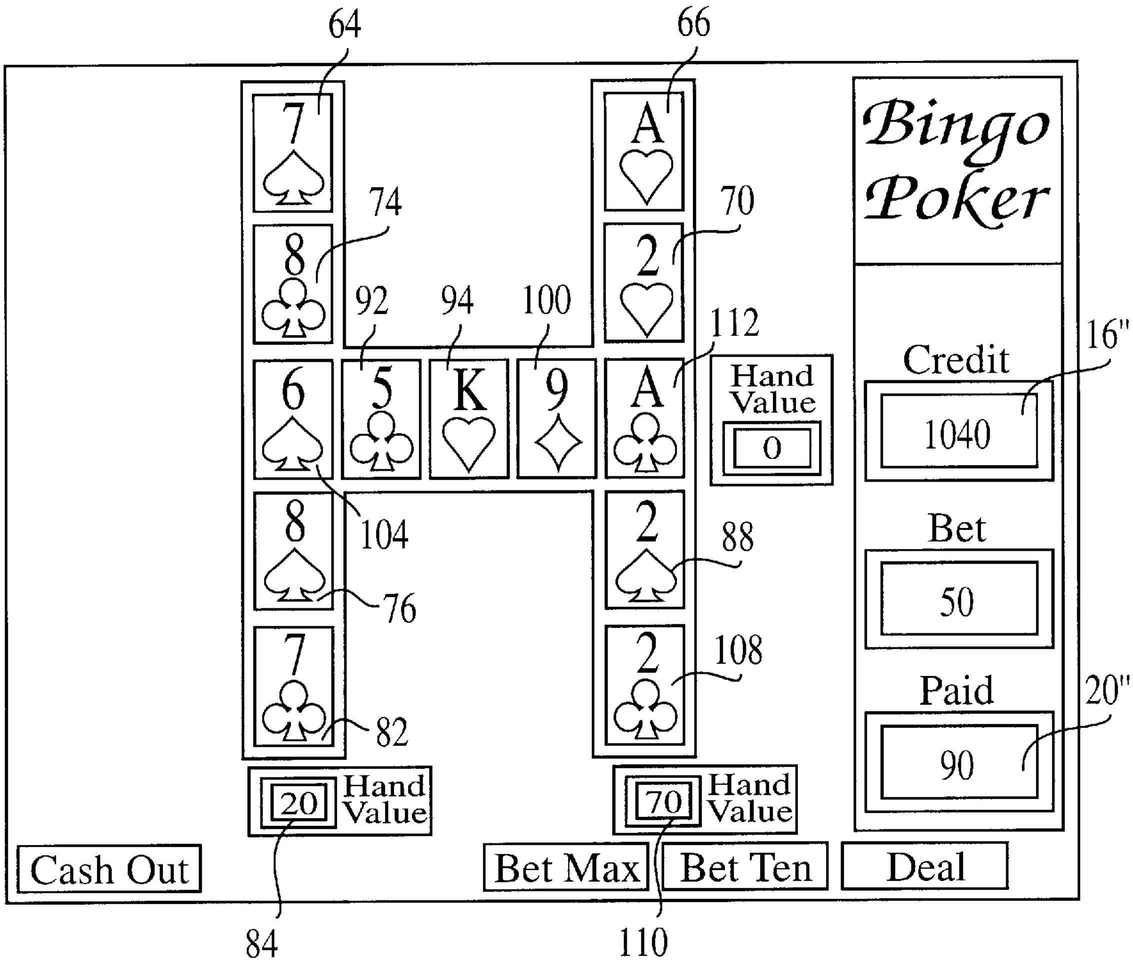

In FIG. 27, the ace of clubs has been placed in card area 112. There are no remaining cards to be placed in the H-hand pattern. Hand value area 110 displays a value of 70 for the combination of three twos in areas 70, 88 and 108a nd two aces in areas 66 and 112. Paid area 20" displays 90 for the combination of values in hand values areas 84 and 110. Credit area 16" displays a total of 1040, being the combination of the awarded 90, and 950 remaining credits after begin of play. Note that in this example no discard area was used. However, as described above, one or more cards may optionally be discarded, depending on the rules of the game being played.

Figure 28:
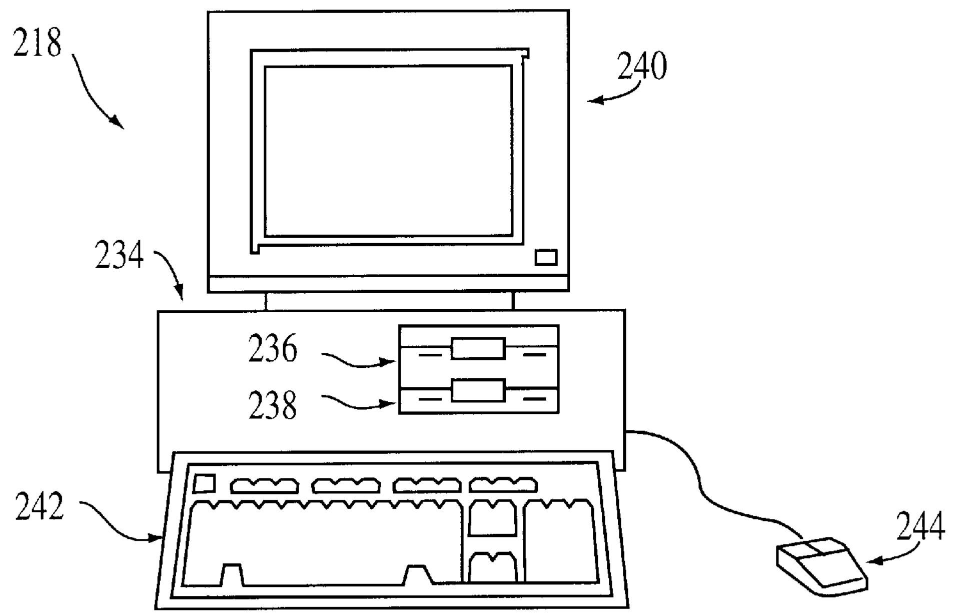
FIG. 28 is an illustration of main central processing unit for implementing the computer processing in accordance with the computer implemented stand-alone embodiment of the present invention.

FIG. 28 is an illustration of main central processing unit for implementing the computer processing in accordance with the computer implemented stand-alone embodiment of the present invention. The detailed descriptions, described above, may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

FIG. 28 is an illustration of main central processing unit 18 for implementing the computer processing in accordance with one embodiment of the present invention. In FIG. 28, computer system 218 includes central processing unit 234 having disk drives 236 and 238. Disk drive indications 236 and 238 are merely symbolic of the number of disk drives which might be accommodated in this computer system. Typically, these would include a floppy disk drive such as 236, a hard disk drive (not shown either internally or externally) and a CD ROM indicated by slot 238. The number and type of drives varies, typically with different computer configurations. The computer includes display 240 upon which information is displayed. A keyboard 242 and a mouse 244 are typically also available as input devices via a standard interface.

Figure 29:
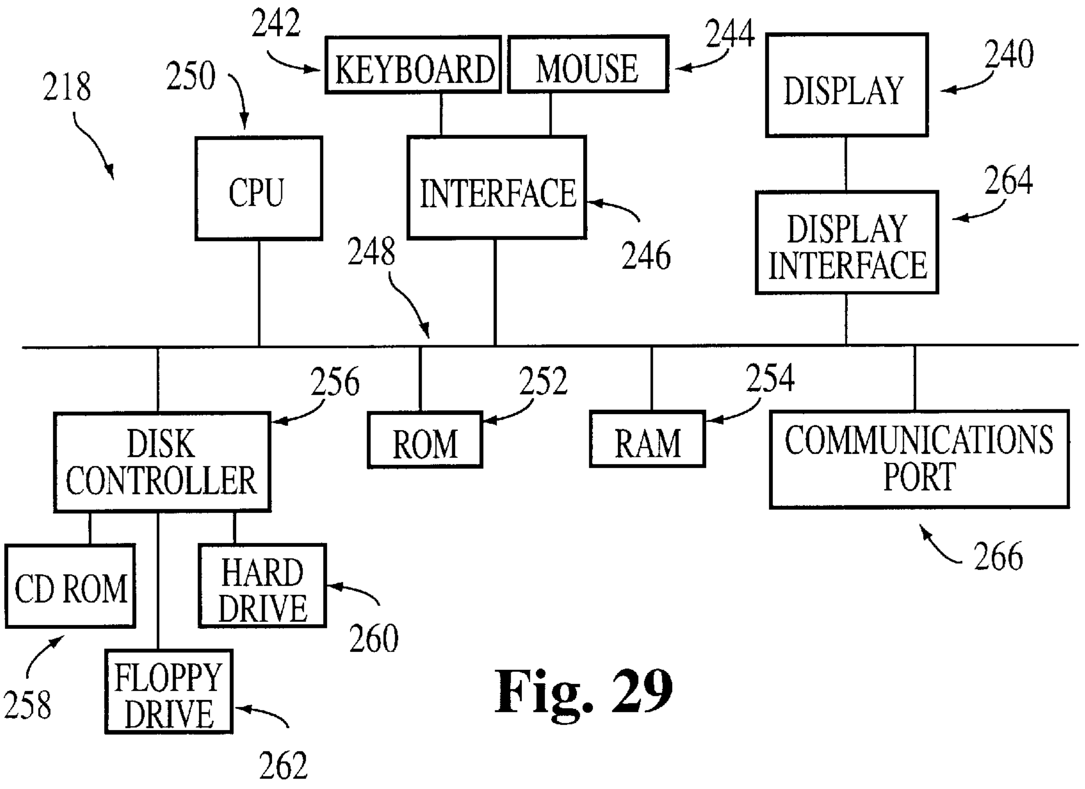
FIG. 29 is a block diagram of the internal hardware of the computer illustrated in FIG. 28.

FIG. 29 is a block diagram of the internal hardware of the computer 218 illustrated in FIG. 28. As illustrated in FIG. 29, data bus 248 serves as the main information highway interconnecting the other components of the computer system. Central processing units (CPU) 250 is the central processing unit of the system performing calculations and logic operations required to execute a program. Read-only memory 252 and random access memory 254 constitute the main memory of the computer, and may be used to store the simulation data.

Disk controller 256 interfaces one or more disk drives to the system bus 248. These disk drives may be floppy disk drives such as 262, internal or external hard drives such as 260, or CD ROM or DVD (digital video disks) drives such as 258. A display interface 264 interfaces with display 240 and permits information from the bus 248 to be displayed on the display 240. Communications with the external devices can occur on communications port 266.

Figure 30:
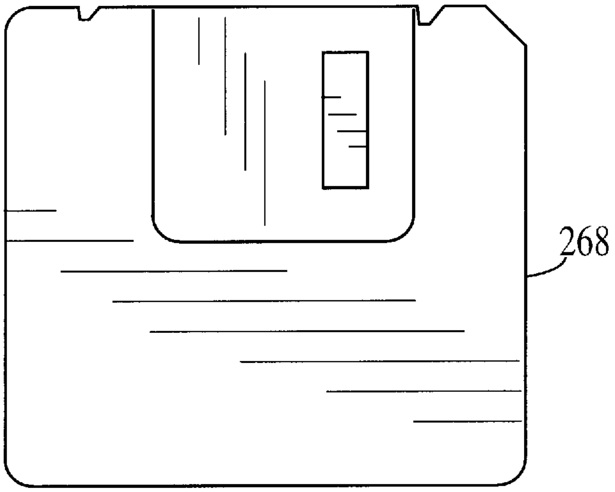
FIG. 30 is an illustration of an exemplary memory medium which can be used with disk drives illustrated in FIGS. 28–29.

FIG. 30 is an illustration of an exemplary memory medium which can be used with disk drives such as 262 in FIG. 29 or 236 in FIG. 28. Typically, memory media such as a floppy disk, or a CD ROM, or a digital video disk will contain, inter alia, the program information for controlling the computer to enable the computer to perform the testing and development functions in accordance with the computer system described herein.

Network Hardware for Games w/Modified Poker Tournament

The system for an interactive network of players being grouped into ranking tournaments, where each player has his/her own electronic console connected to the established network, all of which is controlled through a series of network servers which determine the field for each tournament and which control the play of each game and control the betting and the accounting functions and provide for managerial control consoles and managerial output devices for security and accounting purposes.

Inclusive within the concept of dynamic grouping of players are the following:

That the set of players available to form a tournament is constantly changing.

Players who have just completed a tournament are immediately available for additional play.

Players who have just sat down at an available station and have informed the INRTGS (Interactive Network Ranking Tournament Gaming System) of their GPP (Game Preference Parameters), that is, (a) Game Choice and (b) Game Bet Players who have just completed play and wish to Quit Out of the system—or—to change their GPP (Game Preference Parameters such as tournament play, stand-alone play, and the like).

Players who are currently playing in an ongoing tournament, but the tournament will end before the next tournament that is being formed starts.

The dynamic grouping logic of INRTGS allows for the formation of the largest tournaments possible—within pre-established tournament setup time constraints. The fundamental constraint of the dynamic grouping logic is that no player should wait more than a limited and casino specified time before playing—for example, 20 seconds. For the benefit of the casino and the players the game duration is minimized by:

Using the optimum hardware available, that is, very high speed workstations and very powerful network servers with fiber-optic links. Touch Screens are used throughout INRTGS. Note the scope of this invention is not in any way limited to the hardware configurations described herein. If at any time in the future, because of new technology, faster processing becomes available then the use of that technology is not precluded from the scope of this invention.

Time Bar constraint displays will clearly notify players to speed up their play or suffer the consequences of a possible tournament forfeit or automatic play by the gaming station.

Game Flow Overview for Network Hardware and Computer Implemented Process

Figure 31:
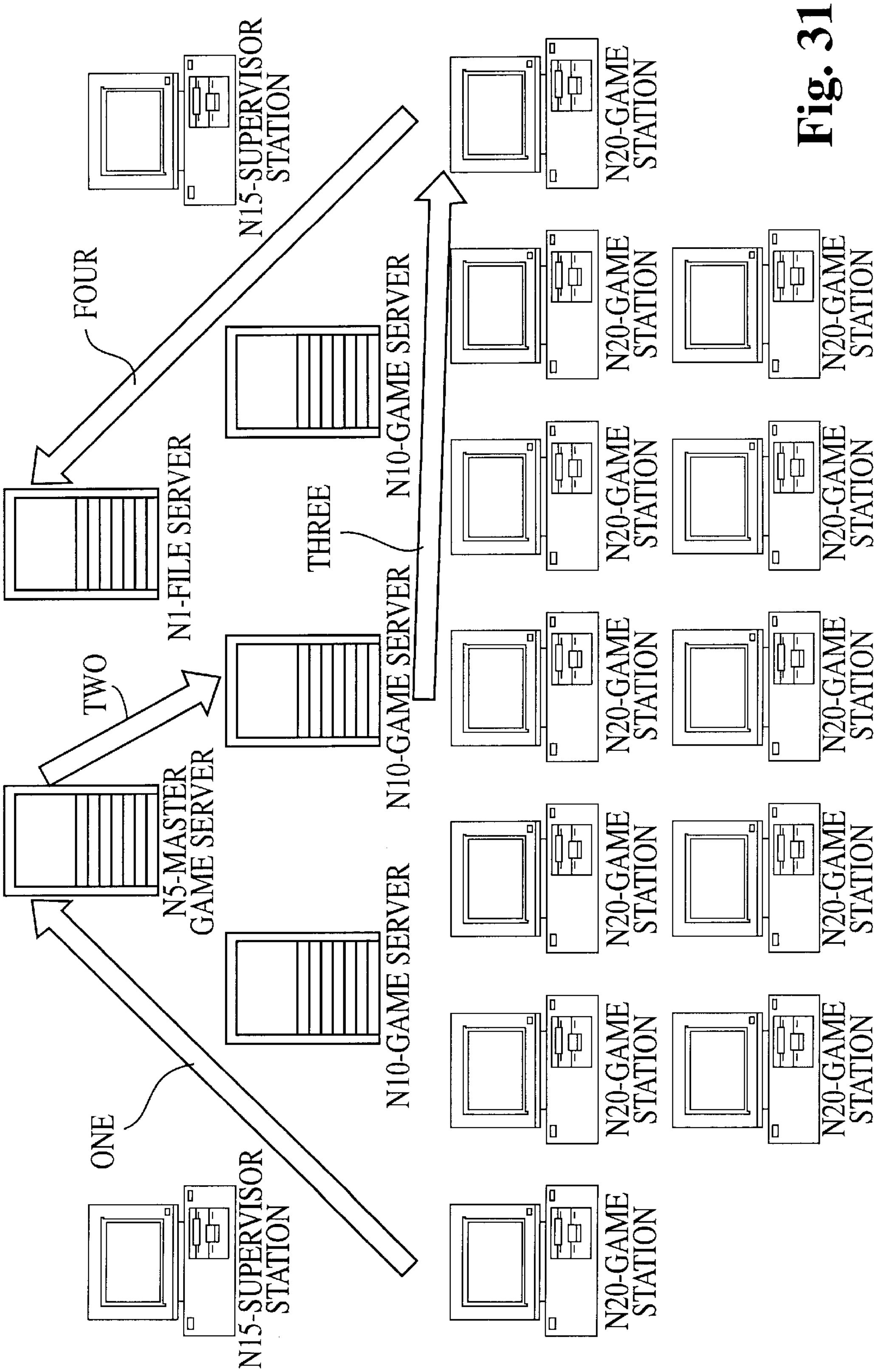
FIG. 31 is a block diagram of the computer architecture in accordance with the network casino embodiment.

One example of a game that is suitable for the network casino environment is the above described modified poker tournament game. The following discussion relates to FIG. 31 for the hardware configuration of the network casino:

N1. File Server

Location: In Control Room.

Hardware: Pentium based Compaq Rack Mount Server System with Mirrored Servers via a fiber link and standby hot-spare.

Operating System: Novell Netware 4.1 SFT.

Function: Central file storage for all stations. The file server is where all data is written to, all current game situations are stored and the central validation point for all connections.

N5. Master Game Server.

Location: In Control Room.

Hardware: Pentium based Compaq Rack Mount Server System with standby hot-spare unit.

Operating System: Microsoft Windows NT 3.51 Advanced Server.

Function: Establish sessions between idle stations, finds another game station within any game server domain and joins the game stations in a session.

N10. Game Servers.

Location: In Control Room.

Hardware: Pentium based Compaq Rack Mount Server System with standby hot-spare unit.

Operating System: Microsoft Windows NT 3.51 Advanced Server.

Function: Controls a domain (group of game stations). A game server is the "scorekeeper" of each game in progress. The game server controls the start, play, end and payout of each game in its domain. The game server does not determine the participants. That function is controlled by the Master Game Server (N5).

N15. Supervisory Stations.

Location: On Casino Floor.

Hardware: Pentium Based Compaq Desktop Unit.

Operating System: Microsoft Windows NT 3.51 Workstation.

Function: To monitor games in progress, allow supervisor to check game flow, receive message from monitoring hardware in case of malfunction or user help request. A supervisory station monitors games for circumstances such as unresponding players, unusually large game in progress or other issues regarding the continuation of play.

N20. Gaming Stations/Slot Machines

Location: On Casino floor.

Hardware: Pentium Based Compaq Desktop Unit in Kiosk Cabinet with Touch Screen.

Operating System: Microsoft Windows 95

Function: Actual play station for participating in a game.

1. Gaming Stations/Slot Machines (N20) ask Master Game Sever (N5) for a "request to participate".

2. Master Game Server (N5) assigns Game Station (N20) to a Game Server (N10) for a "session start".

3. Supervisory Station (N15) is informed of a new game forming and its participating stations.

4. Game Server (N10) ends further participation and a "begin game" is initiated between all participating Game Stations (N20).

5. Supervisory Station (N15) is informed of a new game starting and its participating stations.

6. As play progresses, all "moves" by games stations are recorded to the File Server (N1).

7. Supervisor Station (N15) is kept informed of any unusual circumstances or malfunctions in system.

8. Upon game completion, Game Server (N10) disconnects all participants from closed game "and session".

9. Return to step 1 for new game.

One form of software that may be used and modified to implement the modified poker tournament is found in provisional patent application, entitled INTERACTIVE GAMBLING CASINO SYSTEM to Howard M. Marks et al. filed on Feb. 13, 1996, Ser. No. 60/011,574, or in provisional patent application, entitled PICK 'EM POKER TOURNAMENT GAME AND INTERACTIVE NETWORK COMPUTER SYSTEM FOR IMPLEMENTING SAME to Anthony M. Singer, et al., filed on filed Jun. 14, 1996, Ser. No. 60/019,747, the details of which are incorporated herein by reference. The software included in U.S. provisional patent application Ser. No. 60/031,984, filed Nov. 29, 1996, incorporated herein by reference, or the software included in the Appendix herein, may be used to implement the modified poker game described herein in conjunction with the network implementation.

Figure 32:
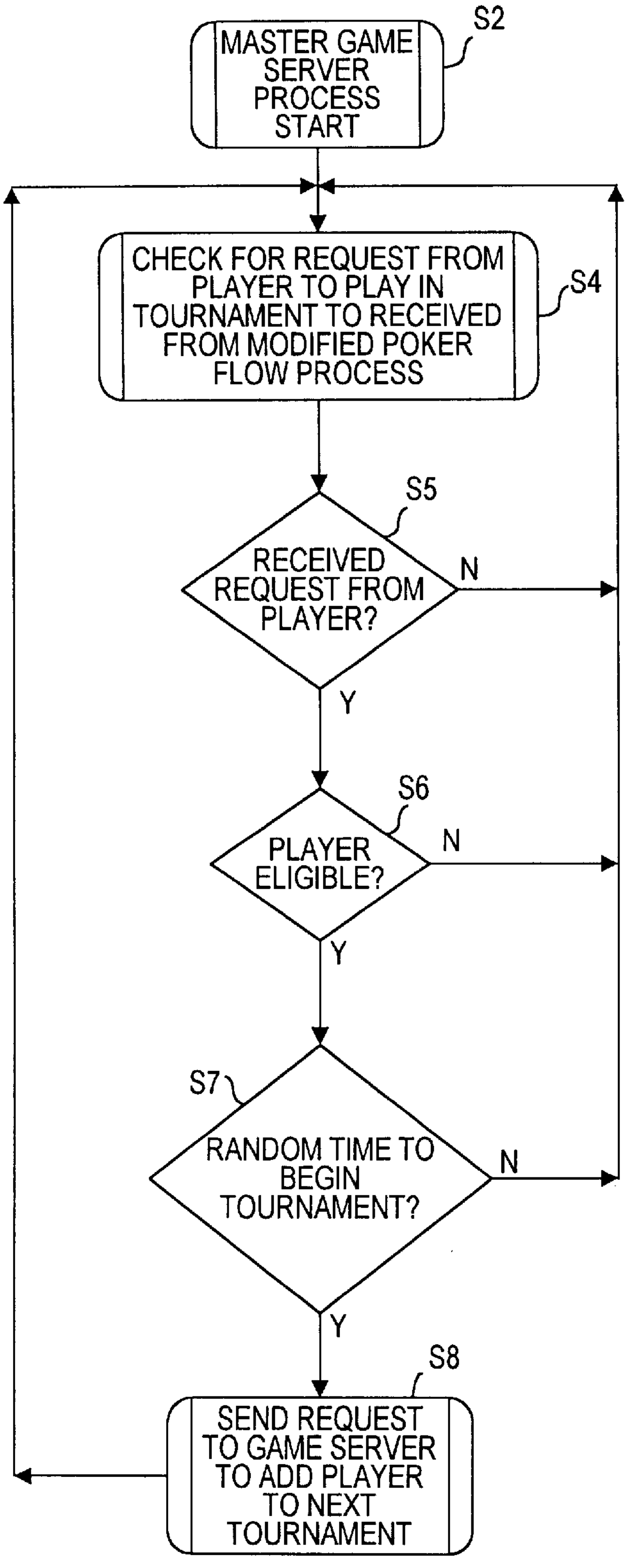
FIGS. 32–37 are flowcharts of a computer implemented process implemented by software for the modified poker tournament competition.

Alternatively, any standard software may be designed to handle or interact with the specific program flows and screen displays illustrated and described in detail below in connection with FIGS. 32–37. FIG. 32 is a flow chart of the master game server process in the modified poker tournament game system which begins at Step S2. The master game server process, via the master game server computer N5, checks in Step S4 for requests from players to play in a modified poker tournament game which is received from a modified poker tournament process flow described in detail in FIGS. 35–37. Master game server computer N5 then determines whether or not the request from a player has been received to join a tournament in Step S5.

If no request has been received from a player, then the master game server computer N5 continues to monitor the presence of such a request that is received from the modified poker tournament process flow and game station computer N20. If the master game server computer N5 determines that a request has been received from a player to join the modified poker tournament in Step 5, the master game server computer N5 determines whether the player is eligible to join the tournament in Step S6, and whether the random time to begin the tournament has been reached in Step S7. If the result for both Steps S6 and S7 is yes (of course, other combinations of predetermined criteria can also be used), the master game server computer N5 sends, in Step S8, a request to the game server computer N10 to add this player to the next tournament by sending such a request to the game server process flow which is described in detail in FIGS. 33–34. After sending the request to the game server computer N10, the master game server computer N5 then returns the flow of the master game server process back to Step S4 where the master game server N5 checks for a request from another player to join the modified poker tournament.

Figure 33:
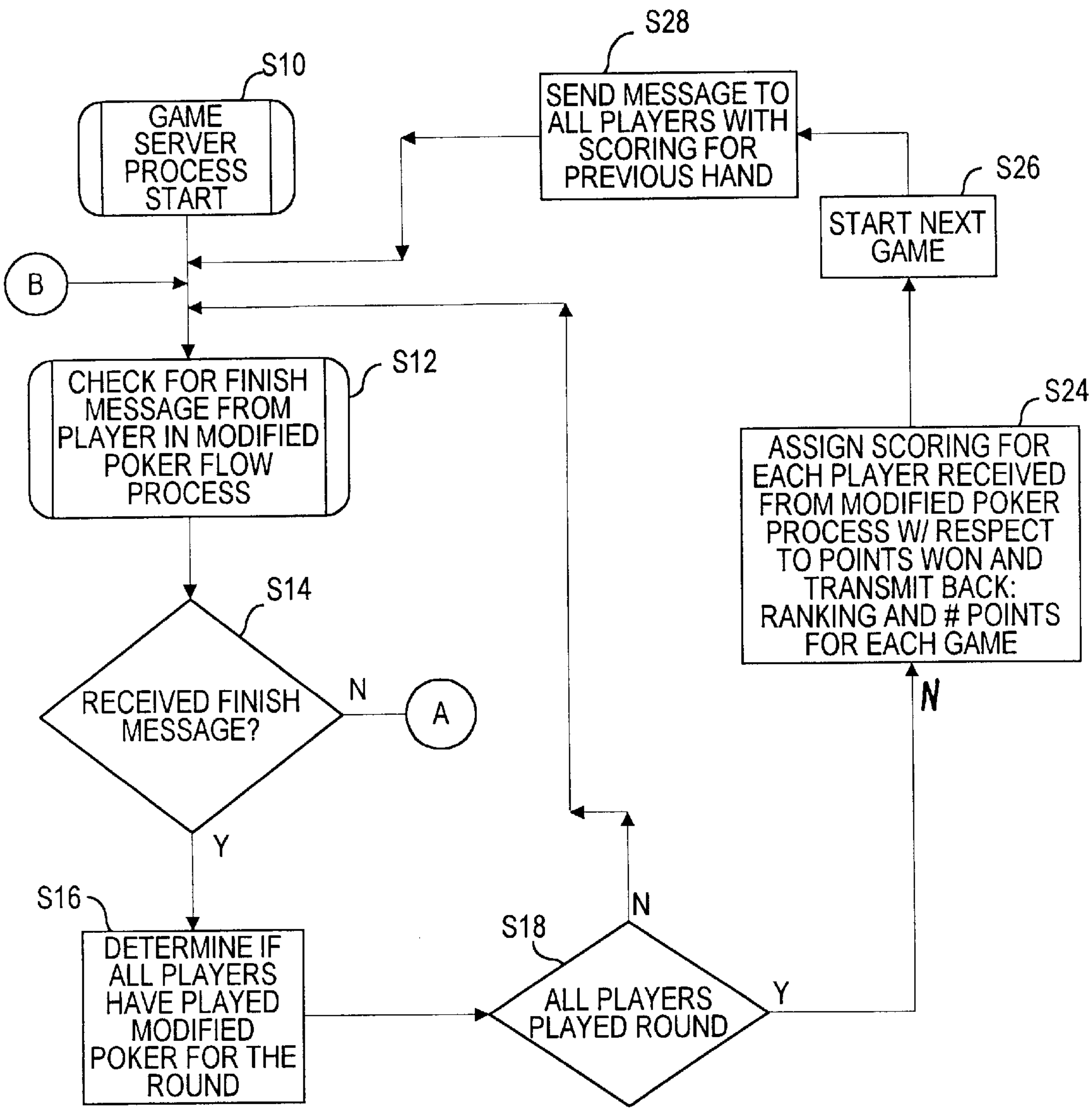
Figure 34:
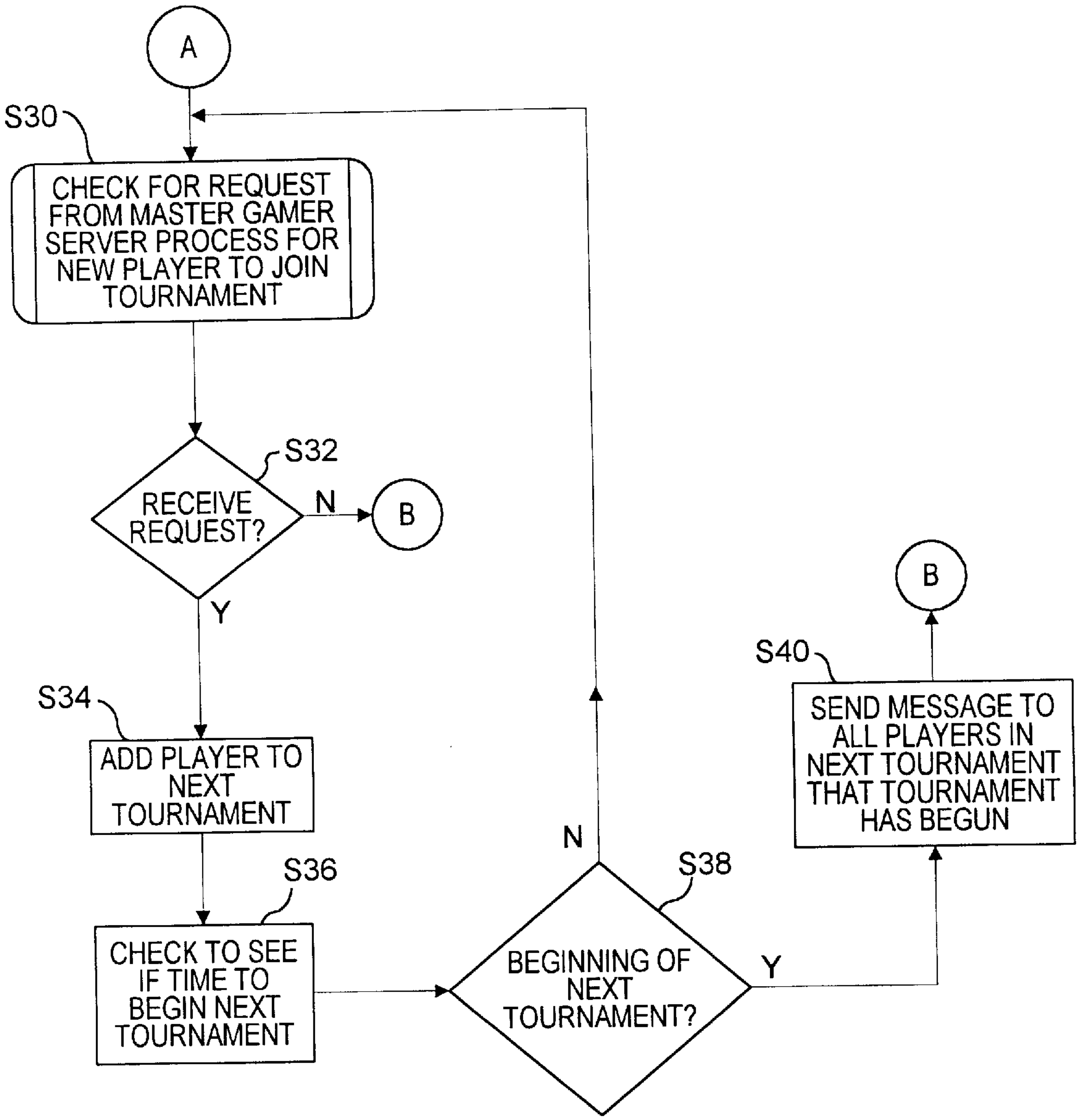

FIGS. 33–34 are flow charts of the computer implemented process for the game server process utilized by the game server computer N10. In FIG. 33, the game server process starts at Step S10. The game server computer N10 checks or determines whether the modified poker game finish message has been received from the player via the modified poker tournament process in Step S12. The game server computer N10 accomplishes this function by interfacing with the game station computers N20 which are implementing or running the modified poker tournament process flow, i.e., the basic game process for the modified poker tournament game. Game server N10 then determines whether the game finish message has been received from the modified poker tournament process in Step S14, and if so, determines if all players have finished the current round of the modified poker tournament game in Step S16.

Game server computer N10 then determines whether all players have played the round/game in Step S18, and if not, continues to monitor the situation until all players have picked a card for the current round of play of the modified poker game. If game server computer N10 determines that all players have played the game in the current round in Step S18, then the game server computer N10 assigns a specific number of points that have been won by each player for tournament purposes.

The game server computer N10 then transmits back to the modified poker tournament process a ranking and number of points for each game which is applicable for the tournament competition in Step S24. The game server computer N10 next prepares to start the next modified poker tournament game for the next tournament in Step S26. The game server computer N10 also sends a message to all players of the tournaments with the scores/points for the completed games in the tournament in Step S28.

The game server computer N10 also sends the next two cards, i.e., the card that was in the second position moves to the first position, and a new card is placed in the second position if the option that the player is allowed to view the current and next card is used for the modified poker game, for the first round of the next game in the modified poker tournament for the players to select in Step S28, assuming all games have not been played in the tournament.

Of course, if no additional cards are to be viewed by the player, then only one card is sent by the game server computer N10, and if more than one card is to be viewed, then more than one card may be sent. Control of the game server process flow is then returned to the beginning of the game server process to continue the monitoring and administering of each of the individual rounds for the modified poker tournament process.

If the game server computer N10 does not receive a finish message in Step S14, then the game server computer checks or requests from the master game server process and master game server computer N5 to determine whether a new player wants to join the tournament in Step S30. If no request is received from the master game server computer N5 to add a new player to the tournament in Step S32, then control reverts back to the beginning of the game server process. On the other hand, if a request is received from the master game server computer N5 to add a player in Step S32, then the game server computer N10 adds a player to the next tournament in Step S34, and also checks to see if it is time to begin the next tournament in Step S36.

If it is not time to begin the next tournament which is determined by the game server computer N10 in Step S38, the control of the game server process reverts to Step S30 where the game server computer N10 checks for requests received from the master game server computer N5 for adding a new player to the tournament. If it is time to begin the next tournament as determined by the game server computer N10 in Step S38, then the game server computer N10 sends a message to all players that have now joined this current tournament that the tournament is now beginning at Step S40. Control for the game server process flow is then returned to the beginning of the process so that the game server computer N10 continuously monitors when the next tournament is forming and coordinates and/or administers the formation of the next tournament.

Figure 35:
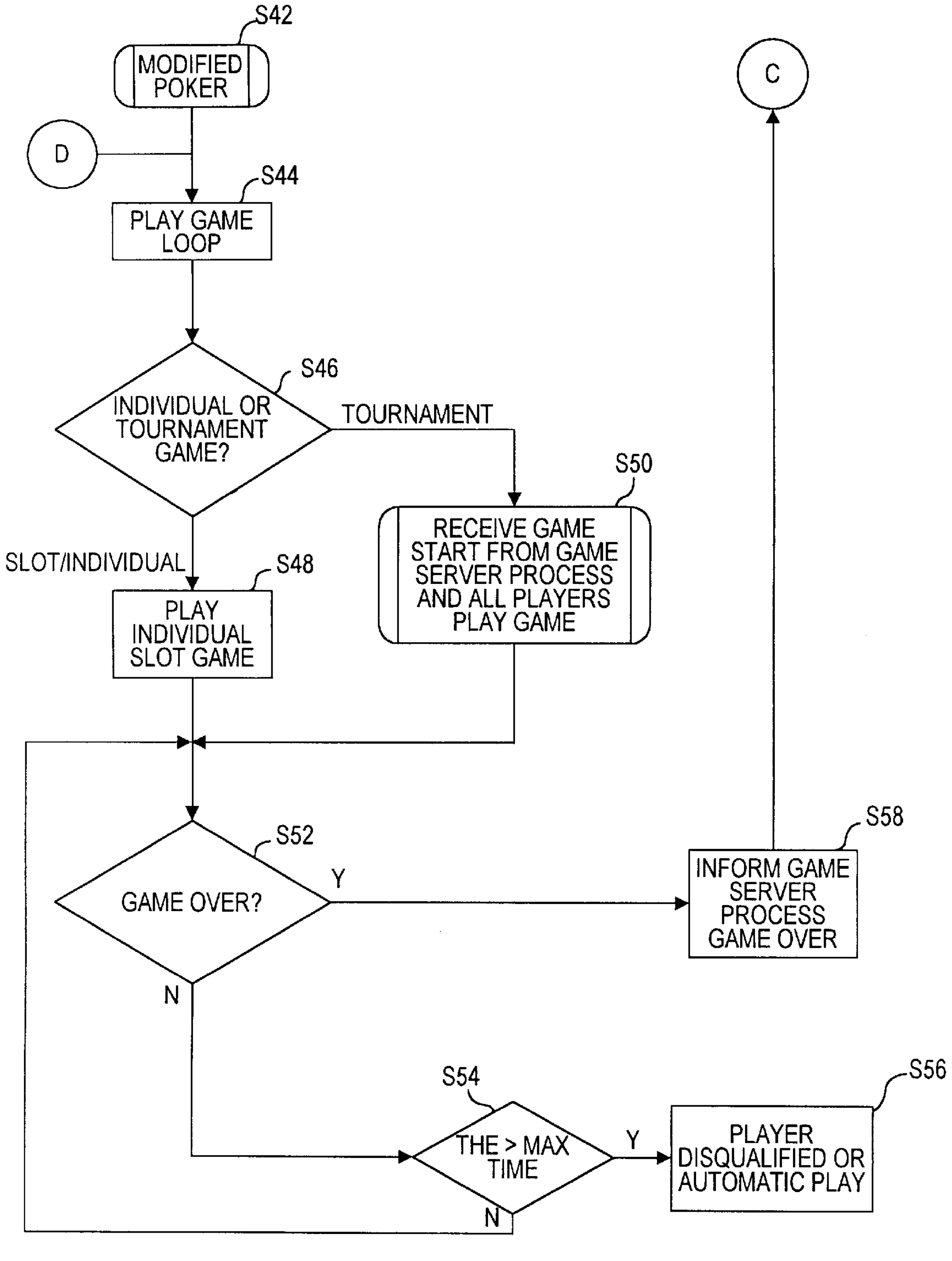
Figure 36:
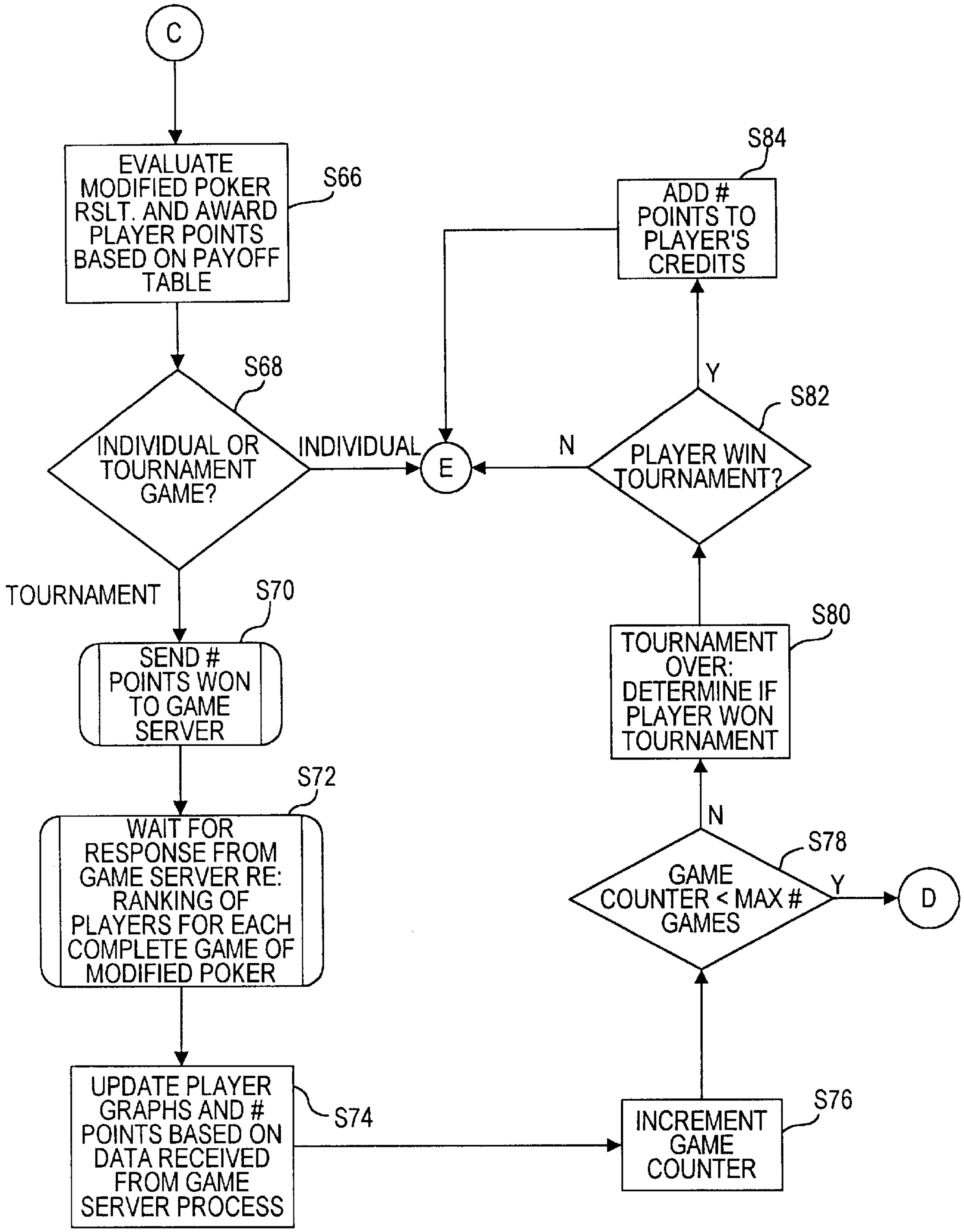
Figure 37:
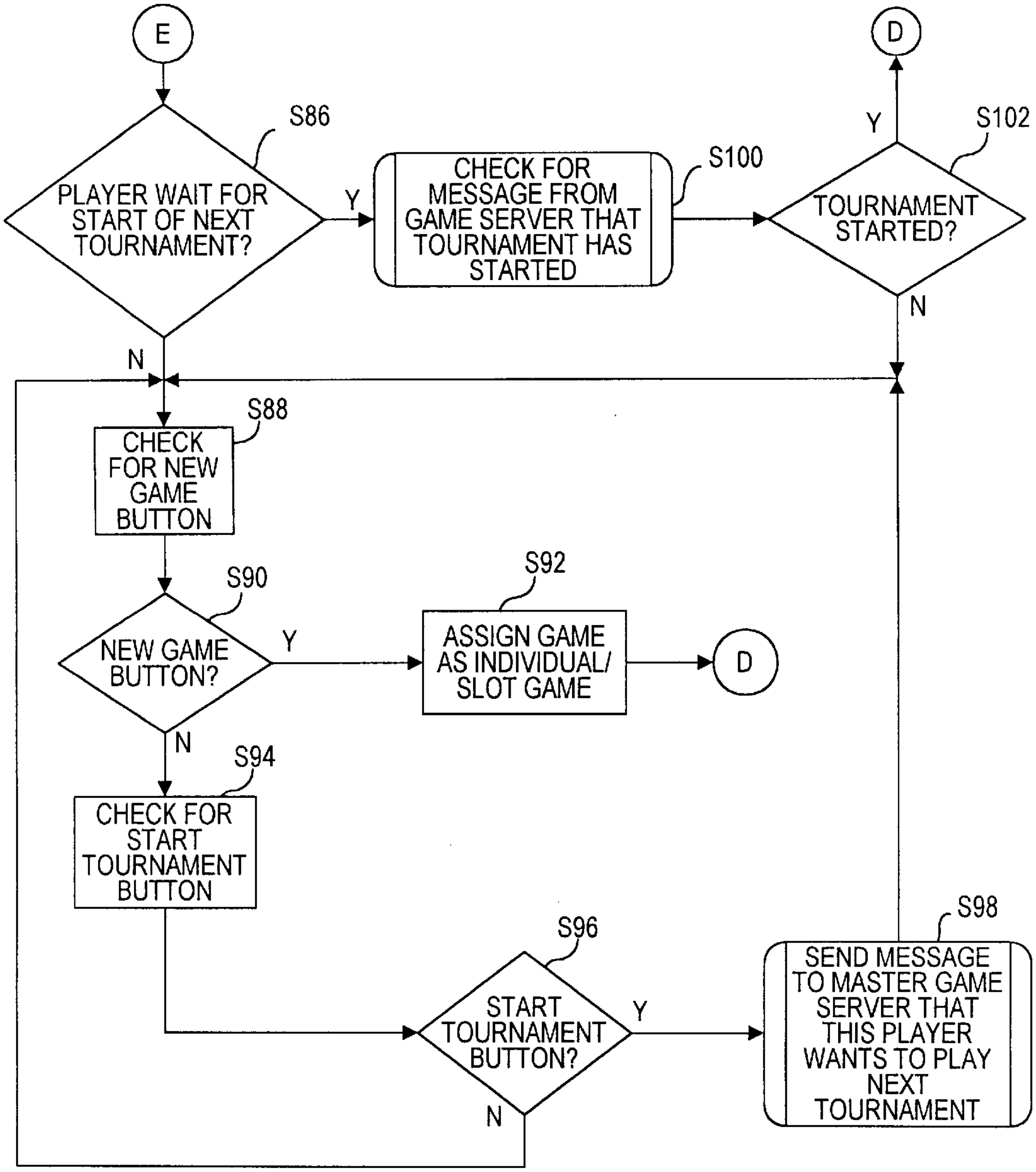

FIGS. 35–37 are flow charts of the modified poker tournament process which is implemented by the individual game stations N20. In FIGS. 35–37, the modified poker tournament process begins at Step S42. The game server station N20 then begins the process of initiating the next modified poker tournament game in Step S44. Prior to actually starting each round of the modified poker tournament game, the game station N20 determines whether a normal game of modified poker tournament is desired (i.e., a modified poker game where the player is playing against the house or game station computer N20) or whether the player has requested to be part of a modified poker tournament game in Step S46.

If the player has requested to be part of a regular modified poker tournament game and requested to play against the house, then the game station N20 initiates the modified poker game in Step S48. If on the other hand, if a player has requested to be part of a tournament in Step S46, then game station N20 coordinates with all the game server computers N10 to play the modified poker game for each player the tournament in Step S50.

Alternatively, the player may also have the option of playing both the individual and tournament games simultaneously (not shown in the flowchart). In the situation where the player is playing an individual game alone, or playing the modified poker tournament simultaneously with an individual game, the modified poker tournament system automatically compensates the player at the normal payoffs for the individual game. This then prevents the modified poker operator/casino from losing heavily if the player is playing the tournament competition at greatly enhanced odds to add to the excitement of the tournament by permitting the players to accumulate a large number of points.

The game station computer N20 then determines whether all players have played the modified poker game in Step S52, and if not, determines whether a predetermined period of time has been exceeded which has been allocated for the player to play the game in Step S54. If the predetermined period of time has not been exceeded in Step S54, then game station computer N20 continues to monitor whether all players have completed the modified poker game.

If the predetermined period of time has been exceeded in Step S54, then game station computer N20 will either disqualify the player or automatically play the modified poker game in Step S56. Game station computer N20 will inform the game server computer N10 after the modified poker game has been completed in Step S58. Once all players have completed their games for the current round of the modified poker tournament, the game station computer N20 evaluates the modified poker result and awards the player the appropriate points based on a predetermined pay-off table which is utilized to determine whether the player's game was successful or not in Step S66.

The game station computer N20 then determines whether or not the current game which is being played by the player is for the normal or tournament game in Step S68, and if it is a tournament game, game station computer N20 sends the number of points that have been won by the player for this round of the modified poker tournament to the game server computer N10 in Step S70.

The game station computer N20 then waits for a response from the game server computer N10 in Step S72. The response from the game server computer N10 involves the specific ranking of players for each complete game of modified poker tournament. That is, the game server computer N10 determines the appropriate ranking for all the players of the tournament as each round of the tournament progresses, until completion of the tournament.

Based upon the response from the game server computer N10, the game station computer N20 then updates the player graphs and number of points for the tournament's competition for each of the players based on the data that is received from the game server computer N10 in Step S74 for each round of play. The game station computer N20 then increments the game counter S76, indicating that a round of play has been completed, and then determines whether the game counter is less than the maximum number of games in Step S78 for the tournament.

If the game counter is less than the maximum number of games in Step S78, then control of the modified poker tournament process reverts back to the beginning to the game loop/routine in Step S44 to prepare and execute the next round or game for the modified poker tournament competition. If the game counter is not less than the maximum number of games, i.e., all games in the tournament have been played by the players and have been completed, then the game station computer N20 determines that the tournament is over and also determines if the player has won the tournament based upon data that has been received from the game server computer N10 in Step S80.

If the game station computer N20 determines that the player has won the tournament in Step S82, then game station computer N20 adds points to the player's credit in Step S84. After adding points to player credit in Step S84, or if the player has not won the tournament in Step S82, the game station computer N20 determines whether the player is waiting for the start of the next tournament in Step S86. If the game station computer N20 determines that the player is not waiting for the start of the next tournament, then the game station computer N20 checks for the activation of the new game button in Step S88 and determines whether either this button has been activated in Step S90.

If game station computer N20 determines that the new game button has been activated in Step S90, then game station computer N20 assigns the modified poker tournament game as a normal or individual modified poker game in Step S92, and reverts control to the beginning of the modified poker tournament process Step S42 for implementation or execution of an individual game for the player. In this situation, where the player is playing an individual game alone (or also while playing the modified poker tournament simultaneously with an individual game), the modified poker tournament system automatically compensates the player at the normal payoffs for the individual game. This then prevents the modified poker operator from losing heavily, if the player is playing the tournament competition at greatly enhanced odds to add to the excitement of the tournament by permitting the players to accumulate a large number of points.

If game station computer N20 determines that the new game button has not been activated in Step S90, then the game station computer N20 checks for activation of the start tournament button in Step S94, and determines if the button has been activated in Step S96.

If the start tournament button has not been activated in Step S96, then the modified poker tournament process is reverted to Step S88 for continuously checking whether the player has decided to play the next game either as a tournament or individual game. If game station computer N20 determines that the start tournament button has been depressed, then game station computer N20 sends a message to the master game server N5 that this player wants to play the next tournament in Step S98 and control then reverts back to Step S88 where game station computer N20 determines whether the new game button has been depressed or activated.

If the player has agreed to wait for the start of the next tournament as determined by game station computer N20 in Step S86, then game station computer N20 checks for a message from the game server computer N10 indicating that the tournament has started in Step S100. If the game station computer N20 determines that the tournament has not started in Step S102, then control reverts back to step S88 where the game station computer N20 determines whether the new game button has been depressed.

If the game station computer N20 determines that the tournament has started based upon the message received from the game server computer N10 in Step S102, then control of the modified poker tournament process is reverted back to the beginning of the process for starting the tournament modified poker games to each of the players that have been assigned to a particular tournament in Step S44.

Advantageously, any number of players can enter the tournament. If the tournament is large enough, then some percent of the players may qualify for the semi-finals or finals. All prizes come from the jackpot entry bets made by the players. The house can also take a cut or fee for running the tournament.

Figure 38:
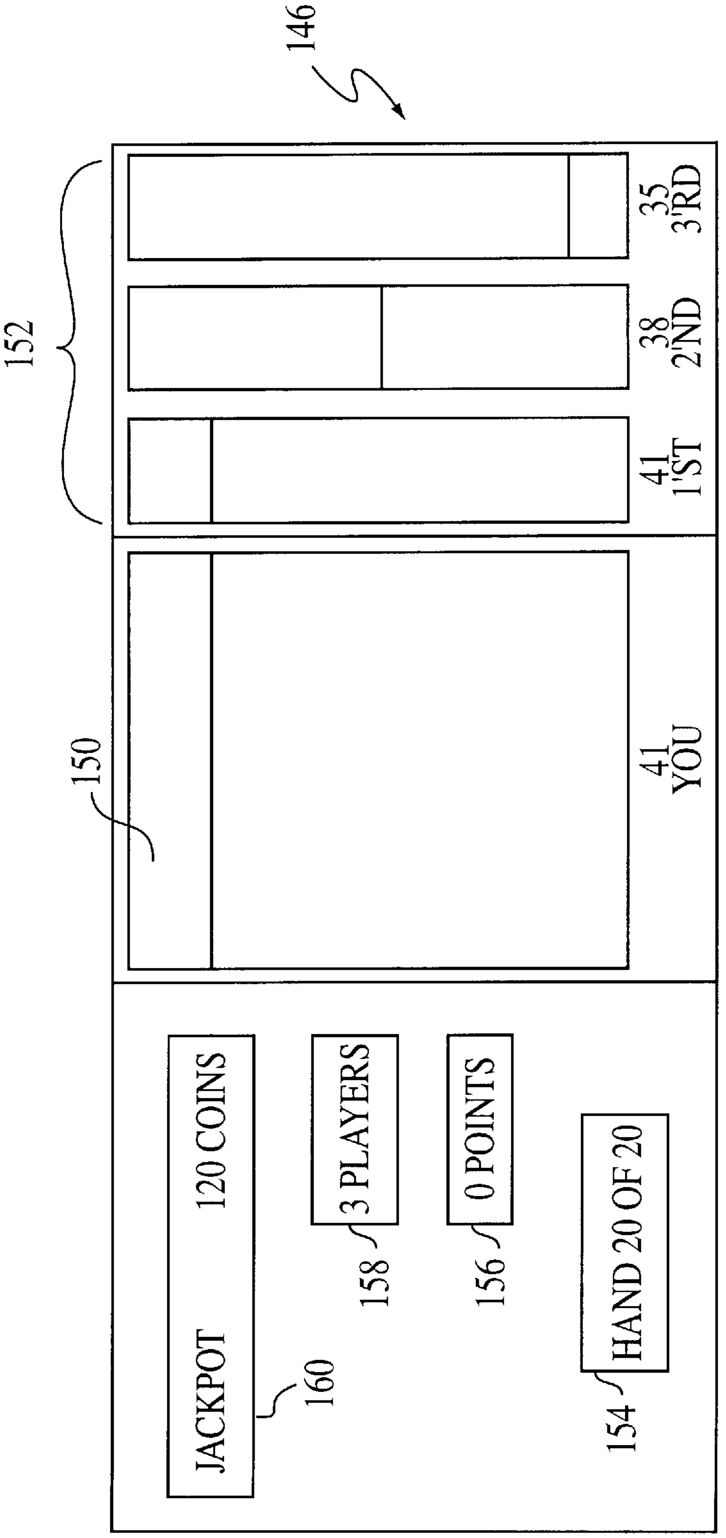
FIG. 38 is the enhanced screen display utilized in the modified poker tournament game.

FIG. 38 is the enhanced screen display 146 utilized in the modified poker tournament game. The main screen 146 for the modified poker tournament game is illustrated in FIG. 38. The modified poker tournament version begins with the person having, for example, 0 points. After the player indicates a desire to play the tournament version, and the player is judged to be eligible, and it is further determined that the tournament is starting within a pre-specified eligibility time period, the modified poker game system notifies the player that the tournament is forming and that the player must wait until a sufficient number of other players have requested the tournament modified poker tournament game.

After requesting to play the tournament game, and after a predetermined number of players have joined the tournament game, the computer process will instruct all of the registered players that the tournament has begun. The computer process will then instruct the players to begin playing the modified poker games to accumulate points for winning the tournament, as described above.

In FIG. 38, the player is displayed on graphical screen 146, their own current score in the large bar graph area 150, and either the top three competitive scores in area 152, or optionally all other player scores in area 152. Area 152 then graphically represents the performance of other players in the tournament for easy comparison with the player whose score is exhibited in area 150. Note that in FIG. 38, the players score is graphically shown in area 150, as well as in the first bar graph of area 152 since the same number of points are illustrated in both areas by the shading levels of the bar graphs. That is, the horizontal line that extends across the bar graph at different levels also graphically represents the accumulated points of the players associated therewith.

Area 154 illustrates the number of games or rounds that have been played, as well as identifying the remaining rounds of play. Area 156 identifies the total number of points that the player has been award for a particular game of play, and area 158 designates the total number of players in the modified poker tournament competition. Finally, area 160 designates the jackpot available for the current modified poker tournament.

Thus, the above description illustrates the exciting aspects of the modified poker tournament game. The central computer (game server computer N10), if the player elects to participate in the tournament, will request the player to initiate the modified poker game at substantially the same time. Each player must play the modified poker game simultaneously or within a few seconds so that no player is ever out of sync of the tournament.

The computer (i.e., game station computer N15), will optionally automatically choose for the player should the player be unable to decide, or perhaps disqualify the player. The default is set at approximately three seconds. The default could be as much as five seconds, or less than three seconds.

In accordance with the tournament version of the modified poker game, all players are shown a "Hand Pattern." (There are many different possible "Hand Patterns", a partial list is described above). A "Caller" calls out a card chosen randomly from a deck of cards (the same way a "Caller" in Bingo calls out a letter/number combination). The players put the "Called Card" in any unoccupied space in their "Hand Pattern".

Some "Hand Patterns" include a "Discard Area". If a pattern includes a "Discard Area", players may put a "Called Card" into any unoccupied space in the "Discard Area." Cards placed in the "Discard Area" are not considered when evaluating the poker hands. All players will see the "called" card and then place that card in any empty card position within the hand pattern, or within an optional "discard" pattern.

As described above, a feature of the modified poker game is to "preview" the next card before placing the current called card. In other words, the player optionally sees two or more cards—the current card to be placed and the next card to be called (except optionally on the last card).

When the number of "called" cards is equal to the number of card positions in the hand pattern, plus the number of card positions in the optional discard pattern, the "calling" is done and the scores must be tabulated for each of the players.

Scoring is done by evaluating each five-card poker hand, for example, made against a video poker payoff table and then summing all the values for each poker hand. Tournament scoring involves the additional optional step of "match pointing" these scores.

Summary of Tournament Rules

All players start a tournament and subsequent games at the same time.

All players are shown an identical blank "Hand Pattern."

A "Caller" calls each card.

All players see and hear the "Called Card", and place it into an unoccupied spot in their "Hand Pattern", or in an unoccupied spot in the "Discard Area" if one exists.

When the number of "Called Cards" is equal to the number of spots in the "Hand Pattern", plus the number of spots in the "Discard Area", the "Calling" stops, and the scores are calculated.

Tournament Scoring

Scoring is done by evaluating each five-card poker hand against a standard video poker table, and then summing all the values for each poker hand. For tournament play, after the absolute evaluations of the hands is completed using a standard video poker payoff table, each players hand is scored relatively using the Match Point method of scoring described below.

The sum of the values of all the hands made will be used to determine a player's score.

EXAMPLE 1

Figure 39:
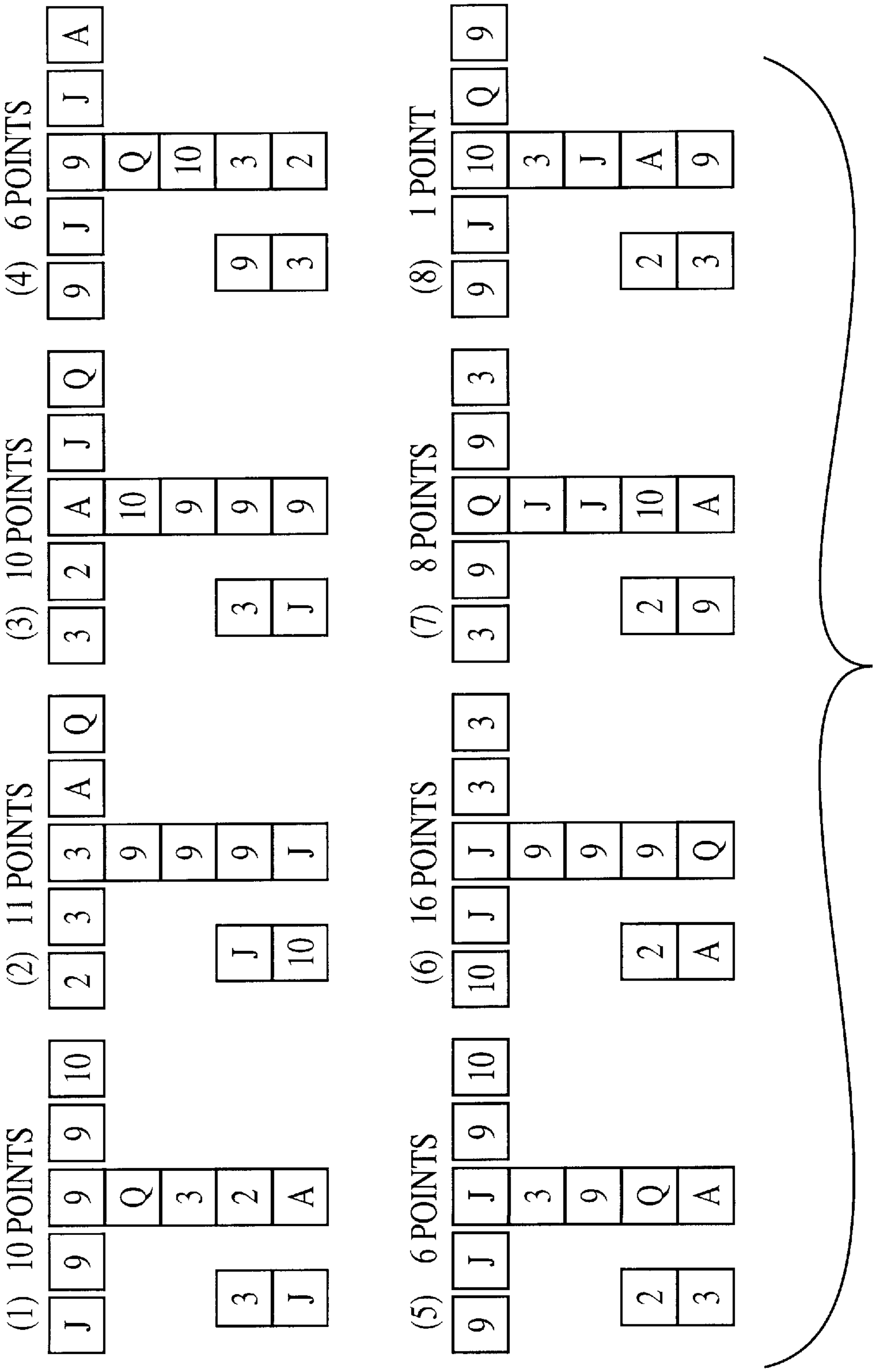
FIG. 39 is an illustration of an example of the modified poker tournament game.

One example of the modified poker tournament game is illustrated in FIG. 39. Note that all players have been dealt the same set of eleven cards, two of which may be discarded as described above. The scoring process for the modified poker tournament game first determines the poker value table as follows:

| Player # | Top Row Hand | Column Hand | Poker Table Value |
|---|---|---|---|
| (1) | Straight | Flush | 10 |
| (2) | Straight | 1 pair | 5 |
| (3) | Nothing | 2 pair | 2 |
| (4) | 1 pair | 3 Of A Kind | 4 |
| (5) | Flush | Full House | 15 |
| (6) | Straight | Flush | 10 |

The poker table value of each player's hand is then used to determine their relative ranking using the match scoring method. After all hands have been evaluated using the video poker payoff table, as demonstrated above, the hands are match pointed by comparing results among all players.

Match Point Scoring after all hands have been evaluated using the video poker table, then the hands are matched pointed by comparing results among all players, as follows:

a) Two Match Points are awarded for each player with a lower hand evaluation.

b) One Match Point is awarded for each player with the same hand evaluation.

| Player # | Poker Value | Match Points/Explanation |
|---|---|---|
| 1 | 10 | 7 Beat 3 Players-6 points<br>Tied 1 Player-1 point |
| 2 | 5 | 4 Beat 2 Players-4 points<br>Tied 0 Players-0 points |
| 3 | 2 | 0 Beat 0 Players-0 points<br>Tied 0 Players-0 points |

-continued

| Player # | Poker Value | Match Points/Explanation |
|---|---|---|
| 4 | 4 | 2 Beat 1 Player-2 points<br>Tied 0 Players-0 points |
| 5 | 15 | 10 Beat 5 Players-10 points<br>Tied 0 Players-0 points |
| 6 | 10 | 7 Beat 3 Players-6 points<br>Tied 1 Player-1 point |

The player who has the most Match Points after a predetermined number of games have been played, wins the tournament.

EXAMPLE 2

Figure 40:
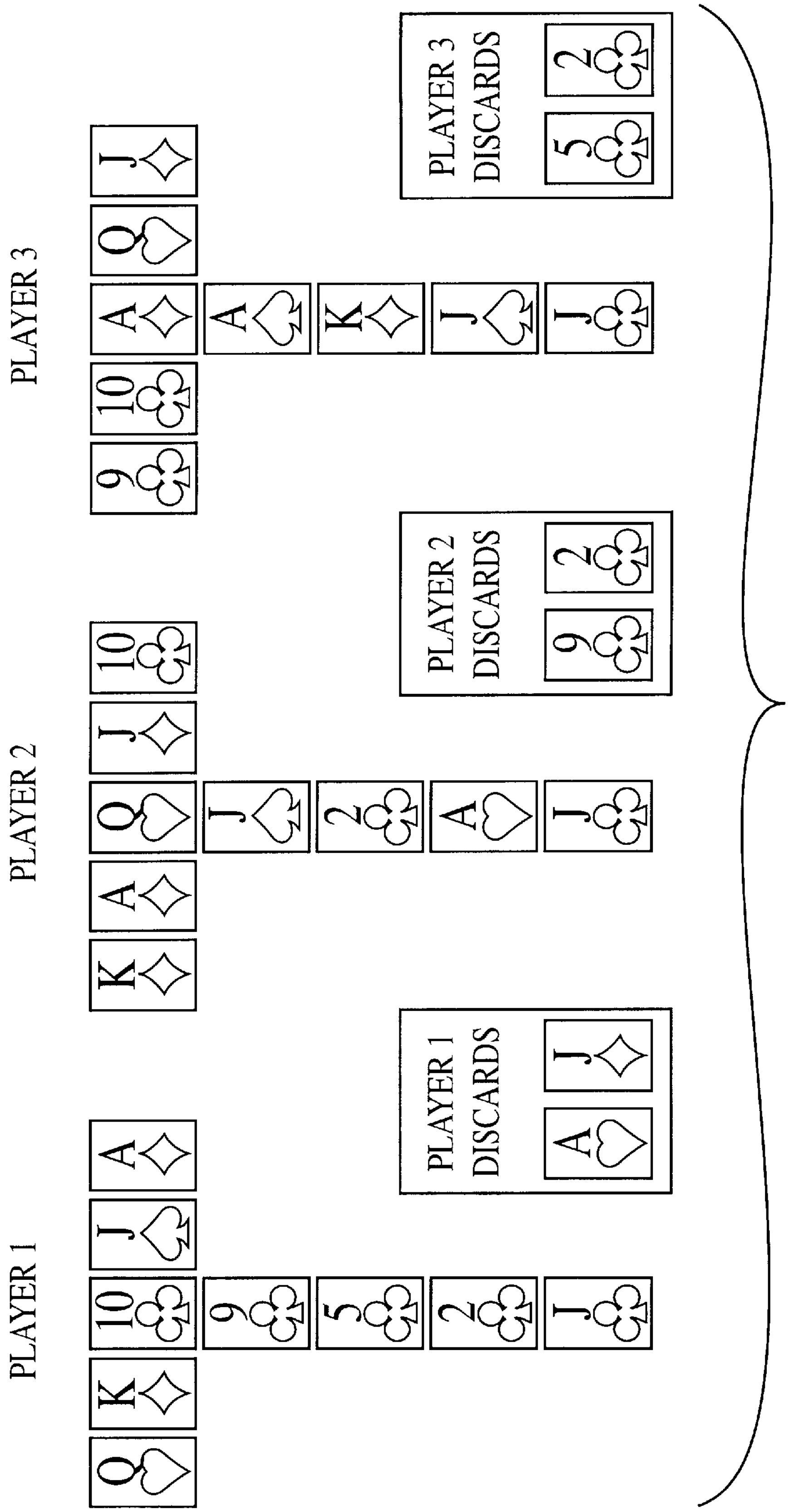
FIGS. 40–41 are illustrations of an example of the modified poker tournament game.
Figure 41:
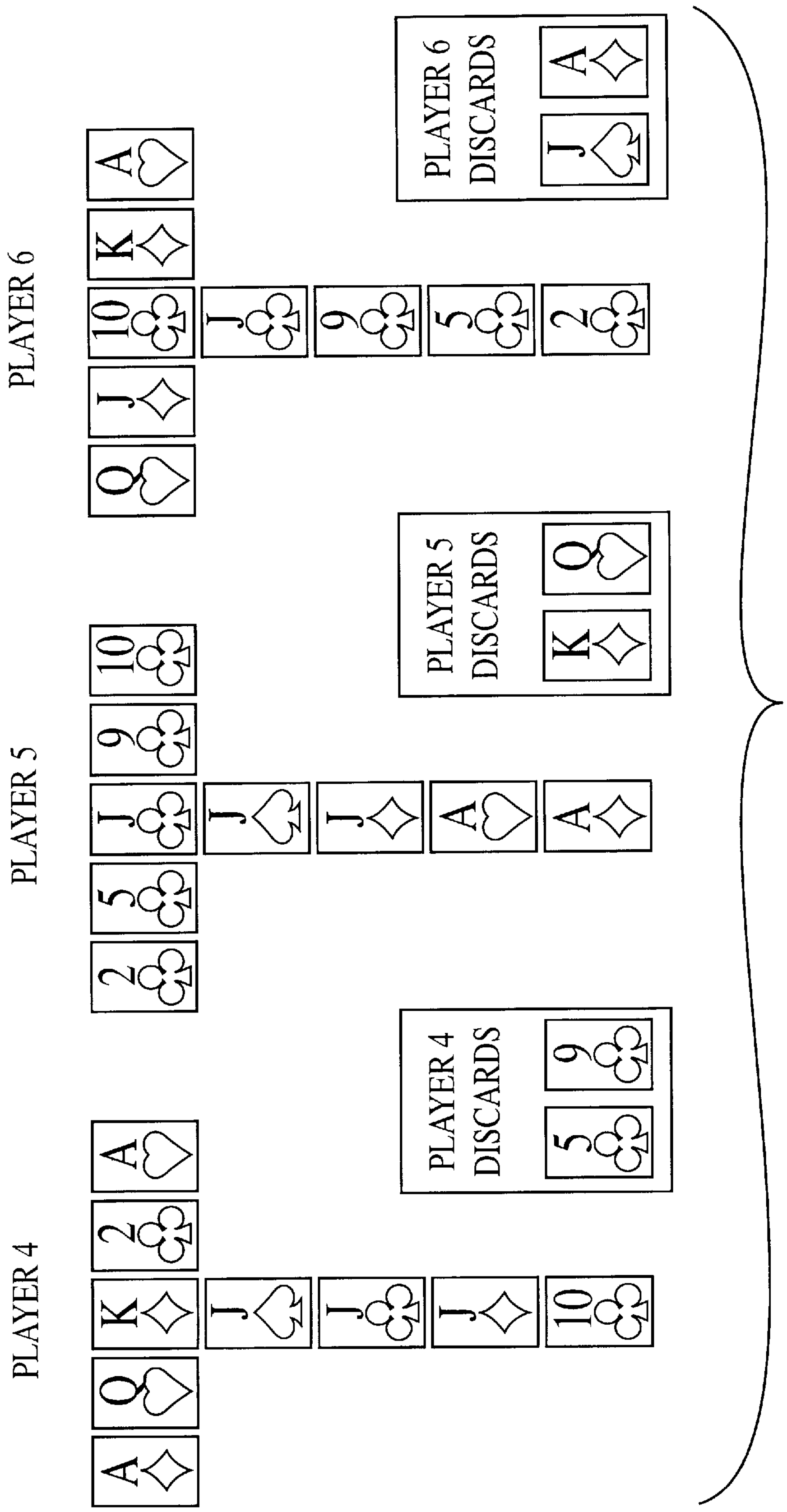

A second example of the modified poker tournament game is illustrated in FIGS. 40–41. Note that all players have been dealt the same set of eleven cards, two of which may be discarded as described above. In this example, any two of the "called" cards can be placed in the "discards" pattern, therefore each player will have up to 11 cards to fill the 9-card "T-shaped" pattern. The match point scoring is as follows:

| Player # | Hand Evaluation | Match Points |
|---|---|---|
| 1 | 10 | 9 beat 4 & tied 1 |
| 2 | 11 | 12 beat 6 |
| 3 | 10 | 9 beat 4 & tied 1 |
| 4 | 6 | 3 beat 1 & tied 1 |
| 5 | 6 | 3 beat 1 & tied 1 |
| 6 | 16 | 14 beat 7 |
| 7 | 8 | 6 beat 3 |
| 8 | 1 | 0 lost to all |

For this example, the same cards were called as follows: J♣, 9♣, 3♦, 9♥, 2♥, A♥, Q♠, 3♠, 10♦, J♥, 9♠ for each of the players.

Game Benefits

1) We have seen this game excite all video poker players, in market research test and focus groups. The players love the sense of control.

2) We see this game becoming a significant, if not indispensable, part of the VLT environment (race tracks, lotteries, et al.).

3) Credits are optionally awarded for all winning poker hands made, that is, the player bets a fixed amount and can win anything from zero to the sum of the poker hands (using the payoff table).

For example, if the player is playing an E that is, a four poker hand pattern and the player finishes with:

a flush=5 a straight=4 a two pair=2

Total Points=11 since the player only bet 10, the player has a net profit of 1.

The Minimum Units Bet is an optional feature since the game plays much longer than other video games. Since the player almost always gets a payoff this tends to be a very low volatility game.

Tournament Versions of the game can be played where all players receive duplicate cards to play and the winner has the highest score. Betting in the jackpot can be unlimited since this is a ranking tournament Various different card/video games may also be used in accordance with the present invention. For example, video poker, deuces wild poker, jokers poker, bonus poker, double bonus poker, and other standard poker variations.

As described above, the modified poker tournament competition provides players with the important ability to graphically determine their position or ranking in the modified poker tournament competition. This then adds the enhanced excitement for players when playing the tournament competition because the competition becomes like a horse race where players can see their own ranking in the tournament. Additionally, it also allows players to bet or place additional wagers on other players (or themselves) with respect to first, second, third or fourth place finishes, as well as other traditional horse racing betting rules, incorporated herein by reference, that have never been applied to the casino environment.

Players are ranked by absolute scores which are a result of the points accumulated for playing each modified poker game. Note that the tournament award may be monetary, a prize, or even merely declaring a first place winner.

Further, in the situation where the player is playing simultaneously an individual game while also playing the modified poker tournament, the modified poker tournament system automatically compensates the player at the normal payoffs for the individual game. This then prevents the modified poker operator from losing heavily since the player is playing the tournament competition at greatly enhanced odds to add to the excitement of the tournament by permitting the players to accumulate a large number of points.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

DEFINITIONS

"Called Cards"—a card displayed and announced to all players by the "Caller". For example, in a "T-shaped" pattern, nine cards may be called—one at a time—and after each calling every player must place that card within the "Hand Pattern" or "Discard Area". In an "E-shaped" pattern, seventeen cards may be called—one at a time—and after each calling the player must place that card within the hand pattern.

The "Caller"—A person, who is not playing in the tournament, that selects a "Called Card" and calls-out its number and suit for all the tournament players to hear.

"Discard Area"—an area outside of the "Hand Pattern" where "Called Cards" can be placed. Discarded cards are not used to calculate the value of part hands. "Discard" pattern=a few card positions, where a limited number of "called cards" may be placed—these "discards" will not be part of the hand evaluations, for example:

"Hand Patterns"—A pattern which players fill in with "Called Cards". "Hand Patterns" are comprised of 5-card columns and rows with one or more common cards. Below are examples of some common "Hand Patterns".

APPENDIX

```
Globals - 1

Global WavesDir As String

Global Suits(4) As Integer
Global Cards(13) As Integer
Global Pair As Integer
Global ThreeOfAKind As Integer
Global FirstCard As Integer
Global NoDirections As Integer
Global NoCards As Integer
Global Direction(12, 5)
Global AutoPlayFlag As Integer

Global Deck(52) As Integer
Global NewCardValue1 As Integer
Global NewCardSuit1 As Integer
Global NewCardValue2 As Integer
Global NewCardSuit2 As Integer
Global TotalCoinsWon As Integer

Declare Function sndPlaySound Lib "winmm" Alias "sndPlaySoundA" (ByVal lpszSoundName As String,
ByVal uFlags As Long) As Long
Declare Sub Sleep Lib "kernel32" (ByVal dwMilliseconds As Long)

Global RoyalFlushPayOff As Integer
Global StraightFlushPayOff As Integer
Global FourOfAKindPayOff As Integer
Global FullHousePayOff As Integer
Global FlushPayOff As Integer
Global StraightPayOff As Integer
Global ThreeOfAKindPayOff As Integer
Global TwoPairPayOff As Integer
Global OnePairPayOff As Integer
Global LowPairPayOff As Integer

Public Const ExitBtnSound = "LOTSCOINSRAPIDSOFT.Wav"
Public Const WinningSound = "WinGame.WAV"
Public Const WinningCardSound = "WinningCard.WAV"
Public Const CoinWonSound = "CoinDrop.Wav"
Public Const PlaceCardSound = "BUTTONSNAP3.WAV"
Public Const CardDealtSound = "buttonfingersnap3.WAV"
Public Const ClearCardSound = "bjshoe.WAV"
Public Const DiscardSound = "button.wav"

Global Const INI_FILE = "ptt.INI"
Global gs_AppPath As String
Global GamesDir As String
Global TokenGamesDir As String
Global MasterDir As String
Global TokenMasterDir As String
Global PlayerID As String
Global GameNo As String
Global PlayerNo As String
Global ToFileName As String
Global FromFileName As String
Global TokenToFileName As String
Global TokenFromFileName As String
Global ToMasterFileName As String
Global TokenToMasterFileName As String
Public Const RecordLength As Integer = 128
Global NoPlayers As Integer
Global JackPot As Integer

Global Mode As Integer
Global CardCnt As Integer

Global Const NONE = 0
Global Const WAITINGFORCARD = 1
Global Const CARDPICKED = 2
```

```
Globals - 2

Global Const AUTOPLAY = 3

Public Function CheckForToken(ByRef TokenFileName As String) As Integer
    '
    Dim FileSize As Integer
    '
    On Error GoTo FileNotFound
    '
    CheckForToken = 0
    '
    FileSize = FileLen(TokenFileName)
    '
    If FileSize > 0 Then
        '
        Kill TokenFileName
        '
        CheckForToken = 1
    End If

FileNotFound:

End Function
Public Sub SendToken(ByRef TokenFileName As String)
    Open TokenFileName For Output As #2 Len = RecordLength
    Print #2, "X"
    Close #2
End Sub


Public Sub NewLetter(Letter As String)
    Dim I As Integer
    Dim D As Integer
    Dim R As Integer
    Dim NoDiscards As Integer
    Dim Delay As Integer
    Const SYNC = 1

    Select Case Letter
        '
        Case "L"
            '
            Direction(1, 0) = 6
            Direction(1, 1) = 1
            Direction(1, 2) = 6
            Direction(1, 3) = 11
            Direction(1, 4) = 16
            Direction(1, 5) = 21
            '
            Direction(2, 0) = 5
            Direction(2, 1) = 21
            Direction(2, 2) = 22
            Direction(2, 3) = 23
            Direction(2, 4) = 24
            Direction(2, 5) = 25
            '
            NoDirections = 2
            NoCards = 10
            NoDiscards = 2
            '
        Case "T"
            '
            Direction(1, 0) = 1
            Direction(1, 1) = 1
            Direction(1, 2) = 2
            Direction(1, 3) = 3
            Direction(1, 4) = 4
            Direction(1, 5) = 5
```

```
Globals - 3

            Direction(2, 0) = 8
            Direction(2, 1) = 3
            Direction(2, 2) = 8
            Direction(2, 3) = 13
            Direction(2, 4) = 18
            Direction(2, 5) = 23
            '
            NoDirections = 2
            NoCards = 10
            NoDiscards = 2
            '
        Case "X"
            '
            Direction(1, 0) = 11
            Direction(1, 1) = 1
            Direction(1, 2) = 7
            Direction(1, 3) = 13
            Direction(1, 4) = 19
            Direction(1, 5) = 25

            Direction(2, 0) = 12
            Direction(2, 1) = 5
            Direction(2, 2) = 9
            Direction(2, 3) = 13
            Direction(2, 4) = 17
            Direction(2, 5) = 21
            '
            NoDirections = 2
            NoCards = 9
            NoDiscards = 1
            '
        Case "I"
            '
            Direction(1, 0) = 8
            Direction(1, 1) = 3
            Direction(1, 2) = 8
            Direction(1, 3) = 13
            Direction(1, 4) = 18
            Direction(1, 5) = 23
            '
            Direction(2, 0) = 1
            Direction(2, 1) = 1
            Direction(2, 2) = 2
            Direction(2, 3) = 3
            Direction(2, 4) = 4
            Direction(2, 5) = 5
            '
            Direction(3, 0) = 5
            Direction(3, 1) = 21
            Direction(3, 2) = 22
            Direction(3, 3) = 23
            Direction(3, 4) = 24
            Direction(3, 5) = 25
            '
            NoDirections = 3
            NoCards = 12
            NoDiscards = 0
            '
        Case "H"
            '
            Direction(1, 0) = 3
            Direction(1, 1) = 11
            Direction(1, 2) = 12
            Direction(1, 3) = 13
            Direction(1, 4) = 14
            Direction(1, 5) = 15
            '
            Direction(2, 0) = 10
```

```
Globals - 4

            Direction(2, 1) = 5
            Direction(2, 2) = 10
            Direction(2, 3) = 15
            Direction(2, 4) = 20
            Direction(2, 5) = 25
            '
            Direction(3, 0) = 6
            Direction(3, 1) = 1
            Direction(3, 2) = 6
            Direction(3, 3) = 11
            Direction(3, 4) = 16
            Direction(3, 5) = 21
            '
            NoDiscards = 0
            NoDirections = 3
            NoCards = 12
            '
        Case "E"
            '
            Direction(1, 0) = 1
            Direction(1, 1) = 1
            Direction(1, 2) = 2
            Direction(1, 3) = 3
            Direction(1, 4) = 4
            Direction(1, 5) = 5
            '
            Direction(2, 0) = 3
            Direction(2, 1) = 11
            Direction(2, 2) = 12
            Direction(2, 3) = 13
            Direction(2, 4) = 14
            Direction(2, 5) = 15
            '
            Direction(3, 0) = 5
            Direction(3, 1) = 21
            Direction(3, 2) = 22
            Direction(3, 3) = 23
            Direction(3, 4) = 24
            Direction(3, 5) = 25
            '
            Direction(4, 0) = 6
            Direction(4, 1) = 1
            Direction(4, 2) = 6
            Direction(4, 3) = 11
            Direction(4, 4) = 16
            Direction(4, 5) = 21
            '
            NoDiscards = 0
            NoDirections = 4
            NoCards = 16
            '
        Case "O"
            '
            Direction(1, 0) = 1
            Direction(1, 1) = 1
            Direction(1, 2) = 2
            Direction(1, 3) = 3
            Direction(1, 4) = 4
            Direction(1, 5) = 5
            '
            Direction(2, 0) = 10
            Direction(2, 1) = 5
            Direction(2, 2) = 10
            Direction(2, 3) = 15
            Direction(2, 4) = 20
            Direction(2, 5) = 25
            '
            Direction(3, 0) = 6
```

```
Globals - 5

            Direction(3, 1) = 1
            Direction(3, 2) = 6
            Direction(3, 3) = 11
            Direction(3, 4) = 16
            Direction(3, 5) = 21
            '
            Direction(4, 0) = 5
            Direction(4, 1) = 21
            Direction(4, 2) = 22
            Direction(4, 3) = 23
            Direction(4, 4) = 24
            Direction(4, 5) = 25
            '
            NoDiscards = 0
            NoDirections = 4
            NoCards = 15
            '
    End Select
    '
    For I = 1 To 10
        Main.HandValue(I).Visible = False
        Main.HandValue(I).Caption = 0
    Next I
    '
    For I = 1 To 25
        Main.Hand(I).Visible = False
        Main.Hand(I).Value = 0
        For Delay = 1 To 100
            DoEvents
        Next Delay
    Next I
    '
    For D = 1 To NoDirections
        For I = 1 To 5
            R = sndPlaySound(ByVal WavesDir & CardDealtSound, SYNC)
            Main.HandBtn(Direction(D, I)).Visible = True
            Main.Hand(Direction(D, I)).Visible = True
            For Delay = 1 To 200
                DoEvents
            Next Delay
        Next I
        Main.HandValue(Direction(D, 0)).Visible = True
    Next D
    '
    Main.TotalHandValue.Visible = True
    '
End Sub
Public Function Sleeper(SleepTime As Double)
    '
    Dim WakeUpTime As Double
    '
    WakeUpTime = Timer + SleepTime / 1000
    '
    Do
        DoEvents
    Loop Until Timer > WakeUpTime
    '
End Function


Public Sub FlipNextCards()
    Dim NewCardValue As Integer
    Dim NewCardSuit As Integer
    '
    Do
        Main.RndGen.random = 13
        NewCardValue = Main.RndGen.result + 1
        Main.RndGen.random = 4
```

Globals - 6

```
        NewCardSuit = Main.RndGen.result
    Loop Until Deck(NewCardSuit * 13 + NewCardValue) = 0
    '
    Deck(NewCardSuit * 13 + NewCardValue) = 1
    '
    NewCardValue1 = NewCardValue
    NewCardSuit1 = NewCardSuit
    '
End Sub
```

```
Main - 1

Dim CheckingCards As Integer
Dim Account(6) As Integer, Detail(6, 10) As Integer
Dim DetailPos As Integer
Dim BetTenPressed As Integer

Public Sub ResetAccounting()
    '
    Dim I As Integer, K  As Integer
    '
    Account(1) = 0 ' T Plays
    Account(2) = 0 ' L Plays
    Account(3) = 0 ' I Plays
    Account(4) = 0 ' H Plays
    Account(5) = 0 ' E Plays
    Account(6) = 0 ' O Plays
    '
    For I = 1 To 10
        For K = 1 To 6
            Detail(K, I) = 0
        Next K
    Next I
    '
End Sub

Public Sub WriteAccounting()
    '
    Dim DateTime As Variant
    Dim I As Integer, K As Integer
    Dim Temp As String
    Dim ValTemp As Integer
    Dim Line As String
    '
    DateTime = "Bingo_"
    '
    Temp = Date
    '
    For I = 1 To Len(Temp)
        If Mid(Temp, I, 1) = "/" Then
            DateTime = DateTime & "-"
        Else
            DateTime = DateTime & Mid(Temp, I, 1)
        End If
    Next I
    '
    DateTime = DateTime & "_"
    Temp = Time
    '
    For I = 1 To Len(Temp) - 3
        If Mid(Temp, I, 1) = ":" Then
            DateTime = DateTime & "_"
        Else
            DateTime = DateTime & Mid(Temp, I, 1)
        End If
    Next I
    '
    Open DateTime For Output As #1
    '
    Line = "(1) T" & Chr$(9) & "(2) L" & Chr$(9) & "(3) I" & Chr$(9) & "(4) H" & Chr$(9) & "(5)
E" & Chr$(9) & "(6) O"
    '
    For K = 1 To 6
        For I = 1 To 10
            Line = Line & Chr$(9) & K & "," & I
        Next I
    Next K
    '
    Print #1, Line
    '
```

Main - 2

```
    Line = Account(1) & Chr$(9) & Account(2) & Chr$(9) & Account(3) & Chr$(9) & Account(4) & Chr
$(9) & Account(5) & Chr$(9) & Account(6)
    '
    For K = 1 To 6
        For I = 1 To 10
            Line = Line & Chr$(9) & Detail(K, I)
        Next I
    Next K
    '
    Print #1, Line
    '
    Close #1
    '
End Sub

Private Sub CheckCards()
    '
    Dim I As Integer
    Dim Multiplier As Integer
    Dim D As Integer
    Dim CoinsWon As Integer
    Dim NotStraight As Integer
    Dim Pos(5) As Integer
    Dim Score As Integer
    Dim Cnt As Integer, LineNo As Integer
    Dim R As Integer
    Dim Speed As Integer
    '
    Const SYNC = 1
    Dim TempCredits As Long
    '
    Multiplier = CoinsIn / 10
    '
    CheckingCards = 1
    '
    Score = 0
    TotalCoinsWon = 0
    '
    For D = 1 To NoDirections
        '
        Pos(1) = Direction(D, 1)
        Pos(2) = Direction(D, 2)
        Pos(3) = Direction(D, 3)
        Pos(4) = Direction(D, 4)
        Pos(5) = Direction(D, 5)
        '
        HandValueNo = Direction(D, 0)
        '
        If (Hand(Pos(1)).Value > 0 Or Hand(Pos(2)).Value > 0 Or Hand(Pos(3)).Value > 0 Or Hand(P
os(4)).Value > 0 Or Hand(Pos(5)).Value > 0) Then
            '
            For I = 0 To 4
                Suits(I) = 0
            Next I
            '
            For I = 1 To 13
                Cards(I) = 0
            Next I
            '
            Pair = 0
            OnePair = 0
            LowPair = 0
            ThreeOfAKind = 0
            FourOfAKind = 0
            FirstCard = 0
            Flush = 0
            Straight = 0
            WinnerText = ""
```

Main - 3

```
          CoinsWon = 0
          '
          For I = 1 To 5
              Suits(Hand(Pos(I)).Suit) = Suits(Hand(Pos(I)).Suit) + 1
              Cards(Hand(Pos(I)).Value) = Cards(Hand(Pos(I)).Value) + 1
          Next I
          '
          For I = 1 To 13
              If Cards(I) = 2 Then
                  Pair = Pair + 1
              End If
          Next I
          '
          For I = 1 To 13
              If Cards(I) = 3 Then
                  ThreeOfAKind = 1
              End If
          Next I
          '
          For I = 1 To 13
              If Cards(I) = 4 Then
                  FourOfAKind = 1
              End If
          Next I
          '
          For I = 0 To 3
              If Suits(I) = 5 Then
                  Flush = 1
              End If
          Next I
          '
          Do
              FirstCard = FirstCard + 1
          Loop Until Cards(FirstCard) > 0
          '
          NotStraight = False
          '
          If FirstCard <= 9 Then
              If Cards(FirstCard + 1) = 1 And Cards(FirstCard + 2) = 1 And Cards(FirstCard + 3
) = 1 And Cards(FirstCard + 4) = 1 Then
                  Straight = 1
              End If
          End If
          '
          If FirstCard = 1 Then
              If (Cards(10) = 1 And Cards(11) = 1 And Cards(12) = 1 And Cards(13)) = 1 Then
                  Straight = 1
              End If
          End If
          '
          For I = 11 To 13
              If Cards(I) = 2 Then OnePair = 1
          Next I
          '
          If Cards(1) = 2 Then OnePair = 1
          '
          For I = 2 To 12
              If Cards(I) = 2 Then LowPair = 1
          Next I
          '
          If Flush = 1 And Straight = 1 And Cards(13) = 1 And Cards(1) = 1 Then
              CoinsWon = RoyalFlushPayOff * Multiplier
              LineNo = 10
              If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                  CoinsWon = 0
              End If
          ElseIf Flush = 1 And Straight = 1 Then
```

Main - 4

```
                LineNo = 9
                CoinsWon = StraightFlushPayOff * Multiplier
                If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                    CoinsWon = 0
                End If
            ElseIf FourOfAKind = 1 Then
                LineNo = 8
                CoinsWon = FourOfAKindPayOff * Multiplier
            ElseIf ThreeOfAKind = 1 And Pair = 1 Then
                    LineNo = 7
                    CoinsWon = FullHousePayOff * Multiplier
            ElseIf Flush = 1 Then
                LineNo = 6
                CoinsWon = FlushPayOff * Multiplier
                If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                    CoinsWon = 0
                End If
            ElseIf Straight = 1 Then
                LineNo = 5
                CoinsWon = StraightPayOff * Multiplier
                If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                    CoinsWon = 0
                End If
            ElseIf ThreeOfAKind = 1 Then
                LineNo = 4
                CoinsWon = ThreeOfAKindPayOff * Multiplier
            ElseIf Pair = 2 Then
                LineNo = 3
                CoinsWon = TwoPairPayOff * Multiplier
            ElseIf OnePair = 1 Then
                LineNo = 2
                CoinsWon = OnePairPayOff * Multiplier
            ElseIf LowPair = 1 Then
                LineNo = 1
                CoinsWon = LowPairPayOff * Multiplier
            End If
            '
        Else
            CoinsWon = 0
        End If
        '
        If CoinsWon > 0 And CardCnt = NoCards Then
            '
            Detail(DetailPos, LineNo) = Detail(DetailPos, LineNo) + 1
            '
        End If
        '
        HandValue(HandValueNo) = CoinsWon
        '
        TotalCoinsWon = TotalCoinsWon + CoinsWon
        '
        Score = Score + CoinsWon
        '
    Next D
    '
    If Score > TotalHandValue Then
        '
        TempCredits = Score
        '
        Cnt = Score - TotalHandValue
        TempCredits = Score + Cnt
        '
        Select Case TempCredits
            Case 0 To 15
                Speed = 1
```

Main - 5

```
            Case 16 To 35
                Speed = 2
            Case 36 To 60
                Speed = 3
            Case 61 To 120
                Speed = 4
            Case 121 To 2500
                Speed = 5
            Case Else
                Speed = 6
        End Select
        '
        For I = 1 To Cnt Step Speed
            TotalHandValue = TotalHandValue + Speed
            R = sndPlaySound(ByVal WavesDir & CoinWonSound, SYNC)
            Sleeper (90)
        Next I
        TotalHandValue = TempCredits
    End If
    '
    TotalHandValue.Caption = Score
    '
    CheckingCards = 0
    '
End Sub

Private Sub Bet10Btn_Click()
    '
    Dim R As Integer
    Const SYNC = 1
    R = sndPlaySound(ByVal WavesDir & PlaceCardSound, SYNC)
    '
    If BetTenPressed = 0 Then
        CoinsIn = 0
        BetTenPressed = 1
    End If
    '
    '
    If CInt(Credits) > CInt(CoinsIn) Then
        CoinsIn = CoinsIn + 10
        DealBtn.Visible = True
        If CoinsIn > 50 Then CoinsIn = 50
        If CoinsIn = 50 Then
            Sleeper (100)
            Deal
        End If
    End If
End Sub

Private Sub Bet30Btn_Click()
    '
    Dim R As Integer
    Const SYNC = 1
    R = sndPlaySound(ByVal WavesDir & PlaceCardSound, SYNC)
    '
    CoinsIn = 50
    '
    Deal
    '
End Sub


Private Sub DealBtn_Click()
    '
    Dim R As Integer
    Const SYNC = 1
    R = sndPlaySound(ByVal WavesDir & PlaceCardSound, SYNC)
    Sleeper (100)
```

Main - 6

```
    '
    Deal
    '
End Sub

Private Sub ExitBtn_Click()
    Dim R As Integer
    Const SYNC = 1
    Bet30Btn.Visible = False
    Bet10Btn.Visible = False
    DealBtn.Visible = False
    ExitBtn.Visible = False
    '
    R = sndPlaySound(ByVal WavesDir & ExitBtnSound, SYNC)
    WriteAccounting
    Sleeper (3500)
    End
End Sub

Private Sub Form_Load()
    '
    BetTenPressed = 0
    '
    Main.Top = 0
    Main.Left = 0
    Main.Width = 12000
    Main.Height = 9100
    '
    Randomize
    '
    ResetAccounting
    '
    Dim I As Integer
    '
    For I = 1 To 25
        Hand(I).Value = 0
        Hand(I).Suit = 0
        Hand(I).Gold = 0
        Hand(I).Visible = False
        Hand(I).ViewMode = 1
    Next I
    '
    CurrentCard.Gold = 0
    CurrentCard.Value = 0
    OnDeckCard.Gold = 0
    OnDeckCard.Value = 0
    CurrentCard.ViewMode = 0
    OnDeckCard.ViewMode = 0
    OnDoubleDeckCard.Visible = False
    '
    Mode = NONE
    CardCnt = 0
    '
    GamesDir = "Y:\Games\"
    TokenGamesDir = "Y:\Games\Tokens\"
    MasterDir = "Y:\MasterDir\"
    TokenMasterDir = "Y:\MasterDir\Tokens\"
    WavesDir = "c:\world\"
    '
    PlayerID = CStr(Int((1000 * Rnd) + 1))
    '
    ToFileName = GamesDir & PlayerID & ".TG"
    TokenToFileName = TokenGamesDir & PlayerID & ".TG"
    FromFileName = GamesDir & PlayerID & ".FG"
    TokenFromFileName = TokenGamesDir & PlayerID & ".FG"
    ToMasterFileName = MasterDir & PlayerID & ".fp"
    TokenToMasterFileName = TokenMasterDir & PlayerID & ".fp"
```

Main - 7

```
    AutoPlayFlag = False

End Sub

Private Sub Hand_MouseDown(Index As Integer, Button As Integer, Shift As Integer, X As Single, Y
 As Single)
    If Hand(Index).Value = 0 And CurrentCard.Value > 0 Then

        Hand(Index).Value = CurrentCard.Value
        Hand(Index).Suit = CurrentCard.Suit

        CurrentCard.Value = 0
        CurrentCard.Suit = 0

        Dim R As Integer
        Const SYNC = 1
        R = sndPlaySound(ByVal WavesDir & PlaceCardSound, SYNC)

        CheckCards

        Mode = CARDPICKED

    End If
End Sub


Private Sub HScroll1_Change()

End Sub

Private Sub HandBtn_MouseDown(Index As Integer, Button As Integer, Shift As Integer, X As Single
, Y As Single)
    If Hand(Index).Value = 0 And CurrentCard.Value > 0 Then

        HandBtn(Index).Visible = False

        Hand(Index).Value = CurrentCard.Value
        Hand(Index).Suit = CurrentCard.Suit

        CurrentCard.Value = 0
        CurrentCard.Suit = 0

        Dim R As Integer
        Const SYNC = 1
        R = sndPlaySound(ByVal WavesDir & PlaceCardSound, SYNC)

        CheckCards

        Mode = CARDPICKED

    End If

End Sub

Private Sub MainTimer_Timer()

    Dim Good As Integer
    Dim R As Integer
    Const SYNC = 1
    Dim TempCredits As Long
    Dim Speed As Integer
    '
    Select Case Mode
        Case CARDPICKED
            If CheckingCards = 0 Then
                CardCnt = CardCnt + 1
                If CardCnt < NoCards Then
                    '
```

Main - 8

```
        If CardCnt + 1 = NoCards Then
            OnDoubleDeckCard.Visible = False
        End If
        '
        FlipNextCards
        '
        ' R = sndPlaySound(ByVal WavesDir & PlaceCardSound, SYNC)
        '
        CurrentCard.Value = OnDeckCard.Value
        CurrentCard.Suit = OnDeckCard.Suit
        '
        OnDeckCard.Value = NewCardValue1
        OnDeckCard.Suit = NewCardSuit1
        '
        If AutoPlayFlag Then
            Mode = AUTOPLAY
        End If
    Else
        '
        ' R = sndPlaySound(ByVal WavesDir & PlaceCardSound, SYNC)
        '
        CurrentCard.Value = OnDeckCard.Value
        CurrentCard.Suit = OnDeckCard.Suit
        '
        OnDeckCard.Value = 0
        OnDeckCard.Visible = False
        '
        If CardCnt > NoCards Then
            CurrentCard.Visible = False
            '
            CoinsWon.Text = TotalCoinsWon
            TempCredits = Credits.Caption + TotalCoinsWon
            '
            Select Case TempCredits
                Case 0 To 15
                    Speed = 1
                Case 16 To 35
                    Speed = 2
                Case 36 To 60
                    Speed = 3
                Case 61 To 120
                    Speed = 4
                Case 121 To 2500
                    Speed = 5
                Case Else
                    Speed = 6
            End Select
            '
            For I = 1 To TotalCoinsWon
                If I Mod Speed = 0 Then
                    Credits.Caption = Credits.Caption + Speed
                    R = sndPlaySound(ByVal WavesDir & CoinWonSound, SYNC)
                    DoEvents
                    Sleep (90)
                End If
            Next I
            '
            Credits.Caption = TempCredits
            '
            BetTenPressed = 0
            '
            Bet30Btn.Visible = True
            Bet10Btn.Visible = True
            DealBtn.Visible = True
            ExitBtn.Visible = True
            '
        End If
    End If
```

Main - 9

```
            If AutoPlayFlag Then
                Mode = AUTOPLAY
            Else
               Mode = NONE
            End If
        End If
    Case Else

End Select

End Sub

Private Sub vaBtn1_Click()
    '
    Dim R As Integer
    Const SYNC = 1
    R = sndPlaySound(ByVal WavesDir & PlaceCardSound, SYNC)
    '
    Credits = Credits - 20
    CoinsWon = 0
    '
    Bet5Btn.Visible = False
    '
    NewLetter (Letter)
    '
    For I = 1 To 52
        Deck(I) = 0
    Next I
    '
    FlipNextCards
    '
    OnDeckCard.Value = NewCardValue1
    OnDeckCard.Suit = NewCardSuit1
    '
    FlipNextCards
    '
    CurrentCard.Value = NewCardValue1
    CurrentCard.Suit = NewCardSuit1
    '
    CardCnt = 0
    '
End Sub


Private Sub Picture2_Click()

End Sub

Private Sub OnDeckCard_Click()
    Dim Seed1 As Long, Seed2 As Long
    Seed1 = InputBox("Enter Seed 1:", vbQuestion, "Seed 1")
    Seed2 = InputBox("Enter Seed 2:", vbQuestion, "Seed 2")
    RndGen.Seed1 = Seed1
    RndGen.Seed2 = Seed2
    RndGen.Seed

End Sub

Private Sub StartAutoPlay_MouseDown(Button As Integer, Shift As Integer, X As Single, Y As Singl
e)
    Mode = AUTOPLAY
    AutoPlayFlag = True

End Sub

Public Sub Deal()
    '
    Credits = Credits - CoinsIn
```

```
Main - 10

    '
    CoinsWon = 0
    '
    Bet30Btn.Visible = False
    Bet10Btn.Visible = False
    DealBtn.Visible = False
    ExitBtn.Visible = False
    '
    Letter = "H"
    DetailPos = 4
    '
    Account(DetailPos) = Account(DetailPos) + 1
    '
    NewLetter (Letter)
    '
    For I = 1 To 52
        Deck(I) = 0
    Next I
    '
    FlipNextCards
    '
    CurrentCard.Visible = True
    OnDeckCard.Visible = True
    OnDoubleDeckCard.Visible = True
    OnDoubleDeckCard.ZOrder
    OnDeckCard.ZOrder
    CurrentCard.ZOrder
    '
    OnDeckCard.Value = NewCardValue1
    OnDeckCard.Suit = NewCardSuit1
    '
    FlipNextCards
    '
    CurrentCard.Value = NewCardValue1
    CurrentCard.Suit = NewCardSuit1
    '
    CardCnt = 0
    '
End Sub
```

```
Main - 1

VERSION 5.00
Object = "{B9BFC920-7F41-11D0-A45D-00A0C90DECE7}#1.0#0"; "PTT.OCX"
Begin VB.Form Main
   Appearance      =   0  'Flat
   BackColor       =   &H80000006&
   BorderStyle     =   0  'None
   ClientHeight    =   11670
   ClientLeft      =   1020
   ClientTop       =   1095
   ClientWidth     =   14745
   ClipControls    =   0   'False
   ControlBox      =   0   'False
   Icon            =   (Icon)
   LinkTopic       =   "Form1"
   MaxButton       =   0   'False
   MinButton       =   0   'False
   PaletteMode     =   1  'UseZOrder
   Picture         =   (Bitmap)
   ScaleHeight     =   11670
   ScaleWidth      =   14745
   ShowInTaskbar   =   0   'False
   Begin PTTLib.Rnd RndGen
      Left            =   360
      Top             =   6240
      _Version        =   65536
      _ExtentX        =   2566
      _ExtentY        =   1508
      _StockProps     =   0
   End
   Begin VB.PictureBox HandBtn
      BackColor       =   &H8000000D&
      BorderStyle     =   0  'None
      Height          =   1380
      Index           =   20
      Left            =   7320
      Picture         =   (Bitmap)
      ScaleHeight     =   1380
      ScaleWidth      =   1185
      TabIndex        =   71
      Top             =   4520
      Visible         =   0   'False
      Width           =   1180
   End
   Begin PTTLib.Crd Hand
      Height          =   1380
      Index           =   20
      Left            =   7320
      TabIndex        =   28
      Top             =   4515
      Width           =   1180
      _Version        =   65536
      _ExtentX        =   2090
      _ExtentY        =   2434
      _StockProps     =   32
   End
   Begin VB.PictureBox HandBtn
      BackColor       =   &H8000000D&
      BorderStyle     =   0  'None
      Height          =   1380
      Index           =   10
      Left            =   7320
      Picture         =   (Bitmap)
      ScaleHeight     =   1380
      ScaleWidth      =   1185
      TabIndex        =   70
      Top             =   1720
      Visible         =   0   'False
      Width           =   1180
```

```
Main - 2

   End
   Begin VB.PictureBox DealBtn
      AutoSize        =   -1  'True
      BorderStyle     =   0  'None
      Height          =   600
      Left            =   9480
      Picture         =   (Bitmap)
      ScaleHeight     =   600
      ScaleWidth      =   2145
      TabIndex        =   68
      Top             =   8460
      Visible         =   0   'False
      Width           =   2145
   End
   Begin VB.PictureBox Bet10Btn
      AutoSize        =   -1  'True
      BorderStyle     =   0  'None
      Height          =   600
      Left            =   7200
      Picture         =   (Bitmap)
      ScaleHeight     =   600
      ScaleWidth      =   2145
      TabIndex        =   67
      Top             =   8460
      Width           =   2145
   End
   Begin VB.PictureBox HandBtn
      BackColor       =   &H8000000D&
      BorderStyle     =   0  'None
      Height          =   1380
      Index           =   25
      Left            =   7320
      Picture         =   (Bitmap)
      ScaleHeight     =   1380
      ScaleWidth      =   1185
      TabIndex        =   66
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   24
      Left            =   6080
      Picture         =   (Bitmap)
      ScaleHeight     =   1380
      ScaleWidth      =   1185
      TabIndex        =   65
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   23
      Left            =   4840
      Picture         =   (Bitmap)
      ScaleHeight     =   1380
      ScaleWidth      =   1185
      TabIndex        =   64
      Top             =   5940
      Visible         =   0   'False
      Width           =   1180
   End
```

Main - 3

```
   Begin VB.PictureBox HandBtn
      BackColor       =   &H8000000D&
      BorderStyle     =   0  'None
      Height          =   1380
      Index           =   22
      Left            =   3600
      Picture         =   (Bitmap)
      ScaleHeight     =   1380
      ScaleWidth      =   1185
      TabIndex        =   63
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   21
      Left            =   2360
      Picture         =   (Bitmap)
      ScaleHeight     =   1380
      ScaleWidth      =   1185
      TabIndex        =   62
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1335
      Index           =   19
      Left            =   9000
      ScaleHeight     =   1335
      ScaleWidth      =   1095
      TabIndex        =   61
      Top             =   4560
      Visible         =   0   'False
      Width           =   1095
   End
   Begin VB.PictureBox HandBtn
      BackColor       =   &H8000000D&
      BorderStyle     =   0  'None
      Height          =   1335
      Index           =   18
      Left            =   8880
      ScaleHeight     =   1335
      ScaleWidth      =   1095
      TabIndex        =   60
      Top             =   4680
      Visible         =   0   'False
      Width           =   1095
   End
   Begin VB.PictureBox HandBtn
      BackColor       =   &H8000000D&
      BorderStyle     =   0  'None
      Height          =   1335
      Index           =   17
      Left            =   8880
      ScaleHeight     =   1335
      ScaleWidth      =   1095
      TabIndex        =   59
      Top             =   4680
      Visible         =   0   'False
      Width           =   1095
   End
   Begin VB.PictureBox HandBtn
```

Main - 4

```
      BackColor       =   &H8000000D&
      BorderStyle     =   0  'None
      Height          =   1380
      Index           =   16
      Left            =   2355
      Picture         =   (Bitmap)
      ScaleHeight     =   1380
      ScaleWidth      =   1185
      TabIndex        =   58
      Top             =   4520
      Visible         =   0   'False
      Width           =   1180
   End
   Begin VB.PictureBox HandBtn
      BackColor       =   &H8000000D&
      BorderStyle     =   0  'None
      Height          =   1380
      Index           =   15
      Left            =   7320
      Picture         =   (Bitmap)
      ScaleHeight     =   1380
      ScaleWidth      =   1185
      TabIndex        =   57
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1380
      Index           =   14
      Left            =   6080
      Picture         =   (Bitmap)
      ScaleHeight     =   1380
      ScaleWidth      =   1185
      TabIndex        =   56
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1380
      Index           =   13
      Left            =   4840
      Picture         =   (Bitmap)
      ScaleHeight     =   1380
      ScaleWidth      =   1185
      TabIndex        =   55
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1380
      Index           =   12
      Left            =   3600
      Picture         =   (Bitmap)
      ScaleHeight     =   1380
      ScaleWidth      =   1185
      TabIndex        =   54
      Top             =   3120
      Visible         =   0   'False
      Width           =   1180
```

Main - 5

```
    End
    Begin VB.PictureBox HandBtn
       BackColor       =   &H8000000D&
       BorderStyle     =   0  'None
       Height          =   1380
       Index           =   11
       Left            =   2360
       Picture         =   (Bitmap)
       ScaleHeight     =   1380
       ScaleWidth      =   1185
       TabIndex        =   53
       Top             =   3120
       Visible         =   0   'False
       Width           =   1180
    End
    Begin VB.PictureBox HandBtn
       BackColor       =   &H8000000D&
       BorderStyle     =   0  'None
       Height          =   1335
       Index           =   8
       Left            =   8880
       ScaleHeight     =   1335
       ScaleWidth      =   1095
       TabIndex        =   51
       Top             =   1800
       Visible         =   0   'False
       Width           =   1095
       Begin VB.PictureBox HandBtn
          BackColor       =   &H8000000D&
          BorderStyle     =   0  'None
          Height          =   1335
          Index           =   9
          Left            =   240
          ScaleHeight     =   1335
          ScaleWidth      =   1095
          TabIndex        =   52
          Top             =   -120
          Visible         =   0   'False
          Width           =   1095
       End
    End
    Begin VB.PictureBox HandBtn
       BackColor       =   &H8000000D&
       BorderStyle     =   0  'None
       Height          =   1335
       Index           =   7
       Left            =   8880
       ScaleHeight     =   1335
       ScaleWidth      =   1095
       TabIndex        =   50
       Top             =   1800
       Visible         =   0   'False
       Width           =   1095
    End
    Begin VB.PictureBox HandBtn
       BackColor       =   &H8000000D&
       BorderStyle     =   0  'None
       Height          =   1380
       Index           =   6
       Left            =   2360
       Picture         =   (Bitmap)
       ScaleHeight     =   1380
       ScaleWidth      =   1185
       TabIndex        =   49
       Top             =   1720
       Visible         =   0   'False
       Width           =   1180
    End
```

Main - 6

```
   Begin VB.PictureBox HandBtn
      BackColor       =   &H8000000D&
      BorderStyle     =   0  'None
      Height          =   1380
      Index           =   5
      Left            =   7320
      Picture         =   (Bitmap)
      ScaleHeight     =   1380
      ScaleWidth      =   1185
      TabIndex        =   48
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   4
      Left            =   6080
      Picture         =   (Bitmap)
      ScaleHeight     =   1380
      ScaleWidth      =   1185
      TabIndex        =   47
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   3
      Left            =   4840
      Picture         =   (Bitmap)
      ScaleHeight     =   1380
      ScaleWidth      =   1185
      TabIndex        =   46
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   2
      Left            =   3600
      Picture         =   (Bitmap)
      ScaleHeight     =   1380
      ScaleWidth      =   1185
      TabIndex        =   45
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   1
      Left            =   2360
      Picture         =   (Bitmap)
      ScaleHeight     =   1380
      ScaleWidth      =   1185
      TabIndex        =   44
      Top             =   330
      Visible         =   0   'False
```

```
Main - 7

      Width             =   1180
   End
   Begin PTTLib.Crd Hand
      Height            =   1380
      Index             =   6
      Left              =   2360
      TabIndex          =   14
      Top               =   1720
      Width             =   1180
      _Version          =   65536
      _ExtentX          =   2081
      _ExtentY          =   2434
      _StockProps       =   32
      BorderStyle       =   1
   End
   Begin PTTLib.Crd Hand
      Height            =   1380
      Index             =   1
      Left              =   2360
      TabIndex          =   9
      Top               =   330
      Width             =   1180
      _Version          =   65536
      _ExtentX          =   2081
      _ExtentY          =   2434
      _StockProps       =   32
      BorderStyle       =   1
   End
   Begin PTTLib.Crd Hand
      Height            =   1380
      Index             =   2
      Left              =   3600
      TabIndex          =   10
      Top               =   330
      Width             =   1180
      _Version          =   65536
      _ExtentX          =   2081
      _ExtentY          =   2434
      _StockProps       =   32
      BorderStyle       =   1
   End
   Begin PTTLib.Crd Hand
      Height            =   1380
      Index             =   3
      Left              =   4840
      TabIndex          =   11
      Top               =   330
      Width             =   1180
      _Version          =   65536
      _ExtentX          =   2081
      _ExtentY          =   2434
      _StockProps       =   32
      BorderStyle       =   1
   End
   Begin PTTLib.Crd Hand
      Height            =   1380
      Index             =   4
      Left              =   6080
      TabIndex          =   12
      Top               =   330
      Width             =   1180
      _Version          =   65536
      _ExtentX          =   2081
      _ExtentY          =   2434
      _StockProps       =   32
      BorderStyle       =   1
   End
   Begin PTTLib.Crd Hand
```

```
Main - 8

      Height          =    1380
      Index           =    5
      Left            =    7320
      TabIndex        =    13
      Top             =    330
      Width           =    1180
      _Version        =    65536
      _ExtentX        =    2081
      _ExtentY        =    2434
      _StockProps     =    32
      BorderStyle     =    1
   End
   Begin PTTLib.Crd Hand
      Height          =    1380
      Index           =    15
      Left            =    7320
      TabIndex        =    23
      Top             =    3120
      Width           =    1180
      _Version        =    65536
      _ExtentX        =    2081
      _ExtentY        =    2434
      _StockProps     =    32
      BorderStyle     =    1
   End
   Begin PTTLib.Crd Hand
      Height          =    1380
      Index           =    14
      Left            =    6080
      TabIndex        =    22
      Top             =    3120
      Width           =    1180
      _Version        =    65536
      _ExtentX        =    2081
      _ExtentY        =    2434
      _StockProps     =    32
      BorderStyle     =    1
   End
   Begin PTTLib.Crd Hand
      Height          =    1380
      Index           =    13
      Left            =    4840
      TabIndex        =    21
      Top             =    3120
      Width           =    1180
      _Version        =    65536
      _ExtentX        =    2081
      _ExtentY        =    2434
      _StockProps     =    32
      BorderStyle     =    1
   End
   Begin PTTLib.Crd Hand
      Height          =    1380
      Index           =    12
      Left            =    3600
      TabIndex        =    20
      Top             =    3120
      Width           =    1180
      _Version        =    65536
      _ExtentX        =    2081
      _ExtentY        =    2434
      _StockProps     =    32
      BorderStyle     =    1
   End
   Begin PTTLib.Crd Hand
      Height          =    1380
      Index           =    11
      Left            =    2360
```

Main - 9

```
      TabIndex         =    19
      Top              =    3120
      Width            =    1180
      _Version         =    65536
      _ExtentX         =    2081
      _ExtentY         =    2434
      _StockProps      =    32
      BorderStyle      =    1
   End
   Begin PTTLib.Crd Hand
      Height           =    1380
      Index            =    16
      Left             =    2360
      TabIndex         =    24
      Top              =    4520
      Width            =    1180
      _Version         =    65536
      _ExtentX         =    2081
      _ExtentY         =    2434
      _StockProps      =    32
      BorderStyle      =    1
   End
   Begin PTTLib.Crd Hand
      Height           =    1380
      Index            =    21
      Left             =    2360
      TabIndex         =    29
      Top              =    5940
      Width            =    1180
      _Version         =    65536
      _ExtentX         =    2081
      _ExtentY         =    2434
      _StockProps      =    32
      BorderStyle      =    1
   End
   Begin PTTLib.Crd Hand
      Height           =    1380
      Index            =    22
      Left             =    3600
      TabIndex         =    30
      Top              =    5940
      Width            =    1180
      _Version         =    65536
      _ExtentX         =    2081
      _ExtentY         =    2434
      _StockProps      =    32
      BorderStyle      =    1
   End
   Begin PTTLib.Crd Hand
      Height           =    1380
      Index            =    23
      Left             =    4840
      TabIndex         =    31
      Top              =    5940
      Width            =    1180
      _Version         =    65536
      _ExtentX         =    2081
      _ExtentY         =    2434
      _StockProps      =    32
      BorderStyle      =    1
   End
   Begin PTTLib.Crd Hand
      Height           =    1380
      Index            =    24
      Left             =    6080
      TabIndex         =    32
      Top              =    5940
      Width            =    1180
```

Main - 10

```
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   25
      Left            =   7320
      TabIndex        =   33
      Top             =   5940
      Width           =   1180
      _Version        =   65536
      _ExtentX        =   2081
      _ExtentY        =   2434
      _StockProps     =   32
      BorderStyle     =   1
   End
   Begin PTTLib.Crd CurrentCard
      Height          =   2895
      Left            =   120
      TabIndex        =   5
      Top             =   3000
      Width           =   1995
      _Version        =   65536
      _ExtentX        =   3519
      _ExtentY        =   5106
      _StockProps     =   32
      BorderStyle     =   1
   End
   Begin PTTLib.Crd OnDeckCard
      Height          =   2235
      Left            =   360
      TabIndex        =   6
      Top             =   1800
      Width           =   1575
      _Version        =   65536
      _ExtentX        =   2778
      _ExtentY        =   3942
      _StockProps     =   32
      BorderStyle     =   1
   End
   Begin PTTLib.Crd OnDoubleDeckCard
      Height          =   1635
      Left            =   480
      TabIndex        =   7
      Top             =   720
      Width           =   1335
      _Version        =   65536
      _ExtentX        =   2355
      _ExtentY        =   2884
      _StockProps     =   32
      BorderStyle     =   1
   End
   Begin VB.PictureBox ExitBtn
      AutoSize        =   -1  'True
      BorderStyle     =   0  'None
      Height          =   600
      Left            =   0
      Picture         =   (Bitmap)
      ScaleHeight     =   600
      ScaleWidth      =   2145
      TabIndex        =   4
      Top             =   8460
      Width           =   2145
   End
   Begin VB.TextBox CoinsWon
```

Main - 11

```
      Appearance      =   0  'Flat
      BackColor       =   &H00000000&
      BeginProperty Font
         Name            =   "Arial"
         Size            =   14.25
         Charset         =   0
         Weight          =   700
         Underline       =   0   'False
         Italic          =   0   'False
         Strikethrough   =   0   'False
      EndProperty
      ForeColor       =   &H00FFFFFF&
      Height          =   450
      Left            =   20000
      TabIndex        =   2
      Text            =   "0"
      Top             =   7740
      Width           =   675
   End
   Begin VB.TextBox StartAutoPlay
      BackColor       =   &H000080FF&
      BorderStyle     =   0  'None
      BeginProperty Font
         Name            =   "Arial"
         Size            =   6
         Charset         =   0
         Weight          =   400
         Underline       =   0   'False
         Italic          =   0   'False
         Strikethrough   =   0   'False
      EndProperty
      ForeColor       =   &H000080FF&
      Height          =   285
      Left            =   4080
      TabIndex        =   0
      Text            =   "AutoPlay"
      Top             =   9600
      Width           =   615
   End
   Begin VB.Timer MainTimer
      Interval        =   50
      Left            =   9240
      Top             =   10080
   End
   Begin VB.PictureBox Bet30Btn
      AutoSize        =   -1  'True
      BorderStyle     =   0  'None
      Height          =   600
      Left            =   4920
      Picture         =   (Bitmap)
      ScaleHeight     =   600
      ScaleWidth      =   2145
      TabIndex        =   3
      Top             =   8460
      Width           =   2145
   End
   Begin PTTLib.Crd Hand
      Height          =   1575
      Index           =   7
      Left            =   8760
      TabIndex        =   15
      Top             =   2640
      Width           =   1245
      _Version        =   65536
      _ExtentX        =   2196
      _ExtentY        =   2778
      _StockProps     =   32
   End
```

```
Main - 12

   Begin PTTLib.Crd Hand
      Height          =   1575
      Index           =   8
      Left            =   8880
      TabIndex        =   16
      Top             =   2880
      Width           =   1245
      _Version        =   65536
      _ExtentX        =   2196
      _ExtentY        =   2778
      _StockProps     =   32
   End
   Begin PTTLib.Crd Hand
      Height          =   1575
      Index           =   9
      Left            =   9000
      TabIndex        =   17
      Top             =   2640
      Width           =   1245
      _Version        =   65536
      _ExtentX        =   2196
      _ExtentY        =   2778
      _StockProps     =   32
   End
   Begin PTTLib.Crd Hand
      Height          =   1380
      Index           =   10
      Left            =   7320
      TabIndex        =   18
      Top             =   1760
      Width           =   1185
      _Version        =   65536
      _ExtentX        =   2081
      _ExtentY        =   2434
      _StockProps     =   32
   End
   Begin PTTLib.Crd Hand
      Height          =   1290
      Index           =   17
      Left            =   9000
      TabIndex        =   25
      Top             =   4680
      Width           =   885
      _Version        =   65536
      _ExtentX        =   1561
      _ExtentY        =   2284
      _StockProps     =   32
   End
   Begin PTTLib.Crd Hand
      Height          =   1290
      Index           =   18
      Left            =   9000
      TabIndex        =   26
      Top             =   4680
      Width           =   885
      _Version        =   65536
      _ExtentX        =   1561
      _ExtentY        =   2284
      _StockProps     =   32
   End
   Begin PTTLib.Crd Hand
      Height          =   1290
      Index           =   19
      Left            =   9120
      TabIndex        =   27
      Top             =   4560
      Width           =   885
      _Version        =   65536
```

Main - 13

```
      _ExtentX        =   1561
      _ExtentY        =   2284
      _StockProps     =   32
   End
   Begin VB.Label Credits
      Alignment       =   2  'Center
      BackStyle       =   0  'Transparent
      Caption         =   "1000"
      BeginProperty Font
         Name            =   "Courier New"
         Size            =   24
         Charset         =   0
         Weight          =   700
         Underline       =   0   'False
         Italic          =   0   'False
         Strikethrough   =   0   'False
      EndProperty
      ForeColor       =   &H000000FF&
      Height          =   495
      Left            =   10440
      TabIndex        =   69
      Top             =   3560
      Width           =   1275
   End
   Begin VB.Label CoinsIn
      Alignment       =   2  'Center
      BackStyle       =   0  'Transparent
      Caption         =   "0"
      BeginProperty Font
         Name            =   "Courier New"
         Size            =   24
         Charset         =   0
         Weight          =   700
         Underline       =   0   'False
         Italic          =   0   'False
         Strikethrough   =   0   'False
      EndProperty
      ForeColor       =   &H000000FF&
      Height          =   495
      Left            =   10560
      TabIndex        =   43
      Top             =   5470
      Width           =   1035
   End
   Begin VB.Label TotalHandValue
      Alignment       =   2  'Center
      BackStyle       =   0  'Transparent
      Caption         =   "1000"
      BeginProperty Font
         Name            =   "Courier New"
         Size            =   24
         Charset         =   0
         Weight          =   700
         Underline       =   0   'False
         Italic          =   0   'False
         Strikethrough   =   0   'False
      EndProperty
      ForeColor       =   &H000000FF&
      Height          =   495
      Left            =   10440
      TabIndex        =   42
      Top             =   7320
      Width           =   1275
   End
   Begin VB.Label HandValue
      Alignment       =   2  'Center
      BackColor       =   &H00000000&
      Caption         =   "0"
```

Main - 14

```
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   375
      Index           =   10
      Left            =   7440
      TabIndex        =   41
      Top             =   7725
      Width           =   735
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   375
      Index           =   9
      Left            =   4920
      TabIndex        =   40
      Top             =   7440
      Visible         =   0   'False
      Width           =   1335
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   375
      Index           =   8
      Left            =   5160
      TabIndex        =   39
      Top             =   7680
      Visible         =   0   'False
      Width           =   1335
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
```

```
        Charset          =   0
        Weight           =   700
        Underline        =   0   'False
        Italic           =   0   'False
        Strikethrough    =   0   'False
     EndProperty
     ForeColor       =   &H000000FF&
     Height          =   375
     Index           =   7
     Left            =   5160
     TabIndex        =   38
     Top             =   7680
     Visible         =   0   'False
     Width           =   1335
  End
  Begin VB.Label HandValue
     Alignment       =   2  'Center
     BackColor       =   &H00000000&
     Caption         =   "0"
     BeginProperty Font
        Name             =   "Courier New"
        Size             =   21.75
        Charset          =   0
        Weight           =   700
        Underline        =   0   'False
        Italic           =   0   'False
        Strikethrough    =   0   'False
     EndProperty
     ForeColor       =   &H000000FF&
     Height          =   375
     Index           =   6
     Left            =   2520
     TabIndex        =   37
     Top             =   7720
     Width           =   735
  End
  Begin VB.Label HandValue
     Alignment       =   2  'Center
     BackColor       =   &H00000000&
     Caption         =   "0"
     BeginProperty Font
        Name             =   "Courier New"
        Size             =   21.75
        Charset          =   0
        Weight           =   700
        Underline        =   0   'False
        Italic           =   0   'False
        Strikethrough    =   0   'False
     EndProperty
     ForeColor       =   &H000000FF&
     Height          =   375
     Index           =   4
     Left            =   9120
     TabIndex        =   36
     Top             =   4920
     Visible         =   0   'False
     Width           =   495
  End
  Begin VB.Label HandValue
     Alignment       =   2  'Center
     BackColor       =   &H00000000&
     Caption         =   "0"
     BeginProperty Font
        Name             =   "Courier New"
        Size             =   21.75
        Charset          =   0
        Weight           =   700
        Underline        =   0   'False
```

Main - 16

```
         Italic          =   0   'False
         Strikethrough   =   0   'False
      EndProperty
      ForeColor       =   &H000000FF&
      Height          =   495
      Index           =   3
      Left            =   9000
      TabIndex        =   35
      Top             =   3790
      Width           =   735
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   375
      Index           =   2
      Left            =   8880
      TabIndex        =   34
      Top             =   1680
      Visible         =   0   'False
      Width           =   735
   End
   Begin VB.Label Label1
      BackColor       =   &H00000000&
      Caption         =   "Total Coins Won"
      BeginProperty Font
         Name            =   "Arial"
         Size            =   14.25
         Charset         =   0
         Weight          =   700
         Underline       =   0   'False
         Italic          =   0   'False
         Strikethrough   =   0   'False
      EndProperty
      ForeColor       =   &H0000FFFF&
      Height          =   315
      Index           =   1
      Left            =   12000
      TabIndex        =   8
      Top             =   8400
      Visible         =   0   'False
      Width           =   2445
   End
   Begin VB.Line Line2
      BorderWidth     =   3
      Index           =   7
      X1              =   8400
      X2              =   12000
      Y1              =   0
      Y2              =   0
   End
   Begin VB.Label Label1
      BackColor       =   &H00000000&
      Caption         =   "Coins Won"
      BeginProperty Font
         Name            =   "Arial"
         Size            =   12
```

Main - 17

```
        Charset         =   0
        Weight          =   700
        Underline       =   0   'False
        Italic          =   0   'False
        Strikethrough   =   0   'False
     EndProperty
     ForeColor       =   &H00FFFFFF&
     Height          =   255
     Index           =   2
     Left            =   20000
     TabIndex        =   1
     Top             =   7800
     Width           =   1365
  End
End
```

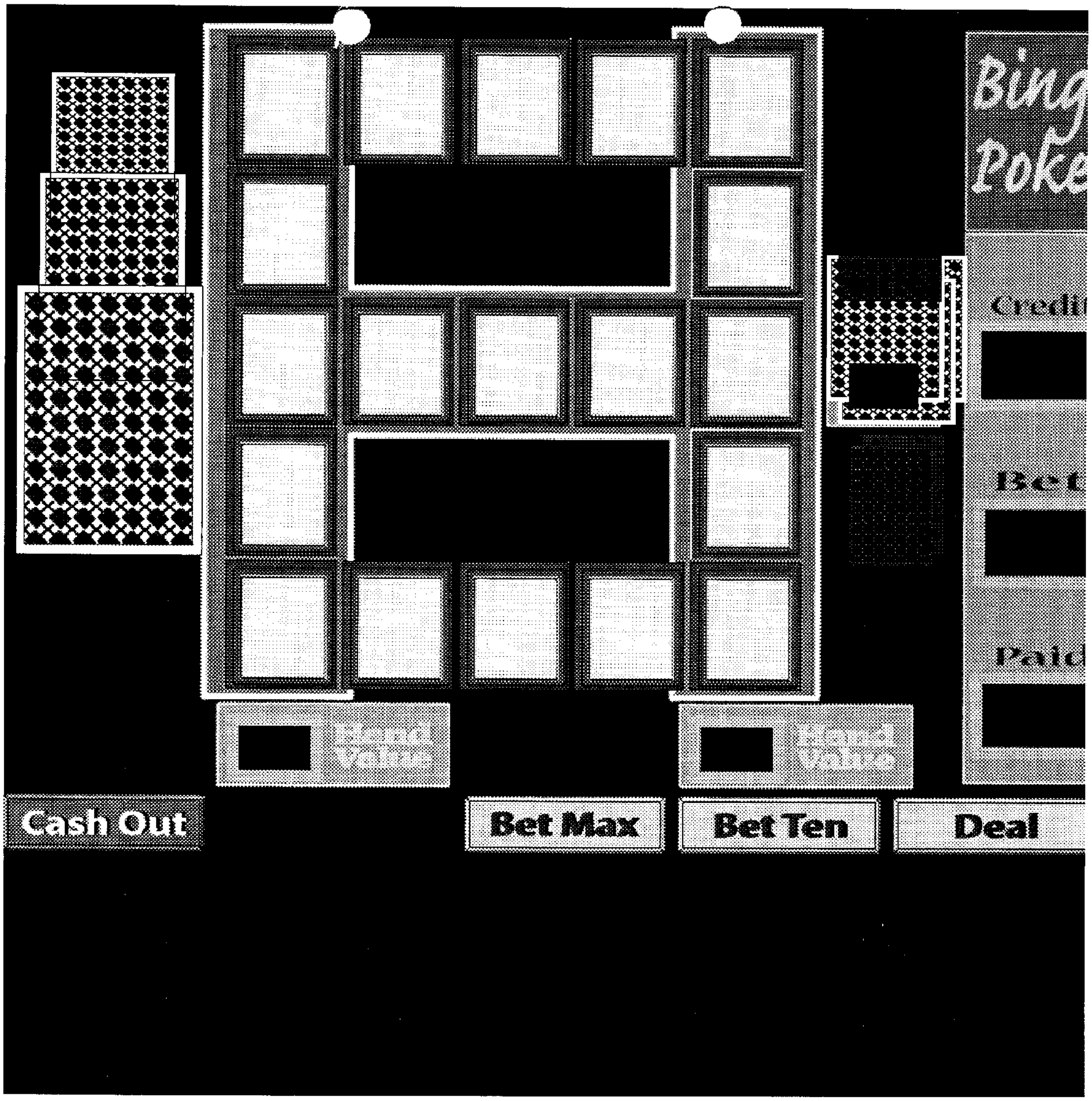
Bing
Poke
Credi
Bet
Paid
Hand Value
Hand Value
Cash Out
Bet Max
Bet Ten
Deal

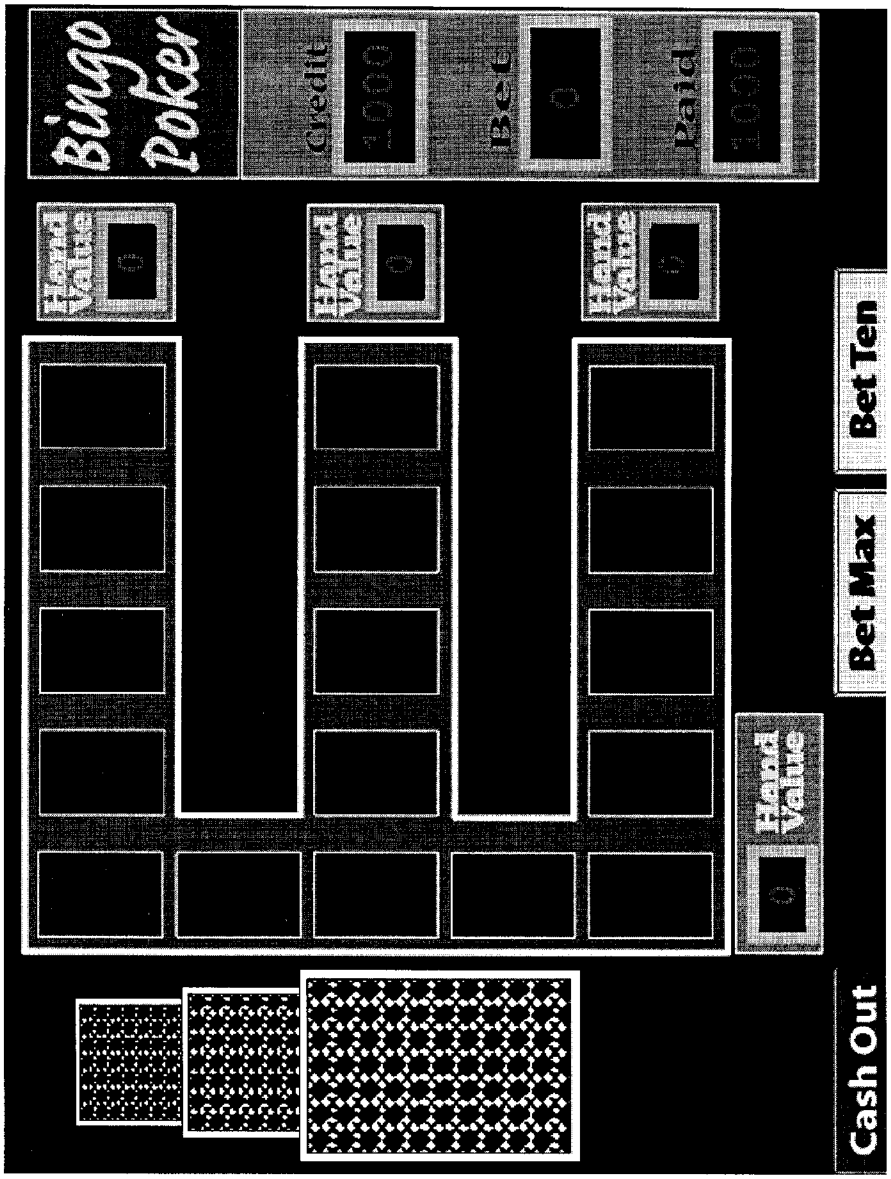
Bingo Poker
Credit
1000
Bet
0
Paid
1000
Hand Value
0
Hand Value
0
Hand Value
0
Bet Ten
Bet Max
Hand Value
0
Cash Out

```
Main - 1

Dim CheckingCards As Integer
Dim Account(6) As Integer, Detail(6, 10) As Integer
Dim DetailPos As Integer
Dim BetTenPressed As Integer

Public Sub ResetAccounting()
    '
    Dim I As Integer, K  As Integer
    '
    Account(1) = 0 ' T Plays
    Account(2) = 0 ' L Plays
    Account(3) = 0 ' I Plays
    Account(4) = 0 ' H Plays
    Account(5) = 0 ' E Plays
    Account(6) = 0 ' O Plays
    '
    For I = 1 To 10
        For K = 1 To 6
            Detail(K, I) = 0
        Next K
    Next I
    '
End Sub

Public Sub WriteAccounting()
    '
    Dim DateTime As Variant
    Dim I As Integer, K As Integer
    Dim Temp As String
    Dim ValTemp As Integer
    Dim Line As String
    '
    DateTime = "Bingo_"
    '
    Temp = Date
    '
    For I = 1 To Len(Temp)
        If Mid(Temp, I, 1) = "/" Then
            DateTime = DateTime & "-"
        Else
            DateTime = DateTime & Mid(Temp, I, 1)
        End If
    Next I
    '
    DateTime = DateTime & "_"
    Temp = Time
    '
    For I = 1 To Len(Temp) - 3
        If Mid(Temp, I, 1) = ":" Then
            DateTime = DateTime & "_"
        Else
            DateTime = DateTime & Mid(Temp, I, 1)
        End If
    Next I
    '
    Open DateTime For Output As #1
    '
    Line = "(1) T" & Chr$(9) & "(2) L" & Chr$(9) & "(3) I" & Chr$(9) & "(4) H" & Chr$(9) & "(5)
E" & Chr$(9) & "(6) O"
    '
    For K = 1 To 6
        For I = 1 To 10
            Line = Line & Chr$(9) & K & "," & I
        Next I
    Next K
    '
    Print #1, Line
    '
```

Main - 2

```
    Line = Account(1) & Chr$(9) & Account(2) & Chr$(9) & Account(3) & Chr$(9) & Account(4) & Chr
$(9) & Account(5) & Chr$(9) & Account(6)
    '
    For K = 1 To 6
        For I = 1 To 10
            Line = Line & Chr$(9) & Detail(K, I)
        Next I
    Next K
    '
    Print #1, Line
    '
    Close #1
    '
End Sub

Private Sub CheckCards()
    '
    Dim I As Integer
    Dim Multiplier As Integer
    Dim D As Integer
    Dim CoinsWon As Integer
    Dim NotStraight As Integer
    Dim Pos(5) As Integer
    Dim Score As Integer
    Dim Cnt As Integer, LineNo As Integer
    Dim R As Integer
    Dim Speed As Integer
    '
    Const SYNC = 1
    Dim TempCredits As Long
    '
    Multiplier = CoinsIn / 10
    '
    CheckingCards = 1
    '
    Score = 0
    TotalCoinsWon = 0
    '
    For D = 1 To NoDirections
        '
        Pos(1) = Direction(D, 1)
        Pos(2) = Direction(D, 2)
        Pos(3) = Direction(D, 3)
        Pos(4) = Direction(D, 4)
        Pos(5) = Direction(D, 5)
        '
        HandValueNo = Direction(D, 0)
        '
        If (Hand(Pos(1)).Value > 0 Or Hand(Pos(2)).Value > 0 Or Hand(Pos(3)).Value > 0 Or Hand(P
os(4)).Value > 0 Or Hand(Pos(5)).Value > 0) Then
            '
            For I = 0 To 4
                Suits(I) = 0
            Next I
            '
            For I = 1 To 13
                Cards(I) = 0
            Next I
            '
            Pair = 0
            OnePair = 0
            LowPair = 0
            ThreeOfAKind = 0
            FourOfAKind = 0
            FirstCard = 0
            Flush = 0
            Straight = 0
            WinnerText = ""
```

Main - 3

```
CoinsWon = 0
'
For I = 1 To 5
    Suits(Hand(Pos(I)).Suit) = Suits(Hand(Pos(I)).Suit) + 1
    Cards(Hand(Pos(I)).Value) = Cards(Hand(Pos(I)).Value) + 1
Next I
'
For I = 1 To 13
    If Cards(I) = 2 Then
        Pair = Pair + 1
    End If
Next I
'
For I = 1 To 13
    If Cards(I) = 3 Then
        ThreeOfAKind = 1
    End If
Next I
'
For I = 1 To 13
    If Cards(I) = 4 Then
        FourOfAKind = 1
    End If
Next I
'
For I = 0 To 3
    If Suits(I) = 5 Then
        Flush = 1
    End If
Next I
'
Do
    FirstCard = FirstCard + 1
Loop Until Cards(FirstCard) > 0
'
NotStraight = False
'
If FirstCard <= 9 Then
    If Cards(FirstCard + 1) = 1 And Cards(FirstCard + 2) = 1 And Cards(FirstCard + 3
) = 1 And Cards(FirstCard + 4) = 1 Then
        Straight = 1
    End If
End If
'
If FirstCard = 1 Then
    If (Cards(10) = 1 And Cards(11) = 1 And Cards(12) = 1 And Cards(13)) = 1 Then
        Straight = 1
    End If
End If
'
For I = 11 To 13
    If Cards(I) = 2 Then OnePair = 1
Next I
'
If Cards(1) = 2 Then OnePair = 1
'
For I = 2 To 12
    If Cards(I) = 2 Then LowPair = 1
Next I
'
If Flush = 1 And Straight = 1 And Cards(13) = 1 And Cards(1) = 1 Then
    CoinsWon = RoyalFlushPayOff * Multiplier
    LineNo = 10
    If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
        CoinsWon = 0
    End If
ElseIf Flush = 1 And Straight = 1 Then
```

Main - 4

```
                LineNo = 9
                CoinsWon = StraightFlushPayOff * Multiplier
                If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                    CoinsWon = 0
                End If
            ElseIf FourOfAKind = 1 Then
                LineNo = 8
                CoinsWon = FourOfAKindPayOff * Multiplier
            ElseIf ThreeOfAKind = 1 And Pair = 1 Then
                    LineNo = 7
                    CoinsWon = FullHousePayOff * Multiplier
            ElseIf Flush = 1 Then
                LineNo = 6
                CoinsWon = FlushPayOff * Multiplier
                If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                    CoinsWon = 0
                End If
            ElseIf Straight = 1 Then
                LineNo = 5
                CoinsWon = StraightPayOff * Multiplier
                If (Hand(Pos(1)).Value = 0 Or Hand(Pos(2)).Value = 0 Or Hand(Pos(3)).Value = 0 O
r Hand(Pos(4)).Value = 0 Or Hand(Pos(5)).Value = 0) Then
                    CoinsWon = 0
                End If
            ElseIf ThreeOfAKind = 1 Then
                LineNo = 4
                CoinsWon = ThreeOfAKindPayOff * Multiplier
            ElseIf Pair = 2 Then
                LineNo = 3
                CoinsWon = TwoPairPayOff * Multiplier
            ElseIf OnePair = 1 Then
                LineNo = 2
                CoinsWon = OnePairPayOff * Multiplier
            ElseIf LowPair = 1 Then
                LineNo = 1
                CoinsWon = LowPairPayOff * Multiplier
            End If
            '
        Else
            CoinsWon = 0
        End If
        '
        If CoinsWon > 0 And CardCnt = NoCards Then
            '
            Detail(DetailPos, LineNo) = Detail(DetailPos, LineNo) + 1
            '
        End If
        '
        HandValue(HandValueNo) = CoinsWon
        '
        TotalCoinsWon = TotalCoinsWon + CoinsWon
        '
        Score = Score + CoinsWon
        '
    Next D
    '
    If Score > TotalHandValue Then
        '
        TempCredits = Score
        '
        Cnt = Score - TotalHandValue
        TempCredits = Score + Cnt
        '
        Select Case TempCredits
            Case 0 To 15
                Speed = 1
```

```
Main - 5
            Case 16 To 35
                Speed = 2
            Case 36 To 60
                Speed = 3
            Case 61 To 120
                Speed = 4
            Case 121 To 2500
                Speed = 5
            Case Else
                Speed = 6
        End Select
        '
        For I = 1 To Cnt Step Speed
            TotalHandValue = TotalHandValue + Speed
            R = sndPlaySound(ByVal WavesDir & CoinWonSound, SYNC)
            Sleeper (90)
        Next I
        TotalHandValue = TempCredits
    End If
    '
    TotalHandValue.Caption = Score
    '
    CheckingCards = 0
    '
End Sub

Private Sub Bet10Btn_Click()
    '
    Dim R As Integer
    Const SYNC = 1
    R = sndPlaySound(ByVal WavesDir & PlaceCardSound, SYNC)
    '
    If BetTenPressed = 0 Then
        CoinsIn = 0
        BetTenPressed = 1
    End If
    '
    '
    If CInt(Credits) > CInt(CoinsIn) Then
        CoinsIn = CoinsIn + 10
        DealBtn.Visible = True
        If CoinsIn > 50 Then CoinsIn = 50
        If CoinsIn = 50 Then
            Sleeper (100)
            Deal
        End If
    End If
End Sub

Private Sub Bet30Btn_Click()
    '
    Dim R As Integer
    Const SYNC = 1
    R = sndPlaySound(ByVal WavesDir & PlaceCardSound, SYNC)
    '
    CoinsIn = 50
    '
    Deal
    '
End Sub


Private Sub DealBtn_Click()
    '
    Dim R As Integer
    Const SYNC = 1
    R = sndPlaySound(ByVal WavesDir & PlaceCardSound, SYNC)
    Sleeper (100)
```

Main - 6

```
    '
    Deal
    '
End Sub

Private Sub ExitBtn_Click()
    Dim R As Integer
    Const SYNC = 1
    Bet30Btn.Visible = False
    Bet10Btn.Visible = False
    DealBtn.Visible = False
    ExitBtn.Visible = False
    '
    R = sndPlaySound(ByVal WavesDir & ExitBtnSound, SYNC)
    WriteAccounting
    Sleeper (3500)
    End
End Sub

Private Sub Form_Load()
    '
    BetTenPressed = 0
    '
    Main.Top = 0
    Main.Left = 0
    Main.Width = 12000
    Main.Height = 9100
    '
    Randomize
    '
    ResetAccounting
    '
    Dim I As Integer
    '
    For I = 1 To 25
        Hand(I).Value = 0
        Hand(I).Suit = 0
        Hand(I).Gold = 0
        Hand(I).Visible = False
        Hand(I).ViewMode = 1
    Next I
    '
    CurrentCard.Gold = 0
    CurrentCard.Value = 0
    OnDeckCard.Gold = 0
    OnDeckCard.Value = 0
    CurrentCard.ViewMode = 0
    OnDeckCard.ViewMode = 0
    OnDoubleDeckCard.Value = 0
    '
    Mode = NONE
    CardCnt = 0
    '
    GamesDir = "Y:\Games\"
    TokenGamesDir = "Y:\Games\Tokens\"
    MasterDir = "Y:\MasterDir\"
    TokenMasterDir = "Y:\MasterDir\Tokens\"
    WavesDir = "c:\world\"
    '
    PlayerID = CStr(Int((1000 * Rnd) + 1))
    '
    ToFileName = GamesDir & PlayerID & ".TG"
    TokenToFileName = TokenGamesDir & PlayerID & ".TG"
    FromFileName = GamesDir & PlayerID & ".FG"
    TokenFromFileName = TokenGamesDir & PlayerID & ".FG"
    ToMasterFileName = MasterDir & PlayerID & ".fp"
    TokenToMasterFileName = TokenMasterDir & PlayerID & ".fp"
```

```
Main - 7

    AutoPlayFlag = False

    Open "c:\world\epayoff.txt" For Input As #1
    '
    Input #1, RoyalFlushPayOff
    Input #1, StraightFlushPayOff
    Input #1, FourOfAKindPayOff
    Input #1, FullHousePayOff
    Input #1, FlushPayOff
    Input #1, StraightPayOff
    Input #1, ThreeOfAKindPayOff
    Input #1, TwoPairPayOff
    Input #1, OnePairPayOff
    Input #1, LowPairPayOff

    Close #1

End Sub

Private Sub Hand_MouseDown(Index As Integer, Button As Integer, Shift As Integer, X As Single, Y
 As Single)
    If Hand(Index).Value = 0 And CurrentCard.Value > 0 Then

        Hand(Index).Value = CurrentCard.Value
        Hand(Index).Suit = CurrentCard.Suit

        CurrentCard.Value = 0
        CurrentCard.Suit = 0

        Dim R As Integer
        Const SYNC = 1
        R = sndPlaySound(ByVal WavesDir & PlaceCardSound, SYNC)

        CheckCards

        Mode = CARDPICKED

    End If
End Sub


Private Sub HScroll1_Change()

End Sub

Private Sub HandBtn_MouseDown(Index As Integer, Button As Integer, Shift As Integer, X As Single
, Y As Single)
    If Hand(Index).Value = 0 And CurrentCard.Value > 0 Then

        HandBtn(Index).Visible = False

        Hand(Index).Value = CurrentCard.Value
        Hand(Index).Suit = CurrentCard.Suit

        CurrentCard.Value = 0
        CurrentCard.Suit = 0

        Dim R As Integer
        Const SYNC = 1
        R = sndPlaySound(ByVal WavesDir & PlaceCardSound, SYNC)

        CheckCards

        Mode = CARDPICKED

    End If

End Sub
```

Main - 8

```
Private Sub MainTimer_Timer()

    Dim Good As Integer
    Dim R As Integer
    Const SYNC = 1
    Dim TempCredits As Long
    Dim Speed As Integer
    '
    Select Case Mode
        Case CARDPICKED
            If CheckingCards = 0 Then
                CardCnt = CardCnt + 1
                If CardCnt < NoCards Then
                    '
                    If CardCnt + 1 = NoCards Then
                        OnDoubleDeckCard.Visible = False
                    End If
                    '
                    FlipNextCards
                    '
                    ' R = sndPlaySound(ByVal WavesDir & PlaceCardSound, SYNC)
                    '
                    CurrentCard.Value = OnDeckCard.Value
                    CurrentCard.Suit = OnDeckCard.Suit
                    '
                    OnDeckCard.Value = NewCardValue1
                    OnDeckCard.Suit = NewCardSuit1
                    '
                    If AutoPlayFlag Then
                        Mode = AUTOPLAY
                    End If
                Else
                    '
                    ' R = sndPlaySound(ByVal WavesDir & PlaceCardSound, SYNC)
                    '
                    CurrentCard.Value = OnDeckCard.Value
                    CurrentCard.Suit = OnDeckCard.Suit
                    '
                    OnDeckCard.Value = 0
                    OnDeckCard.Visible = False
                    '
                    If CardCnt > NoCards Then
                        CurrentCard.Visible = False
                        '
                        CoinsWon.Text = TotalCoinsWon
                        TempCredits = Credits.Caption + TotalCoinsWon
                        '
                        Select Case TempCredits
                            Case 0 To 15
                                Speed = 1
                            Case 16 To 35
                                Speed = 2
                            Case 36 To 60
                                Speed = 3
                            Case 61 To 120
                                Speed = 4
                            Case 121 To 2500
                                Speed = 5
                            Case Else
                                Speed = 6
                        End Select
                        '
                        For I = 1 To TotalCoinsWon
                            If I Mod Speed = 0 Then
                                Credits.Caption = Credits.Caption + Speed
                                R = sndPlaySound(ByVal WavesDir & CoinWonSound, SYNC)
                                DoEvents
```

Main - 9

```
                        Sleep (90)
                    End If
                Next I
                '
                Credits.Caption = TempCredits
                '
                BetTenPressed = 0
                '
                Bet30Btn.Visible = True
                Bet10Btn.Visible = True
                DealBtn.Visible = True
                ExitBtn.Visible = True
                '
            End If
        End If
        If AutoPlayFlag Then
            Mode = AUTOPLAY
        Else
           Mode = NONE
        End If
    End If
  Case Else

    End Select


End Sub

Private Sub vaBtn1_Click()
    '
    Dim R As Integer
    Const SYNC = 1
    R = sndPlaySound(ByVal WavesDir & PlaceCardSound, SYNC)
    '
    Credits = Credits - 20
    CoinsWon = 0
    '
    Bet5Btn.Visible = False
    '
    NewLetter (Letter)
    '
    For I = 1 To 52
        Deck(I) = 0
    Next I
    '
    FlipNextCards
    '
    OnDeckCard.Value = NewCardValue1
    OnDeckCard.Suit = NewCardSuit1
    '
    FlipNextCards
    '
    CurrentCard.Value = NewCardValue1
    CurrentCard.Suit = NewCardSuit1
    '
    CardCnt = 0
    '
End Sub


Private Sub Picture2_Click()

End Sub

Private Sub StartAutoPlay_MouseDown(Button As Integer, Shift As Integer, X As Single, Y As Singl
e)
    Mode = AUTOPLAY
    AutoPlayFlag = True
```

```
Main - 10

End Sub

Public Sub Deal()
    '
    Credits = Credits - CoinsIn
    '
    CoinsWon = 0
    '
    Bet30Btn.Visible = False
    Bet10Btn.Visible = False
    DealBtn.Visible = False
    ExitBtn.Visible = False
    '
    Select Case Int(Rnd * 1)
        Case 0
            Letter = "E"
            DetailPos = 5
        Case 1
            Letter = "O"
            DetailPos = 6
    End Select
    '
    Account(DetailPos) = Account(DetailPos) + 1
    '
    NewLetter (Letter)
    '
    For I = 1 To 52
        Deck(I) = 0
    Next I
    '
    FlipNextCards
    '
    CurrentCard.Visible = True
    OnDeckCard.Visible = True
    OnDoubleDeckCard.Visible = True
    OnDoubleDeckCard.ZOrder
    OnDeckCard.ZOrder
    CurrentCard.ZOrder
    '
    OnDeckCard.Value = NewCardValue1
    OnDeckCard.Suit = NewCardSuit1
    '
    FlipNextCards
    '
    CurrentCard.Value = NewCardValue1
    CurrentCard.Suit = NewCardSuit1
    '
    CardCnt = 0
    '
End Sub
```

```
Main - 1

VERSION 5.00
Object = "{B9BFC920-7F41-11D0-A45D-00A0C90DECE7}#1.0#0"; "PTT.OCX"
Begin VB.Form Main
   Appearance      =   0  'Flat
   BackColor       =   &H80000006&
   BorderStyle     =   0  'None
   ClientHeight    =   11670
   ClientLeft      =   1020
   ClientTop       =   1095
   ClientWidth     =   14745
   ClipControls    =   0   'False
   ControlBox      =   0   'False
   Icon            =   (Icon)
   LinkTopic       =   "Form1"
   MaxButton       =   0   'False
   MinButton       =   0   'False
   PaletteMode     =   1  'UseZOrder
   Picture         =   (Bitmap)
   ScaleHeight     =   11670
   ScaleWidth      =   14745
   ShowInTaskbar   =   0   'False
   Begin VB.PictureBox DealBtn
      AutoSize        =   -1  'True
      BorderStyle     =   0  'None
      Height          =   600
      Left            =   9480
      Picture         =   (Bitmap)
      ScaleHeight     =   600
      ScaleWidth      =   2145
      TabIndex        =   72
      Top             =   8460
      Visible         =   0   'False
      Width           =   2145
   End
   Begin VB.PictureBox Bet10Btn
      AutoSize        =   -1  'True
      BorderStyle     =   0  'None
      Height          =   600
      Left            =   7200
      Picture         =   (Bitmap)
      ScaleHeight     =   600
      ScaleWidth      =   2145
      TabIndex        =   71
      Top             =   8460
      Width           =   2145
   End
   Begin VB.PictureBox HandBtn
      BackColor       =   &H8000000D&
      BorderStyle     =   0  'None
      Height          =   1380
      Index           =   25
      Left            =   7320
      Picture         =   (Bitmap)
      ScaleHeight     =   1380
      ScaleWidth      =   1185
      TabIndex        =   70
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   24
      Left            =   6080
      Picture         =   (Bitmap)
      ScaleHeight     =   1380
```

Main - 2

```
      ScaleWidth      =   1185
      TabIndex        =   69
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   23
      Left            =   4840
      Picture         =   (Bitmap)
      ScaleHeight     =   1380
      ScaleWidth      =   1185
      TabIndex        =   68
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   22
      Left            =   3600
      Picture         =   (Bitmap)
      ScaleHeight     =   1380
      ScaleWidth      =   1185
      TabIndex        =   67
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1380
      Index           =   21
      Left            =   2360
      Picture         =   (Bitmap)
      ScaleHeight     =   1380
      ScaleWidth      =   1185
      TabIndex        =   66
      Top             =   5940
      Visible         =   0   'False
      Width           =   1180
   End
   Begin VB.PictureBox HandBtn
      BackColor       =   &H8000000D&
      BorderStyle     =   0  'None
      Height          =   1335
      Index           =   20
      Left            =   8760
      ScaleHeight     =   1335
      ScaleWidth      =   1095
      TabIndex        =   65
      Top             =   4560
      Visible         =   0   'False
      Width           =   1095
   End
   Begin VB.PictureBox HandBtn
      BackColor       =   &H8000000D&
      BorderStyle     =   0  'None
      Height          =   1335
      Index           =   19
      Left            =   9000
      ScaleHeight     =   1335
```

Main - 3

```
      ScaleWidth      =   1095
      TabIndex        =   64
      Top             =   4680
      Visible         =   0    'False
      Width           =   1095
   End
   Begin VB.PictureBox HandBtn
      BackColor       =   &H8000000D&
      BorderStyle     =   0  'None
      Height          =   1335
      Index           =   18
      Left            =   8760
      ScaleHeight     =   1335
      ScaleWidth      =   1095
      TabIndex        =   63
      Top             =   4560
      Visible         =   0    'False
      Width           =   1095
   End
   Begin VB.PictureBox HandBtn
      BackColor       =   &H8000000D&
      BorderStyle     =   0  'None
      Height          =   1335
      Index           =   17
      Left            =   8760
      ScaleHeight     =   1335
      ScaleWidth      =   1095
      TabIndex        =   62
      Top             =   4680
      Visible         =   0    'False
      Width           =   1095
   End
   Begin VB.PictureBox HandBtn
      BackColor       =   &H8000000D&
      BorderStyle     =   0  'None
      Height          =   1380
      Index           =   16
      Left            =   2360
      Picture         =   (Bitmap)
      ScaleHeight     =   1380
      ScaleWidth      =   1185
      TabIndex        =   61
      Top             =   4520
      Visible         =   0    'False
      Width           =   1180
   End
   Begin VB.PictureBox HandBtn
      BackColor       =   &H8000000D&
      BorderStyle     =   0  'None
      Height          =   1380
      Index           =   15
      Left            =   7320
      Picture         =   (Bitmap)
      ScaleHeight     =   1380
      ScaleWidth      =   1185
      TabIndex        =   60
      Top             =   3120
      Visible         =   0    'False
      Width           =   1180
   End
   Begin VB.PictureBox HandBtn
      BackColor       =   &H8000000D&
      BorderStyle     =   0  'None
      Height          =   1380
      Index           =   14
      Left            =   6080
      Picture         =   (Bitmap)
      ScaleHeight     =   1380
```

Main - 4

```
      ScaleWidth      =   1185
      TabIndex        =   59
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1380
      Index           =   13
      Left            =   4840
      Picture         =   (Bitmap)
      ScaleHeight     =   1380
      ScaleWidth      =   1185
      TabIndex        =   58
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1380
      Index           =   12
      Left            =   3600
      Picture         =   (Bitmap)
      ScaleHeight     =   1380
      ScaleWidth      =   1185
      TabIndex        =   57
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1380
      Index           =   11
      Left            =   2360
      Picture         =   (Bitmap)
      ScaleHeight     =   1380
      ScaleWidth      =   1185
      TabIndex        =   56
      Top             =   3120
      Visible         =   0   'False
      Width           =   1180
   End
   Begin VB.PictureBox HandBtn
      BackColor       =   &H8000000D&
      BorderStyle     =   0  'None
      Height          =   1335
      Index           =   10
      Left            =   8880
      ScaleHeight     =   1335
      ScaleWidth      =   1095
      TabIndex        =   55
      Top             =   1800
      Visible         =   0   'False
      Width           =   1095
   End
   Begin VB.PictureBox HandBtn
      BackColor       =   &H8000000D&
      BorderStyle     =   0  'None
      Height          =   1335
      Index           =   8
      Left            =   8880
      ScaleHeight     =   1335
```

Main - 5

```
      ScaleWidth      =   1095
      TabIndex        =   53
      Top             =   1800
      Visible         =   0   'False
      Width           =   1095
      Begin VB.PictureBox HandBtn
         BackColor       =   &H8000000D&
         BorderStyle     =   0  'None
         Height          =   1335
         Index           =   9
         Left            =   240
         ScaleHeight     =   1335
         ScaleWidth      =   1095
         TabIndex        =   54
         Top             =   -120
         Visible         =   0   'False
         Width           =   1095
      End
   End
   Begin VB.PictureBox HandBtn
      BackColor       =   &H8000000D&
      BorderStyle     =   0  'None
      Height          =   1335
      Index           =   7
      Left            =   8880
      ScaleHeight     =   1335
      ScaleWidth      =   1095
      TabIndex        =   52
      Top             =   1800
      Visible         =   0   'False
      Width           =   1095
   End
   Begin VB.PictureBox HandBtn
      BackColor       =   &H8000000D&
      BorderStyle     =   0  'None
      Height          =   1380
      Index           =   6
      Left            =   2360
      Picture         =   (Bitmap)
      ScaleHeight     =   1380
      ScaleWidth      =   1185
      TabIndex        =   51
      Top             =   1720
      Visible         =   0   'False
      Width           =   1180
   End
   Begin VB.PictureBox HandBtn
      BackColor       =   &H8000000D&
      BorderStyle     =   0  'None
      Height          =   1380
      Index           =   5
      Left            =   7320
      Picture         =   (Bitmap)
      ScaleHeight     =   1380
      ScaleWidth      =   1185
      TabIndex        =   50
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   4
      Left            =   6080
      Picture         =   (Bitmap)
      ScaleHeight     =   1380
```

Main - 6

```
      ScaleWidth      =   1185
      TabIndex        =   49
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   3
      Left            =   4840
      Picture         =   (Bitmap)
      ScaleHeight     =   1380
      ScaleWidth      =   1185
      TabIndex        =   48
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   2
      Left            =   3600
      Picture         =   (Bitmap)
      ScaleHeight     =   1380
      ScaleWidth      =   1185
      TabIndex        =   47
      Top             =   330
      Visible         =   0   'False
      Width           =   1180
   End
   Begin VB.PictureBox HandBtn
      BackColor       =   &H8000000D&
      BorderStyle     =   0  'None
      Height          =   1380
      Index           =   1
      Left            =   2360
      Picture         =   (Bitmap)
      ScaleHeight     =   1380
      ScaleWidth      =   1185
      TabIndex        =   46
      Top             =   330
      Visible         =   0   'False
      Width           =   1180
   End
   Begin PTTLib.Crd Hand
      Height          =   1380
      Index           =   6
      Left            =   2360
      TabIndex        =   14
      Top             =   1720
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   1
      Left            =   2360
      TabIndex        =   9
      Top             =   330
      Width           =   1180
```

Main - 7

```
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   2
      Left            =   3600
      TabIndex        =   10
      Top             =   330
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   3
      Left            =   4840
      TabIndex        =   11
      Top             =   330
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   4
      Left            =   6080
      TabIndex        =   12
      Top             =   330
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   5
      Left            =   7320
      TabIndex        =   13
      Top             =   330
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   15
      Left            =   7320
      TabIndex        =   23
      Top             =   3120
      Width           =   1180
      _Version        =   65536
      _ExtentX        =   2081
      _ExtentY        =   2434
```

```
Main - 8

      _StockProps     =   32
      BorderStyle     =   1
   End
   Begin PTTLib.Crd Hand
      Height          =   1380
      Index           =   14
      Left            =   6080
      TabIndex        =   22
      Top             =   3120
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   13
      Left            =   4840
      TabIndex        =   21
      Top             =   3120
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   12
      Left            =   3600
      TabIndex        =   20
      Top             =   3120
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   11
      Left            =   2360
      TabIndex        =   19
      Top             =   3120
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   16
      Left            =   2360
      TabIndex        =   24
      Top             =   4520
      Width           =   1180
      _Version        =   65536
      _ExtentX        =   2081
      _ExtentY        =   2434
      _StockProps     =   32
      BorderStyle     =   1
   End
```

Main - 9

```
   Begin PTTLib.Crd Hand
      Height          =   1380
      Index           =   21
      Left            =   2360
      TabIndex        =   29
      Top             =   5940
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   22
      Left            =   3600
      TabIndex        =   30
      Top             =   5940
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   23
      Left            =   4840
      TabIndex        =   31
      Top             =   5940
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   24
      Left            =   6080
      TabIndex        =   32
      Top             =   5940
      Width           =   1180
      _Version        =   65536
      _ExtentX        =   2081
      _ExtentY        =   2434
      _StockProps     =   32
      BorderStyle     =   1
   End
   Begin PTTLib.Crd Hand
      Height          =   1380
      Index           =   25
      Left            =   7320
      TabIndex        =   33
      Top             =   5940
      Width           =   1180
      _Version        =   65536
      _ExtentX        =   2081
      _ExtentY        =   2434
      _StockProps     =   32
      BorderStyle     =   1
   End
   Begin PTTLib.Crd CurrentCard
      Height          =   2895
      Left            =   120
```

Main - 10

```
      TabIndex        =   5
      Top             =   3000
      Width           =   1995
      _Version        =   65536
      _ExtentX        =   3519
      _ExtentY        =   5106
      _StockProps     =   32
      BorderStyle     =   1
   End
   Begin PTTLib.Crd OnDeckCard
      Height          =   2235
      Left            =   360
      TabIndex        =   6
      Top             =   1800
      Width           =   1575
      _Version        =   65536
      _ExtentX        =   2778
      _ExtentY        =   3942
      _StockProps     =   32
      BorderStyle     =   1
   End
   Begin PTTLib.Crd OnDoubleDeckCard
      Height          =   1635
      Left            =   480
      TabIndex        =   7
      Top             =   720
      Width           =   1335
      _Version        =   65536
      _ExtentX        =   2355
      _ExtentY        =   2884
      _StockProps     =   32
      BorderStyle     =   1
   End
   Begin VB.PictureBox ExitBtn
      AutoSize        =   -1  'True
      BorderStyle     =   0  'None
      Height          =   600
      Left            =   0
      Picture         =   (Bitmap)
      ScaleHeight     =   600
      ScaleWidth      =   2145
      TabIndex        =   4
      Top             =   8460
      Width           =   2145
   End
   Begin VB.TextBox CoinsWon
      Appearance      =   0  'Flat
      BackColor       =   &H00000000&
      BeginProperty Font
         Name            =   "Arial"
         Size            =   14.25
         Charset         =   0
         Weight          =   700
         Underline       =   0   'False
         Italic          =   0   'False
         Strikethrough   =   0   'False
      EndProperty
      ForeColor       =   &H00FFFFFF&
      Height          =   450
      Left            =   20000
      TabIndex        =   2
      Text            =   "0"
      Top             =   7740
      Width           =   675
   End
   Begin VB.TextBox StartAutoPlay
      BackColor       =   &H000080FF&
      BorderStyle     =   0  'None
```

Main - 11

```
      BeginProperty Font
         Name            =   "Arial"
         Size            =   6
         Charset         =   0
         Weight          =   400
         Underline       =   0   'False
         Italic          =   0   'False
         Strikethrough   =   0   'False
      EndProperty
      ForeColor       =   &H000080FF&
      Height          =   285
      Left            =   4080
      TabIndex        =   0
      Text            =   "AutoPlay"
      Top             =   9600
      Width           =   615
   End
   Begin VB.Timer MainTimer
      Interval        =   50
      Left            =   9240
      Top             =   10080
   End
   Begin VB.PictureBox Bet30Btn
      AutoSize        =   -1  'True
      BorderStyle     =   0  'None
      Height          =   600
      Left            =   4920
      Picture         =   (Bitmap)
      ScaleHeight     =   600
      ScaleWidth      =   2145
      TabIndex        =   3
      Top             =   8460
      Width           =   2145
   End
   Begin PTTLib.Crd Hand
      Height          =   1575
      Index           =   7
      Left            =   8760
      TabIndex        =   15
      Top             =   1680
      Width           =   1245
      _Version        =   65536
      _ExtentX        =   2196
      _ExtentY        =   2778
      _StockProps     =   32
   End
   Begin PTTLib.Crd Hand
      Height          =   1575
      Index           =   8
      Left            =   8760
      TabIndex        =   16
      Top             =   1680
      Width           =   1245
      _Version        =   65536
      _ExtentX        =   2196
      _ExtentY        =   2778
      _StockProps     =   32
   End
   Begin PTTLib.Crd Hand
      Height          =   1575
      Index           =   9
      Left            =   8760
      TabIndex        =   17
      Top             =   1680
      Width           =   1245
      _Version        =   65536
      _ExtentX        =   2196
      _ExtentY        =   2778
```

Main - 12

```
      _StockProps      =   32
   End
   Begin PTTLib.Crd Hand
      Height           =   1575
      Index            =   10
      Left             =   8760
      TabIndex         =   18
      Top              =   1680
      Width            =   1245
      _Version         =   65536
      _ExtentX         =   2196
      _ExtentY         =   2778
      _StockProps      =   32
   End
   Begin PTTLib.Crd Hand
      Height           =   1290
      Index            =   17
      Left             =   9000
      TabIndex         =   25
      Top              =   4680
      Width            =   885
      _Version         =   65536
      _ExtentX         =   1561
      _ExtentY         =   2284
      _StockProps      =   32
   End
   Begin PTTLib.Crd Hand
      Height           =   1290
      Index            =   18
      Left             =   9120
      TabIndex         =   26
      Top              =   4560
      Width            =   885
      _Version         =   65536
      _ExtentX         =   1561
      _ExtentY         =   2284
      _StockProps      =   32
   End
   Begin PTTLib.Crd Hand
      Height           =   1290
      Index            =   19
      Left             =   9000
      TabIndex         =   27
      Top              =   4560
      Width            =   885
      _Version         =   65536
      _ExtentX         =   1561
      _ExtentY         =   2284
      _StockProps      =   32
   End
   Begin PTTLib.Crd Hand
      Height           =   1290
      Index            =   20
      Left             =   9120
      TabIndex         =   28
      Top              =   4560
      Width            =   885
      _Version         =   65536
      _ExtentX         =   1561
      _ExtentY         =   2284
      _StockProps      =   32
   End
   Begin PTTLib.Rnd RndGen
      Left             =   240
      Top              =   7440
      _Version         =   65536
      _ExtentX         =   2566
      _ExtentY         =   1508
```

Main - 13

```
      _StockProps      =   0
   End
   Begin VB.Label Credits
      Alignment        =   2  'Center
      BackStyle        =   0  'Transparent
      Caption          =   "1000"
      BeginProperty Font
         Name             =   "Courier New"
         Size             =   24
         Charset          =   0
         Weight           =   700
         Underline        =   0   'False
         Italic           =   0   'False
         Strikethrough    =   0   'False
      EndProperty
      ForeColor        =   &H000000FF&
      Height           =   495
      Left             =   10440
      TabIndex         =   73
      Top              =   3560
      Width            =   1275
   End
   Begin VB.Label CoinsIn
      Alignment        =   2  'Center
      BackStyle        =   0  'Transparent
      Caption          =   "0"
      BeginProperty Font
         Name             =   "Courier New"
         Size             =   24
         Charset          =   0
         Weight           =   700
         Underline        =   0   'False
         Italic           =   0   'False
         Strikethrough    =   0   'False
      EndProperty
      ForeColor        =   &H000000FF&
      Height           =   495
      Left             =   10560
      TabIndex         =   45
      Top              =   5470
      Width            =   1035
   End
   Begin VB.Label TotalHandValue
      Alignment        =   2  'Center
      BackStyle        =   0  'Transparent
      Caption          =   "1000"
      BeginProperty Font
         Name             =   "Courier New"
         Size             =   24
         Charset          =   0
         Weight           =   700
         Underline        =   0   'False
         Italic           =   0   'False
         Strikethrough    =   0   'False
      EndProperty
      ForeColor        =   &H000000FF&
      Height           =   495
      Left             =   10440
      TabIndex         =   44
      Top              =   7320
      Width            =   1275
   End
   Begin VB.Label HandValue
      Alignment        =   2  'Center
      BackColor        =   &H00000000&
      Caption          =   "0"
      BeginProperty Font
         Name             =   "Courier New"
```

Main - 14

```
            Size              =   21.75
            Charset           =   0
            Weight            =   700
            Underline         =   0   'False
            Italic            =   0   'False
            Strikethrough     =   0   'False
         EndProperty
         ForeColor       =   &H000000FF&
         Height          =   375
         Index           =   10
         Left            =   8160
         TabIndex        =   43
         Top             =   7680
         Visible         =   0   'False
         Width           =   1335
      End
      Begin VB.Label HandValue
         Alignment       =   2  'Center
         BackColor       =   &H00000000&
         Caption         =   "0"
         BeginProperty Font
            Name              =   "Courier New"
            Size              =   21.75
            Charset           =   0
            Weight            =   700
            Underline         =   0   'False
            Italic            =   0   'False
            Strikethrough     =   0   'False
         EndProperty
         ForeColor       =   &H000000FF&
         Height          =   375
         Index           =   9
         Left            =   6960
         TabIndex        =   42
         Top             =   7680
         Visible         =   0   'False
         Width           =   1335
      End
      Begin VB.Label HandValue
         Alignment       =   2  'Center
         BackColor       =   &H00000000&
         Caption         =   "0"
         BeginProperty Font
            Name              =   "Courier New"
            Size              =   21.75
            Charset           =   0
            Weight            =   700
            Underline         =   0   'False
            Italic            =   0   'False
            Strikethrough     =   0   'False
         EndProperty
         ForeColor       =   &H000000FF&
         Height          =   375
         Index           =   8
         Left            =   6120
         TabIndex        =   41
         Top             =   7680
         Visible         =   0   'False
         Width           =   1335
      End
      Begin VB.Label HandValue
         Alignment       =   2  'Center
         BackColor       =   &H00000000&
         Caption         =   "0"
         BeginProperty Font
            Name              =   "Courier New"
            Size              =   21.75
            Charset           =   0
```

Main - 15

```
            Weight          =   700
            Underline       =   0   'False
            Italic          =   0   'False
            Strikethrough   =   0   'False
         EndProperty
         ForeColor       =   &H000000FF&
         Height          =   375
         Index           =   7
         Left            =   5160
         TabIndex        =   40
         Top             =   7680
         Visible         =   0   'False
         Width           =   1335
      End
      Begin VB.Label HandValue
         Alignment       =   2  'Center
         BackColor       =   &H00000000&
         Caption         =   "0"
         BeginProperty Font
            Name            =   "Courier New"
            Size            =   21.75
            Charset         =   0
            Weight          =   700
            Underline       =   0   'False
            Italic          =   0   'False
            Strikethrough   =   0   'False
         EndProperty
         ForeColor       =   &H000000FF&
         Height          =   375
         Index           =   6
         Left            =   2520
         TabIndex        =   39
         Top             =   7720
         Width           =   735
      End
      Begin VB.Label HandValue
         Alignment       =   2  'Center
         BackColor       =   &H00000000&
         Caption         =   "0"
         BeginProperty Font
            Name            =   "Courier New"
            Size            =   21.75
            Charset         =   0
            Weight          =   700
            Underline       =   0   'False
            Italic          =   0   'False
            Strikethrough   =   0   'False
         EndProperty
         ForeColor       =   &H000000FF&
         Height          =   495
         Index           =   5
         Left            =   9000
         TabIndex        =   38
         Top             =   6590
         Width           =   735
      End
      Begin VB.Label HandValue
         Alignment       =   2  'Center
         BackColor       =   &H00000000&
         Caption         =   "0"
         BeginProperty Font
            Name            =   "Courier New"
            Size            =   21.75
            Charset         =   0
            Weight          =   700
            Underline       =   0   'False
            Italic          =   0   'False
            Strikethrough   =   0   'False
```

Main - 16

```
      EndProperty
      ForeColor       =   &H000000FF&
      Height          =   375
      Index           =   4
      Left            =   9120
      TabIndex        =   37
      Top             =   4920
      Visible         =   0   'False
      Width           =   495
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   495
      Index           =   3
      Left            =   9000
      TabIndex        =   36
      Top             =   3790
      Width           =   735
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   375
      Index           =   2
      Left            =   8880
      TabIndex        =   35
      Top             =   1680
      Visible         =   0   'False
      Width           =   735
   End
   Begin VB.Label HandValue
      Alignment       =   2  'Center
      BackColor       =   &H00000000&
      Caption         =   "0"
      BeginProperty Font
         Name            =   "Courier New"
         Size            =   21.75
         Charset         =   0
         Weight          =   700
         Underline       =   0   'False
         Italic          =   0   'False
         Strikethrough   =   0   'False
      EndProperty
      ForeColor       =   &H000000FF&
      Height          =   495
```

Main - 17

```
      Index            =   1
      Left             =   9000
      TabIndex         =   34
      Top              =   1050
      UseMnemonic      =   0   'False
      Width            =   735
   End
   Begin VB.Label Label1
      BackColor        =   &H00000000&
      Caption          =   "Total Coins Won"
      BeginProperty Font
         Name             =   "Arial"
         Size             =   14.25
         Charset          =   0
         Weight           =   700
         Underline        =   0   'False
         Italic           =   0   'False
         Strikethrough    =   0   'False
      EndProperty
      ForeColor        =   &H0000FFFF&
      Height           =   315
      Index            =   1
      Left             =   12000
      TabIndex         =   8
      Top              =   8400
      Visible          =   0   'False
      Width            =   2445
   End
   Begin VB.Line Line2
      BorderWidth      =   3
      Index            =   7
      X1               =   8400
      X2               =   12000
      Y1               =   0
      Y2               =   0
   End
   Begin VB.Label Label1
      BackColor        =   &H00000000&
      Caption          =   "Coins Won"
      BeginProperty Font
         Name             =   "Arial"
         Size             =   12
         Charset          =   0
         Weight           =   700
         Underline        =   0   'False
         Italic           =   0   'False
         Strikethrough    =   0   'False
      EndProperty
      ForeColor        =   &H00FFFFFF&
      Height           =   255
      Index            =   2
      Left             =   20000
      TabIndex         =   1
      Top              =   7800
      Width            =   1365
   End
End
```

What is claimed is:

1. A method of playing a card game wherein a player sequentially builds at least two card hands that intersect with each other in at least one card, the at least two card hands defining a pattern, comprising the steps of:

(a) dealing at least one card to the player;

(b) placing the at least one card in an empty place in the pattern;

(c) repeatedly performing steps (a) and (b) until the player has placed a predetermined number of cards that comprise the at least two card hands defining the pattern;

(d) comparing individual hands in the at least two card hands to corresponding values in a predetermined winning schedule;

(e) totaling the values into a total value; and (f) at least one of awarding the player and declaring the player a winner, responsive to the total value.

2. A method of playing a card game according to claim 1, wherein the predetermined number of cards includes the at least two card hands defining the pattern and at least one discard card which the player optionally discards instead of placing in the at least two card hands.

3. A method of playing a card game according to claim 1, wherein the at least one card includes at least two cards dealt face-up to the player, a first card of the at least two cards is a current card to be placed in the pattern, and a second card of the at least two cards is a next card to be placed in the pattern.

4. A method of playing a card game according to claim 1, wherein at least one of the at least two cards dealt face-up is optionally discarded instead of placing in the at least two card hands defining the pattern.

5. A method of playing a card game according to claim 1, wherein said steps (a)–(c) are performed with at least two players in a tournament game; and wherein said steps (d)–(f) are performed for each of the at least two card hands for the at least two players based on a single unit bet column of a payoff table using duplicate bridge match point scoring rules to determine the winner for the tournament game.

6. A method of playing a card game according to claim 1, wherein said steps (a)–(c) are performed with at least two players in a tournament game; and wherein said steps (d)–(f) are performed for each of the at least two card hands for the at least two players to determine the winner for the tournament game.

7. A method of playing a card game according to claim 1, wherein said method is implemented by a computer.

8. A modified poker card game wherein a player sequentially builds at least two card hands that intersect with each other in at least one card, the at least two card hands defining a pattern, comprising:

means for dealing at least one card to the player;

means for placing the at least one card in an empty place in the pattern;

means for repeatedly performing steps (a) and (b) until the player has placed a predetermined number of cards that comprise the at least two card hands defining the pattern;

means for comparing individual hands in the at least two card hands to corresponding values in a predetermined winning schedule;

means for totaling the values into a total value; and means for at least one of awarding the player and declaring the player a winner, responsive to the total value.

9. An electronic system for playing a modified poker tournament game among a plurality of players playing against each other, comprising:

(a) a central computer performing the following functions:

(i) assigning players to the modified poker tournament game;

(ii) initiating and transmitting same events relating to the playing of the modified poker tournament game to each of the plurality of players, the modified tournament game including a hand pattern with at least two intersecting modified poker hands to be filled in by each of the plurality of players;

(iii) tabulating, storing and transmitting data as a result of inputs received from the plurality of players in response to the modified poker tournament game;

(iv) evaluating each of the at least two intersecting modified poker hands with respect to a predetermined table to determine one or more values for each of the at least two intersecting modified poker hands, and summing the one or more values to determine a winning player for the modified poker tournament game; and (v) optionally distributing a tournament award to the winning player; and (b) a plurality of player workstations, one player workstation for each of the plurality of players, each player workstation being electronically connected to said central computer, each player workstation performing the following functions:

(i) electronically receiving and displaying tournament data from said central computer and from each of the plurality of players;

(ii) processing the player inputs for the modified poker tournament game including filling in the hand pattern with the at least two intersecting modified poker hands until completion to build the at least two intersecting modified poker hands; and (iii) transmitting player inputs for the modified poker tournament game to said central computer.

10. An electronic system according to claim 9, wherein each of the individual games are scored based on a single unit bet column of a payoff table.

11. An electronic system according to claim 10, wherein separate tournament rewards are providable for each of the simultaneous tournaments.

12. An electronic system according to claim 9, wherein the electronic system provides no restriction to the number of the players playing the tournament game.

13. An electronic system according to claim 9, wherein the tournament game includes players submitting different wagering data of different denominations.

14. An electronic system according to claim 9, wherein the tournament game includes players submitting different entry fees forming independently and substantially simultaneously scored player groupings.

15. An electronic system according to claim 9, wherein said central controller comprises a master game server computer and a gamer server computer operatively connected thereto, and wherein:

each of said workstations query said master game sever computer to participate in the tournament game, said master game server computer assigns said workstation to said game server computer for a session start function, said master game server computer terminates further participation and initiates a begin game function between all participating workstations and said game server computer, and upon completion of the tournament game, said game server computer disconnects all the players participating in the tournament game.

16. An electronic system according to claim 9, wherein each of said plurality of workstations include a graphical display displaying a ranking of all the players in the tournament.

17. An electronic system according to claim 16, wherein said graphical display displays the ranking of all the players in the tournament using bar graphs visually exhibiting each of the players ranking among other players in the tournament.

18. An electronic system according to claim 9, wherein each of said players are eligible for the tournament based on predetermined criteria.

19. An electronic system according to claim 18, wherein said predetermined criteria includes whether the player has been playing individual modified poker games on said workstation immediately before or a predetermined number of games before the modified poker tournament game was initiated by said central controller.

20. An electronic system according to claim 9, wherein said individual game is also substantially simultaneously evaluated for an individual award for the player based on a payoff tale.

21. An electronic system according to claim 9, wherein each of said plurality of player workstations further includes a graphical display of a ranking of the payers in the modified poker tournament game, providing the players with the ability to graphically determine the ranking.

22. An electronic system according to claim 9, wherein each of the players is required to input a name to begin play of the modified poker tournament game, and wherein each of said plurality of player workstations further includes a graphical display of a ranking of the payers in the modified poker tournament game, providing the players with the ability to graphically determine the ranking and to identify other players in the modified poker tournament game by name.

* * * * *